United States Patent
Phillips et al.

(10) Patent No.: US 8,108,092 B2
(45) Date of Patent: Jan. 31, 2012

(54) AUTONOMOUS BEHAVIORS FOR A REMOTE VEHICLE

(75) Inventors: Emilie Phillips, Brookline, NH (US);
Aaron Powers, Arlington, MA (US);
Andrew Shein, Winchester, MA (US);
Josef P. Jamieson, Billerica, MA (US);
Tyson Sawyer, Brookline, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 12/917,174

(22) Filed: Nov. 1, 2010

(65) Prior Publication Data
US 2011/0106339 A1     May 5, 2011

Related U.S. Application Data

(63) Continuation of application No. 11/826,486, filed on Jul. 16, 2007, which is a continuation-in-part of application No. 11/748,463, filed on May 14, 2007, now Pat. No. 7,548,697.

(60) Provisional application No. 60/911,785, filed on Apr. 13, 2007, provisional application No. 60/828,632, filed on Oct. 6, 2006, provisional application No. 60/807,434, filed on Jul. 14, 2006.

(51) Int. Cl.
*G01C 22/00* (2006.01)
(52) U.S. Cl. .............. 701/23; 701/2; 700/245
(58) Field of Classification Search ............ 701/23, 701/24, 200, 209; 700/245, 259
See application file for complete search history.

(56) References Cited

U.S. PATENT DOCUMENTS

| | | | |
|---|---|---|---|
| 4,325,146 | A | 4/1982 | Lennington |
| 4,328,545 | A | 5/1982 | Halsall et al. |
| 4,570,062 | A | 2/1986 | Tsumura et al. |
| 4,588,348 | A | 5/1986 | Beni et al. |
| 4,700,427 | A | 10/1987 | Knepper |
| 4,730,684 | A | 3/1988 | Pedersen |
| 4,977,971 | A | 12/1990 | Crane, III et al. |
| 5,022,812 | A | 6/1991 | Coughlan et al. |
| 5,063,846 | A | 11/1991 | Willis et al. |
| 5,174,405 | A | 12/1992 | Carra et al. |
| 5,179,843 | A | 1/1993 | Cohausz |

(Continued)

FOREIGN PATENT DOCUMENTS
DE       3404202       5/1987
(Continued)

OTHER PUBLICATIONS

Nilsson, "Shakey the Robot," SRI International, Technical Note 323, Apr. 1984.

(Continued)

*Primary Examiner* — Mark Hellner
*Assistant Examiner* — Helal A Algahaim
(74) *Attorney, Agent, or Firm* — O'Brien Jones, PLLC

(57) ABSTRACT

A method for enhancing operational efficiency of a remote vehicle using a diagnostic behavior. The method comprises inputting and analyzing data received from a plurality of sensors to determine the existence of deviations from normal operation of the remote vehicle, updating parameters in a reference mobility model based on deviations from normal operation, and revising strategies to achieve an operational goal of the remote vehicle to accommodate deviations from normal operation. An embedded simulation and training system for a remote vehicle. The system comprises a software architecture installed on the operator control unit and including software routines and drivers capable of carrying out mission simulations and training.

19 Claims, 61 Drawing Sheets

U.S. PATENT DOCUMENTS

| | | | |
|---|---|---|---|
| 5,279,672 A | 1/1994 | Betker et al. | |
| 5,337,846 A | 8/1994 | Ogaki et al. | |
| 5,341,540 A | 8/1994 | Soupert et al. | |
| 5,416,712 A * | 5/1995 | Geier et al. | 701/216 |
| 5,443,354 A | 8/1995 | Stone et al. | |
| 5,448,479 A | 9/1995 | Kemner et al. | |
| 5,451,135 A | 9/1995 | Schempf et al. | |
| 5,465,525 A | 11/1995 | Mifune et al. | |
| 5,511,147 A | 4/1996 | Abdel-Malek | |
| 5,644,126 A | 7/1997 | Ogawa | |
| 5,652,849 A | 7/1997 | Conway et al. | |
| 5,675,229 A | 10/1997 | Thorne | |
| 5,860,479 A | 1/1999 | LaFollette | |
| 5,940,927 A | 8/1999 | Haegermarck et al. | |
| 5,959,423 A | 9/1999 | Nakanishi et al. | |
| 5,974,348 A | 10/1999 | Rocks | |
| 5,984,880 A | 11/1999 | Lander et al. | |
| 6,088,020 A | 7/2000 | Mor | |
| 6,108,031 A | 8/2000 | King et al. | |
| 6,115,655 A | 9/2000 | Keith et al. | |
| 6,122,572 A | 9/2000 | Yavnai | |
| 6,339,735 B1 | 1/2002 | Peless et al. | |
| 6,374,155 B1 | 4/2002 | Wallach et al. | |
| 6,463,368 B1 | 10/2002 | Feiten et al. | |
| 6,493,613 B2 | 12/2002 | Peless et al. | |
| 6,496,755 B2 | 12/2002 | Wallach et al. | |
| 6,535,793 B2 | 3/2003 | Allard | |
| 6,580,979 B2 | 6/2003 | Payton et al. | |
| 6,611,738 B2 | 8/2003 | Ruffner | |
| 6,615,108 B1 | 9/2003 | Peless et al. | |
| 6,624,744 B1 | 9/2003 | Wilson et al. | |
| 6,658,325 B2 | 12/2003 | Zweig | |
| 6,675,068 B1 | 1/2004 | Kawasaki | |
| 6,681,151 B1 | 1/2004 | Weinzimmer et al. | |
| 6,690,134 B1 | 2/2004 | Jones et al. | |
| 6,746,304 B1 | 6/2004 | Liu | |
| 6,748,297 B2 | 6/2004 | Song et al. | |
| 6,778,097 B1 | 8/2004 | Kajita et al. | |
| 6,781,338 B2 | 8/2004 | Jones et al. | |
| 6,836,701 B2 | 12/2004 | McKee | |
| 6,845,297 B2 * | 1/2005 | Allard | 700/259 |
| 6,860,206 B1 | 3/2005 | Rudakevych et al. | |
| 6,886,651 B1 | 5/2005 | Slocum et al. | |
| 6,925,357 B2 | 8/2005 | Wang et al. | |
| 6,955,324 B2 | 10/2005 | Tanielian | |
| 6,957,712 B2 | 10/2005 | Song et al. | |
| 6,965,209 B2 | 11/2005 | Jones et al. | |
| 7,024,278 B2 | 4/2006 | Chiappetta et al. | |
| 7,054,716 B2 | 5/2006 | McKee et al. | |
| 7,246,567 B2 | 7/2007 | Shelton et al. | |
| 7,515,991 B2 | 4/2009 | Egawa et al. | |
| 7,653,800 B2 * | 1/2010 | Zohar et al. | 711/173 |
| 7,756,614 B2 | 7/2010 | Jouppi | |
| 7,761,954 B2 * | 7/2010 | Ziegler et al. | 15/320 |
| 7,813,835 B2 * | 10/2010 | Fujita et al. | 700/245 |
| 2001/0037163 A1 | 11/2001 | Allard | |
| 2002/0101632 A1 | 8/2002 | Meckler | |
| 2002/0153185 A1 | 10/2002 | Song et al. | |
| 2003/0025472 A1 | 2/2003 | Jones et al. | |
| 2003/0216834 A1 * | 11/2003 | Allard | 700/245 |
| 2004/0078946 A1 | 4/2004 | Nakamoto et al. | |
| 2004/0088081 A1 | 5/2004 | Song et al. | |
| 2004/0111184 A1 | 6/2004 | Chiappetta et al. | |
| 2004/0216931 A1 | 11/2004 | Won | |
| 2005/0067994 A1 | 3/2005 | Jones et al. | |
| 2005/0192721 A1 * | 9/2005 | Jouppi | 701/24 |
| 2005/0213082 A1 | 9/2005 | DiBernardo et al. | |
| 2005/0216182 A1 | 9/2005 | Hussain et al. | |
| 2006/0058920 A1 | 3/2006 | Matsunaga et al. | |
| 2006/0089765 A1 | 4/2006 | Pack et al. | |
| 2006/0089800 A1 | 4/2006 | Svendsen et al. | |
| 2006/0120726 A1 | 6/2006 | Yoshifusa et al. | |
| 2006/0178820 A1 * | 8/2006 | Eglington et al. | 701/209 |
| 2007/0003915 A1 | 1/2007 | Templeman | |
| 2007/0071311 A1 | 3/2007 | Rovira-Mas et al. | |
| 2007/0072662 A1 | 3/2007 | Templeman | |
| 2007/0078901 A1 * | 4/2007 | Satou et al. | 707/200 |
| 2007/0149214 A1 * | 6/2007 | Walsh et al. | 455/456.1 |
| 2007/0198144 A1 | 8/2007 | Norris et al. | |
| 2007/0198145 A1 | 8/2007 | Norris et al. | |
| 2007/0273557 A1 | 11/2007 | Baillot | |
| 2007/0294032 A1 * | 12/2007 | Zumsteg et al. | 701/213 |
| 2008/0172531 A1 * | 7/2008 | Liu et al. | 711/135 |
| 2009/0177844 A1 * | 7/2009 | Naylor et al. | 711/136 |
| 2009/0301522 A1 | 12/2009 | Abehasera et al. | |
| 2010/0082193 A1 | 4/2010 | Chiappetta | |

FOREIGN PATENT DOCUMENTS

| | | |
|---|---|---|
| EP | 0 433 697 A2 | 6/1991 |
| EP | 1 331 537 A1 | 7/2003 |
| GB | 2128842 | 5/1984 |
| JP | 11149315 | 6/1999 |
| JP | 20094373 | 4/2000 |
| JP | 63241610 | 10/2007 |
| WO | WO 9740734 A1 | 11/1997 |
| WO | WO 9741451 | 11/1997 |
| WO | WO 9905580 A | 2/1999 |
| WO | WO 2007/050407 A1 | 5/2007 |

OTHER PUBLICATIONS

Yanco et al., "Improving Human-Robot Interaction for Remote Robot Operation," University of Massachusetts Lowell, Computer Science Department, 2005.

Yanco et al., "Blending Human and Robot Inputs for Sliding Scale Autonomy," University of Massachusetts Lowell, Computer Science Department, 2005.

Brooks, "New Approaches to Robotics," Science (253), Sep. 1991, pp. 1227-1232.

Brooks et al., "Fast, Cheap and Out of Control: A Robot Invasion of the Solar System," Journal of the British Interplanetary Society, Oct. 1989, pp. 478-485.

Jones, "Robot Programming: A Practical Guide to Behavior-Based Robotics," Chapter 4, 2004.

Brooks et al., "Sensing and Manipulating Built-for-Human Environments," International Journal of Humanoid Robotics, vol. 1, #1, 2004.

Horswill, Northwestern University, CS C95 Behavior-Based Robotics, Lecture 0, Introduction, 1999.

Bongard, J. et al., "Robotic Introspection: Self-modeling," Cornell Computational Synthesis Laboratory. [retrieved on Dec. 31, 2009]. Retrieved from the internet: <URL: http://ccsl.mae.cornell.edu/emergent_self_models>.

O'Reilly, U., "Behavior-based Robot Design an Introduction," Lecture 2, Sep. 8, 2005. [retrieved on Dec. 31, 2009]. Retrieved from the internet: <URL: http://web.cecs.pdx.edu/~mperkows/SUMMER/I/X011.%20Behavior%20based%20robots%20and%20architectures.ppt>.

Brooks, R., "A Robust Layered Control System for a Mobile Robot," Sep. 1985. Massachusetts Institute of Technology 1985. [retrieved on Dec. 31, 2009]. Retrieved from the internet: <URL: http://dspace.mit.edu/bitstream/handle/1721.1/6432/AIM-864.pdf?sequence=2>.

Petrick, E. N. et al., "The Use of the NATO Reference Mobility Model in Military Vehicle Procurement," International Congress and Exposition, Detroit, MI, Feb. 23-27, 1981.

Yamauchi, Brian. "Daredevil: Ultra Wideband Radar Sensing for Small UGVs", In Proceedings of SPIE: Unmanned Systems Technology IX, Orlando, FL, Apr. 2007.

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator Interface for the Control of Multiple Semi-Autonomous UGVs", In Proceedings of the Association for Unmanned Vehicles Systems International. Orlando, FL, Aug. 2006.

Yamauchi, Brian. "Autonomous Urban Reconnaissance Using Man-Portable UGVs", In Proceedings of SPIE: Unmanned Ground Vehicle Technology VIII, Orlando, FL, Apr. 2006.

Yamauchi, Brian. "Wayfarer: An Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian et al., "Griffon: a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al., "Mobility Enhancements for Ballistically Deployed Sensors", In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

Search Report for PCT/US07/68890.

Written Opinion for PCT/US07/68890.

Green et al., Telepresence Surgery, 1995, IEEE, pp. 324-329.

Ohashi et al., The Sensor Arm and the Sensor Glove II—Haptic Devices for VR Interface, IEEE/ASME International Conference on Advanced Intelligent Mechatronics, Sep. 19-23, 1999, Atlanta, USA.

P. Cheng, R. Harper, P. Lee, Generation Stack Collection and Profile Driven Pretenuring, PLDI.

Shimoga et al., Touch and Force Reflection for Telepresence Surgery, 1994, IEEE, pp. 1049-1050.

Nilsson, Shakey the Robot, SRI International, Technical Note 323, Apr. 1984.

Yanco et al., Improving Human-Robot Interaction for Remote Robot Operation, University of Massachusetts Lowell, Computer Science Department, 2005.

Yanco et al., Blending Human and Robot Inputs for Sliding Scale Autonomy, University of Massachusetts Lowell, Computer Science Department, 2005.

O'Reilly, Behavior-Based Robot Design, Lecture #2, Sep. 8, 2005.

Brooks, New Approaches to Robotics, Science (253), Sep. 1991, pp. 1227-1232.

Brooks et al, Fast, Cheap and Out of Control: A Robot Invasion of the Solar System, Journal of the British Interplanetary Society, Oct. 1989, pp. 478-485.

Brooks, A Robust Layered Control System for a Mobile Robot, IEEE Journal of Robotics and Automation, vol. 2, No. 1, Mar. 1986, pp. 14-23.

Jones, Robot Programming: A Practical Guide to Behavior-Based Robotics, Chapter 4, 2004.

Brooks et al., Sensing and Manipulating Built-for-Human Environments, International Journal of Humanoid Robotics, vol. 1, #1, 2004.

Bongard et al., Research: Robotic Introspection: Self Modeling, Nov. 21, 2006.

Yamauchi, Brian. "All-Weather Perception for Small Autonomous UGVs". In Proceedings of SPIE Defense and Security Conference, Orlando, FL, Mar. 2008.

Lenser, Scott et al., "Practical problems in sliding scale autonomy: A case study". In Proceedings of SPIE Defense and Security Conference, Orlando, FL, Mar. 2008.

Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.

Schoenfeld, Erik et al., "Door Breaching Robotic Manipulator". In Proceedings of SPIE Defense and Security Conference, Orlando, FL, Mar. 2008.

Search Report for PCT/US08/60286.

Written Opinion for PCT/US08/60286.

Office Action dated Mar. 19, 2009 from co-pending U.S. Appl. No. 11/748,363.

Office Action dated Oct. 16, 2009 from co-pending U.S. Appl. No. 11/748,363.

Office Action dated Apr. 7, 2010 from co-pending U.S. Appl. No. 11/748,363.

Office Action dated Oct. 1, 2010 from co-pending U.S. Appl. No. 11/748,363.

Office Action dated Mar. 19, 2009 from co-pending U.S. Appl. No. 11/826,486.

Office Action dated Nov. 4, 2009 from co-pending U.S. Appl. No. 11/826,486.

Office Action dated Oct. 28, 2010 from co-pending U.S. Appl. No. 12/102,838.

Wen J. T. et al., "Nonlinear model predictive control based on predicted state error convergence," Proceedings of the 2004 American Control Conference, vol. 3, Jun. 30, 2004.

European Search Report dated Jan. 24, 2011 from related Application No. PCT/US2008/060286.

Office Action dated Aug. 20, 2008 from co-pending U.S. Appl. No. 11/748,463.

Notice of Allowance dated Feb. 10, 2009 from co-pending U.S. Appl. No. 11/748,463.

* cited by examiner

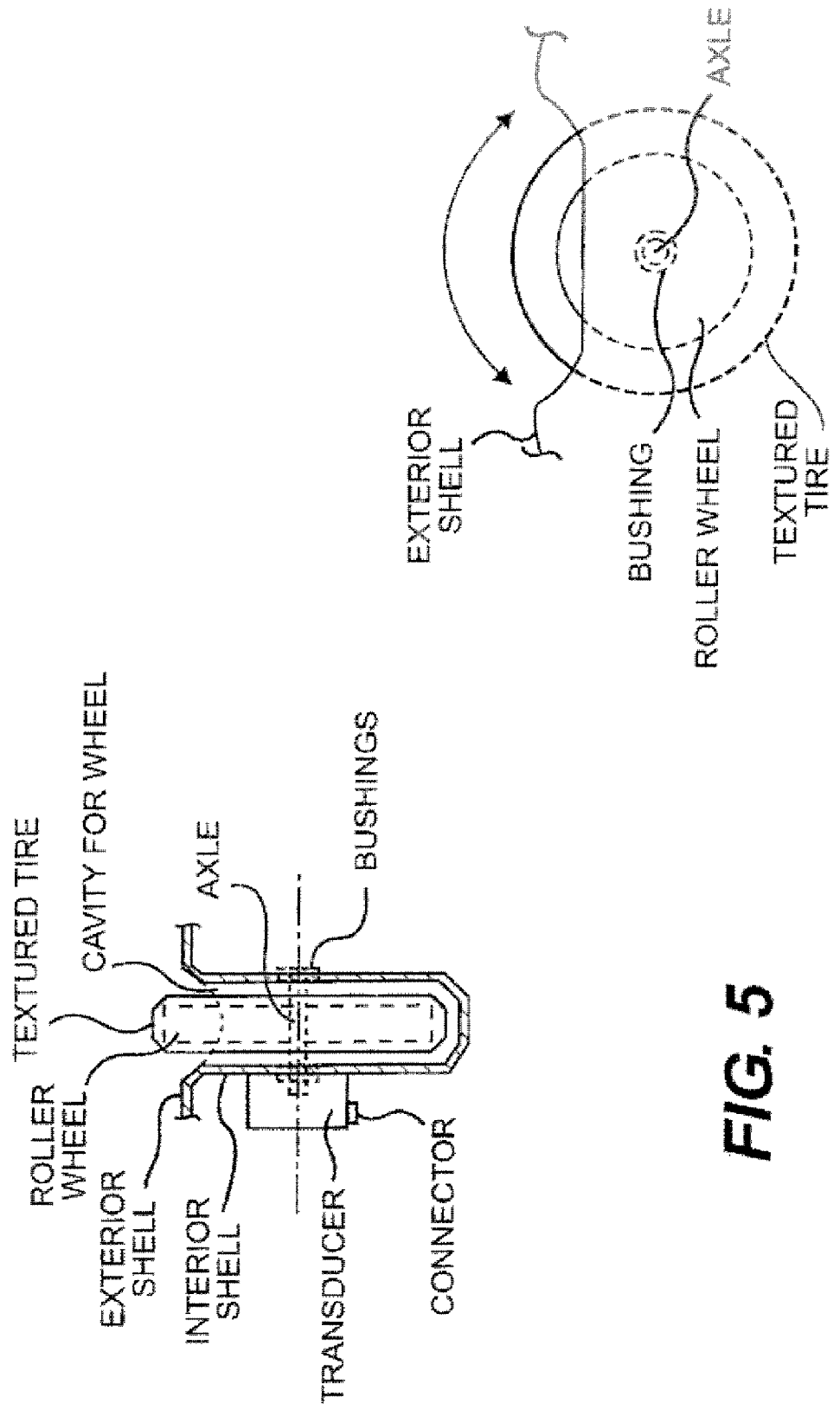

AUTONOMOUS BEHAVIORS FOR A REMOTE VEHICLE

This is a continuation of U.S. patent application Ser. No. 11/826,486, filed Jul. 16, 2007, which is a continuation-in-part of application Ser. No. 11/748,463, now U.S. Pat. No. 7,548,697, filed May 14, 2007, and claims the benefit of U.S. Provisional Application No. 60/911,785, filed Apr. 13, 2007; U.S. Provisional Application No. 60/828,632, filed Oct. 6, 2006; and U.S. Provisional Application No. 60/807,434 filed Jul. 14, 2006, all of which are incorporated herein by reference.

FIELD OF THE INVENTION

The present invention relates to a method and device for simplifying control of a remote vehicle. The present invention more specifically relates to autonomous behaviors for remote vehicles, and more particularly to switching between tele-operation of a remote vehicle and autonomous remote vehicle behaviors.

BACKGROUND OF THE INVENTION

Remote vehicles are increasingly being used in military, law enforcement, and industrial applications to provide a tool for a person to perform operations at a safe, remote distance from sites of potential danger or hazard to human beings. Such remote vehicles are being deployed for some tasks by military and civilian forces, such as bomb and ordnance disposal, in which the remote vehicle is remotely navigated to the proximity of the explosives or other potentially dangerous target by an operator located hundred of meters away, so that investigation and disarmament can take place at a safe distance.

In typical remote vehicle operation, the operator controls the vehicle using a process known as tele-operation. Conventional remote vehicle tele-operation involves the use of operator control consoles, most commonly having joysticks, trackballs, mouse-type input devices, or some arrangement of physical switches and/or potentiometers and similar manual actuation input devices. Remote vehicles are typically configured with many axes of motion, including motion drive axes, steering axes (either physical or derived virtual steering), manipulation axes, sensor pan-tilt-zoom axes, etc. The axes of the remote vehicle often involve complex mechanical coupling between the drive actuators and the physical motion apparatus, such as wheels, tracks, rudders, heads, etc. Additionally, remote vehicle platforms typically contain many sensors, such as cameras, that can provide multiple streams of video to the operator as visual feedback to aid the operator's control. The electro-mechanical complexity of many remote vehicles has consequently made the manual control of such vehicles complex for human operators in a tele-operation process, requiring many function-specific knobs, joysticks and buttons to perform a task. A significant amount of operator training and experience can be required to develop sufficient manual dexterity and skill to be able to accurately navigate and control a remote vehicle.

In order for robots to be beneficial in such activities, a method and device are needed to allow remote vehicles to accomplish certain behaviors autonomously, either continuously or upon user commands.

SUMMARY OF THE INVENTION

The present invention provides a method for enhancing operational efficiency of a remote vehicle using a diagnostic behavior. The method comprises inputting and analyzing data received from a plurality of sensors to determine the existence of deviations from normal operation of the remote vehicle, updating parameters in a reference mobility model based on deviations from normal operation, and revising strategies to achieve an operational goal of the remote vehicle to accommodate deviations from normal operation.

The present invention also provides an embedded simulation and training system for a remote vehicle. The system comprises a software architecture installed on the operator control unit and including software routines and drivers capable of carrying out mission simulations and training. The software routines include a virtual remote vehicle simulator for generating physical characteristics of a remote vehicle as it moves through a simulated environment and responds to control commands sent by the operator control unit, a behavior-based control system for generating behavioral characteristics of a remote vehicle, an environmental simulator for generating sensor events based on a simulated environment, an integration controller for sending sensor events from the environmental simulator to the behavior-based control system, and a mission routine suite executed by a central control system of the operator control unit, the mission routine suite including at least one training scenario routine for implementation by the virtual remote vehicle simulator and the environmental simulator. Movement of a simulated remote vehicle through a simulated environment is defined by sensor events generated by the environmental simulator, sensor events generated by actuation of operator controls, behavioral characteristics generated by the behavior-based control system, and physical variables generated by the virtual remote vehicle simulator.

BRIEF DESCRIPTION OF THE DRAWINGS

FIG. 5 is a front sectional view of an embodiment of a roller wheel for use with the control system of the present invention;

FIG. 6 is a side view of the roller wheel embodiment of FIG. 5;

DETAILED DESCRIPTION OF EMBODIMENTS OF THE INVENTION

Operator Control Unit

Figure 57:
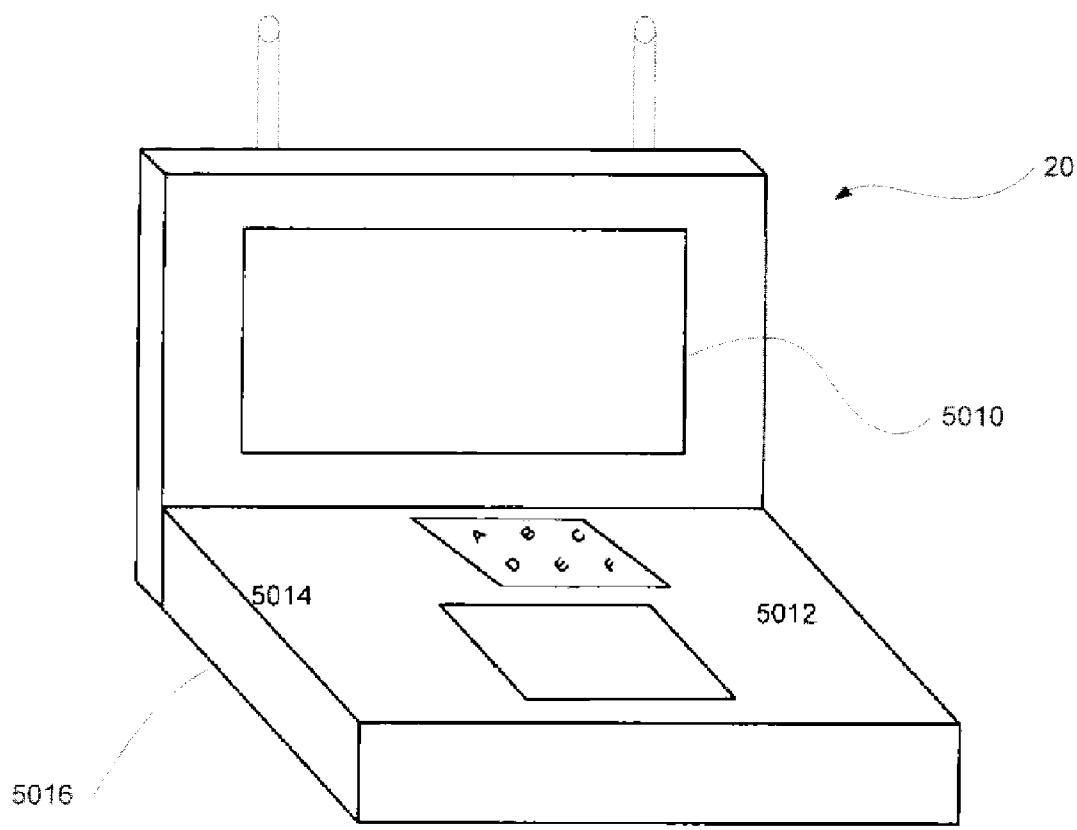
FIG. 57 illustrates an embodiment of an operator control unit.

FIG. 57 illustrates an embodiment of an operator control unit. This embodiment is based in part on a portable computer that includes a display screen for outputting information to the operator and a keypad and mouse for inputting information into the portable computer. Other embodiments of the operator control unit include a portable control console with a screen configured to input information representative of the area of the screen on which the user applied force. Such a version may include a touch screen display able to execute behavior and simulation routines on reception of a signal indicating that force was applied to the proper area of the display.

Further included in an embodiment of the operator control unit is a console-mounted antenna able to communicate with a corresponding receiver installed on the remote vehicle 10 via radio-frequency (RF). Other embodiments of the operator control unit may include a portable control console able to communicate with the remote vehicle 10 using any of the following communication methods: IEEE® 802.11-based wireless Ethernet® system, packet-radio, BLUETOOTH®, or any other suitable device that permits the operator control unit to wirelessly issue a control signal to the remote vehicle 10 and to receive data from the remote vehicle 10.

Also included in an embodiment of the operator control unit is a keyboard with keys where each key is an electrical switch that when closed, causes an electrical signal to be sent to the operator control unit's central control system indicating that the key was depressed. Additionally included may be joysticks and pucks for further controlling the operation of the remote vehicle 10.

Other embodiments of the operator control unit may include a hand-held controller configured to control the remote vehicle 10. Included on the hand-held controller are joysticks and buttons that when actuated, control the remote vehicle 10 to perform actions representative of the joystick or button and the manner in which the joystick or button was actuated. For example the hand-held controller may include a joystick dedicated to controlling the speed and direction of movement of the remote vehicle 10. When an operator depresses the joystick in a forward direction and at a specified angle from the joystick lever, the remote vehicle 10 moves in a forward direction and at a speed associated with the specified angle.

Figure 1:
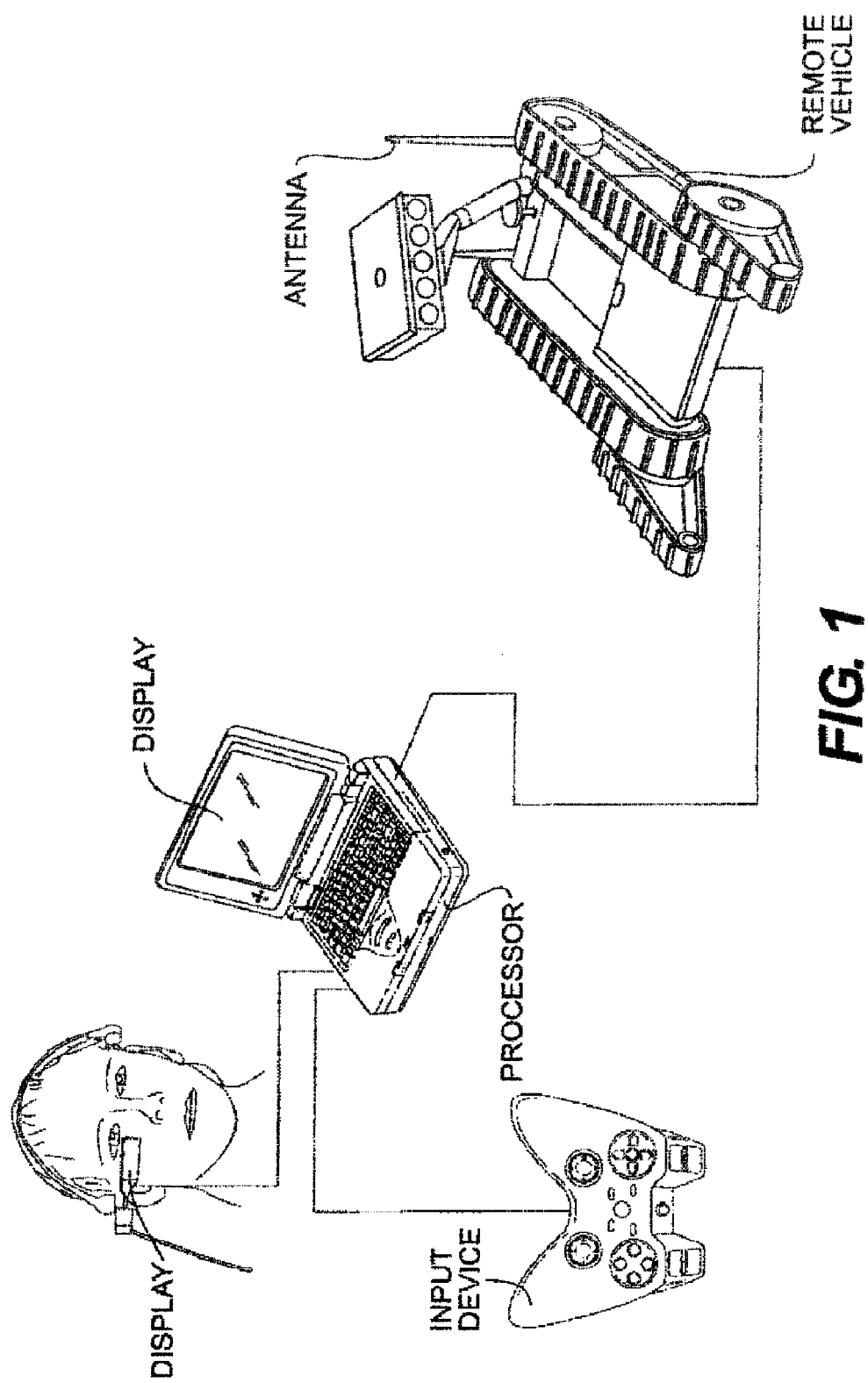
FIG. 1 illustrates a embodiment of a control system of the present invention and a remote vehicle.

An embodiment of a control system (also called an "operator control system" herein) for use with the present invention may include the operator control unit embodiments described above or, as an alternative to the operator control unit embodiments described above, an unobtrusive, highly mobile control system that provides the user with a remote vehicle operating experience that seamlessly integrates with the user's other tasks and duties. The control system allows the user to initiate autonomous behaviors for the remote vehicle, and to switch between tele-operation and such autonomous behaviors. Situational awareness is minimally compromised when operating the system, as it is critical for the user to be aware of his surroundings. Basic components of the control system, which are illustrated in FIG. 1, include a display, an input device, a processor, an antenna/radio (for wireless communication), and software. In an embodiment of the invention, a head-mounted display provides video display from one or more remote vehicle cameras. A hand-held controller, preferably having a twin-grip design, includes controls to drive, manipulate, and monitor the robot and its payloads. Audio may additionally be provided via the hand-held controller, the display, or dedicated listening devices such as, for example, Bluetooth headsets commonly used with mobile phones. In an embodiment of the invention, a microphone is provided on the hand-held controller, the processor, the display, or separately from these components, and can be used with a speaker on the remote vehicle to broadcast messages. A button on the hand-held controller or a soft button within the GUI can be used to activate the speaker and microphone for broadcasting a message.

The system is preferably compatible with MOLLE packs, ALICE packs, ILBEs, or OTVs commonly worn by users. The system preferably has the following additional characteristics: lightweight (e.g., no more than 7 pounds total, and no more than 2 pounds for the hand-held controller); mobile; small form factor (e.g., able to integrate with existing user gear); wearable or capable of being carried in a backpack; easy to put on/take off; adequate computer processing power; minimal or no external cables; meets mission time thresholds (e.g., 5 hours); rugged to intended environment (e.g., temperature, shock, vibration, water, etc.); able to withstand being dropped (e.g., 3 feet).

The platform should have standard interfaces for networking, display, wireless communication, etc.

The control system, as illustrated in FIG. 1, includes a processor such as a rugged laptop computer. The processor could alternatively be any suitably powerful processor including, for example, a tablet PC. The processor communicates with the remote vehicle wirelessly or via a tether (e.g., a fiber optic cable). Although wireless communication may be preferable in some situations of remote vehicle use, potential for jamming and blocking wireless communications makes it preferable that the control system be adaptable to different communications solutions, in some cases determined by the end user at the time of use. A variety of radio frequencies (e.g., 802.11), optical fiber, and other types of tether may be used to provide communication between the processor and the remote vehicle.

The processor must additionally communicate with the hand-held controller and the display. In a preferred embodiment of the invention, the processor is capable of communicating with the hand-held controller and the display, illustrated in the present embodiment to be a head-mounted display, either wirelessly or using a tether. To facilitate wireless communication among the various elements of the system, the processor includes a radio and an antenna.

It addition, the processor includes software capable of facilitating communication among the system elements, and controlling the remote vehicle. In an embodiment of the invention, the software is a proprietary software and architecture, including a behavioral system and common OCU software, which provide a collection of software frameworks that are integrated to form a basis for robotics development. According to an embodiment of the invention, this software is built on a collection of base tools and the component framework, which provide a common foundation of domain-independent APIs and methods for creating interfaces, building encapsulated, reusable software components, process/module communications, execution monitoring, debugging, dynamic configuration and reconfiguration as well as operating system insulation and other low-level software foundations like instrument models, widget libraries, and networking code. In an embodiment of the invention, the processor performs all of the data processing for the control system.

Figure 2:
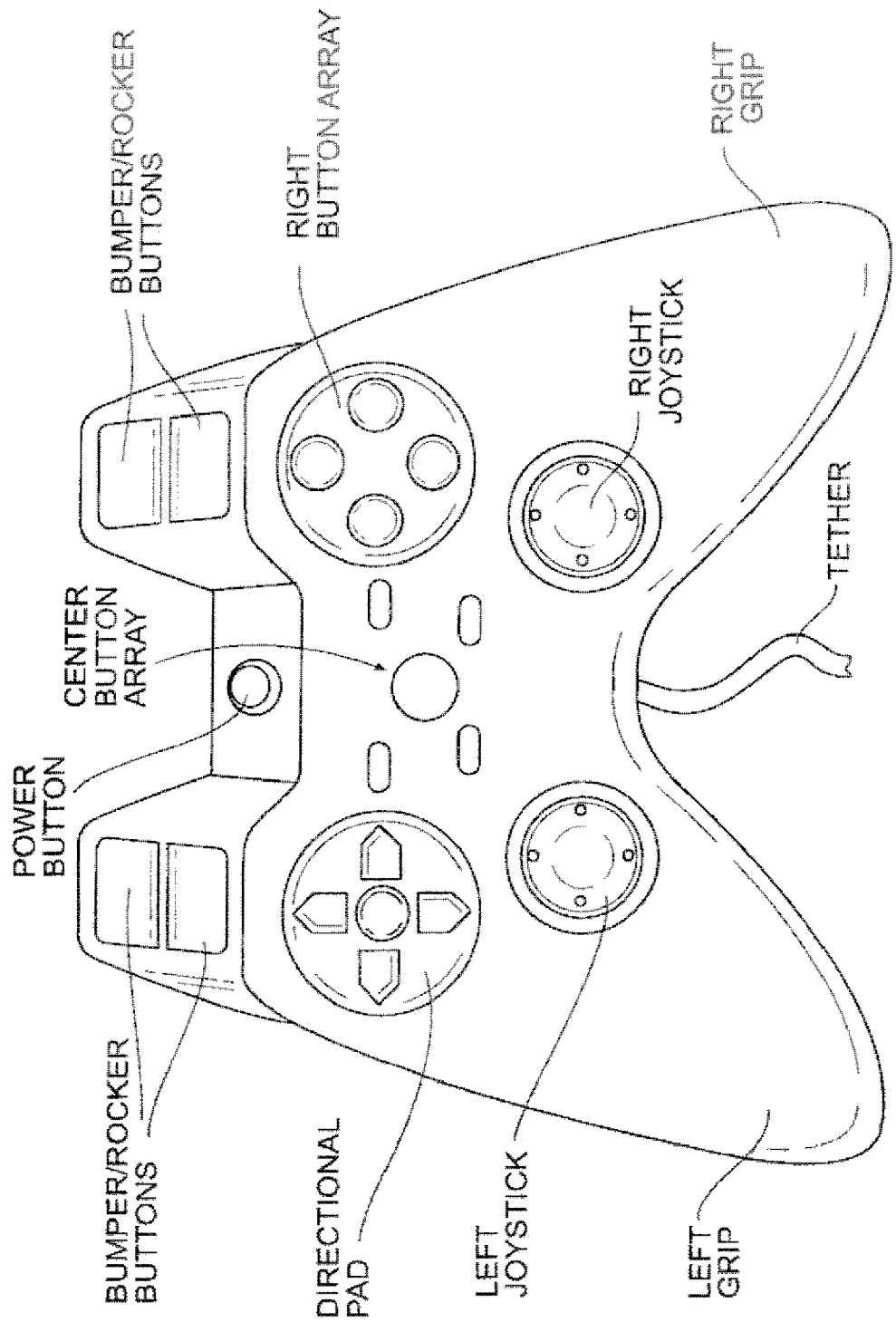
FIG. 2 is a top view of an embodiment of a hand-held controller of the control system of the present invention.

Referring to FIG. 2, an exemplary embodiment of a twin-grip hand-held controller is illustrated. The hand-held controller includes left and right grips shaped to be held between a little finger, a ring finger, and the ball of a thumb of a respective hand, leaving the index finger, middle finger, and thumb of the respective hand free to manipulate controls. Two joysticks (analog, having 4 degrees of freedom) are provided on the left and right sides of the hand-held controller. The joysticks may be 2-axis analog. In an embodiment of the invention, analog-to-digital resolution of the joysticks is at least 12-bit per axis with the joystick center "dead band" (maximum offset from center on spring return) being less than about 3% of total resolution. If pressed, the joysticks can function as digital buttons. The present invention also contemplates using pucks (6 degrees of freedom) instead of joysticks.

In an embodiment of the invention, the left joystick is commonly used to drive the remote vehicle (forward, backward, left, and right). The right joystick controls one or more other functions of the robot depending on a selected button function mode, including a camera (e.g., the attack camera), a weapon, or flipper control.

A directional pad is located on a left side of the hand-held controller and includes an array of four or five discrete digital buttons for manipulation by the user's left thumb. The buttons are arranged in a diamond shape with an optional button in the center. The four buttons not in the center preferably come to a rounded point at one end to indicate direction. One button points up, one points down, one points right, one points left. In an embodiment, the four buttons not in the center have a generally flat exposed surface and the center button has a generally hemispherical exposed surface and is raised above the surrounding buttons. In an embodiment of the invention, the directional pad is used to navigate among the soft buttons of a GUI displayed by the head-mounted display. The center button of the array, when present, may be used to select a soft button of the GUI.

A right button array includes an array of four discrete digital buttons for manipulation by the user's right thumb. The buttons are arranged in a diamond shape and are circular with exposed surfaces that may be at least slightly curved.

The right button array can be used to control a variety of functions such as camera selection, robot light setting, and robot speed. When no center button is provided on the directional pad, one of the buttons of the right button array may be used to select a soft button of the GUI.

A center button array is shown to include five discrete digital buttons for manipulation by the user's thumbs. A first button is generally located in an upper left region of the center area, a second button is generally located in an upper right region of the center area, a third button is generally located in a lower left region of the center area, a fourth button is generally located in a lower right region of the center area, and a fifth button is generally located in the center of the other buttons. The first four buttons are elongated (generally rectangular) and the fifth button is generally hemispherical. In an embodiment of the invention, the center button is larger than the other buttons in the center array.

In an embodiment of the invention, the upper right button (second) button is the menu button, which brings up a menu within the GUI displayed by the head-mounted display. The menu is preferably a hierarchical menu, such as a drop-down menu, that allows the user to select a screen layout, a robot to control, select a safe mode for the robot (such as observe mode), manage and play video, audio and snap shot recordings, select among other settings such as brightness, and time/date, or review documentation regarding the controller or the robot. In this embodiment, the upper left (first) button acts as a pause or brake button for the robot, ceasing movement of the robot until released. To prevent accidental activation, the pause/brake button may be recessed and/or may require a minimum force for activation.

A button on the hand-held controller or a soft button within the GUI can be used to switch controllers, so that another hand-held controller or alternative control device can take over control of the remote vehicle. This can allow multiple operators to control the same remote vehicle.

The pause or brake button may alternatively be designed as a dead man's switch to ensure safe operation of the robot—if the user's finger is released from the switch, the robot ceases to operate. In an embodiment of the invention, the dead man's switch is located under the user's left index finger, right index finger, left middle finger, or right middle finger.

Bumper or rocker buttons are located on the shoulders of the hand-held controller, the buttons making up a rocker control. Two rocker buttons make up a first rocker control on the left shoulder and are oriented vertically, and two more rocker buttons make up a second rocker control on the right shoulder and are also oriented vertically. As an alternative to rocker buttons, one-axis switches may be provided on the left and right shoulders (not shown). The rocker buttons, being aligned vertically along the shoulder of the hand-held controller, are thereby located in a pitch plane parallel to the articulated flipper drive. In an embodiment of the inventions, the rocker control on the right shoulder is used for flipper control.

The directional pad, left joystick, and left shoulder rocker control make up a left control zone. The right button array, right joystick, and right shoulder rocker control make up a right control zone.

A power button is located between the left and right shoulder areas of the hand-held controller. In the illustrated embodiment, the button is circular with a flat protruding surface. The button may optionally be recessed (to prevent inadvertent actuation) and/or backlit with an LED that indicates the state of the hand-held controller (i.e., on or off). In an embodiment of the invention, the area of the hand-held controller immediately surrounding the power button is smooth to facilitate using electrical tape to cover the power button and its LED as needed. Covering the power button can avoid detection of the hand-held controller. The power button on the hand-held controller may control the state of just the hand-held controller, or of a number of other system components, such as the processor and one or more displays (e.g., the head-mounted display).

Figure 3:
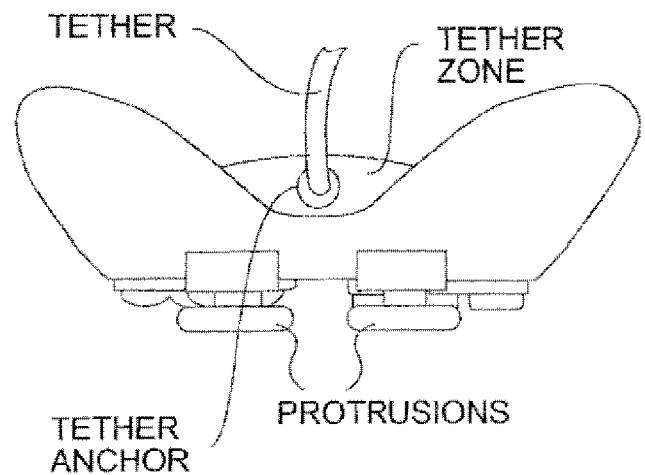
FIG. 3 is a rear view of the embodiment of FIG. 2.

An embodiment of the invention includes a tether zone (see FIG. 3) located between the left control zone and the right control zone, which includes a tether anchor configured to tether the hand-held controller between the left grip and right grip and permit the hand-held controller to hang in use (see FIG. 13) with the left grip and right grip pointing upward. A tether, or cord, extends from the tether anchor, preferably to the right shoulder of a dismounted operator.

In an embodiment of the invention, the tether is detachable from the hand-held controller, and connects the hand-held controller to the processor for non-wireless communication between the two. In an embodiment of the invention, the hand-held controller can operate on battery power and communicates wirelessly with the processor, but has the ability to accept a tether when non-wireless connection is preferred.

In an embodiment of the invention, the tether has a strain relief allowing it to be flexible but also physically support the weight of the hand-held controller and withstand being dropped the a distance equal to the tether's length (e.g., 3 feet) without damage or disconnection.

In an embodiment of the invention, the tether attaches to the hand-held controller via an environmentally sealed connector, such as push-pull, screw latching, etc. The same environmentally sealed connection may be used where the tether connects to the processor. The tether connectors may be keyed to prevent pin misalignment during connection.

FIGS. 5 and 6 illustrate an optional roller wheel that may be provided on the hand-held controller. In an exemplary embodiment, the roller wheel is surrounded by a textured tire and sits in a cavity of the hand-held controller. The cavity is formed in the exterior surface of the hand-held controller and includes an interior shell to encase the roller wheel. An axle extends between two sides of the interior shell and allows the roller wheel to rotate within the cavity. Bushings may additionally be provided to reduce friction and wear. The axle extends into a rotary transducer located on at least one side of the cavity, the rotary transducer measuring rotation of the roller wheel and converting it to a digital output. The location of the roller wheel on the hand-held controller, if provided, may vary, although the wheel is preferable located so that it can be actuated by the user's thumb or forefinger (either left or right). The roller wheel may be used, for example, for camera zoom or to scroll among soft buttons in the GUI.

Figure 7:
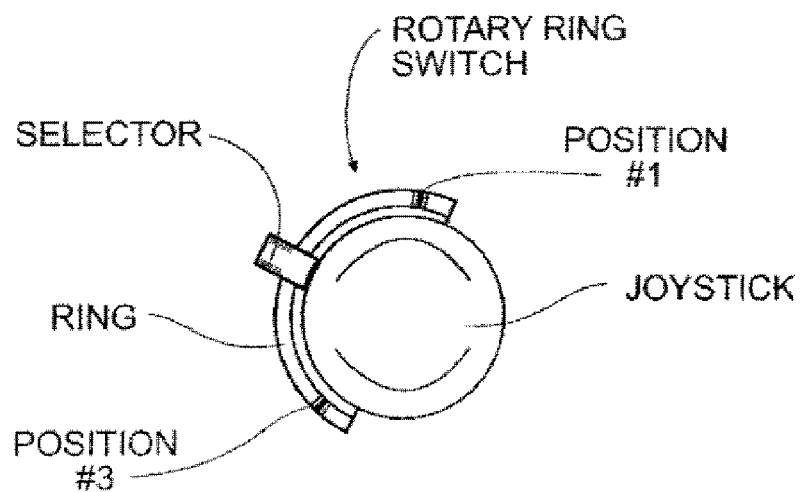
FIG. 7 is a top view of an embodiment of a rotary ring switch for use with the control system of the present invention.
Figure 8:
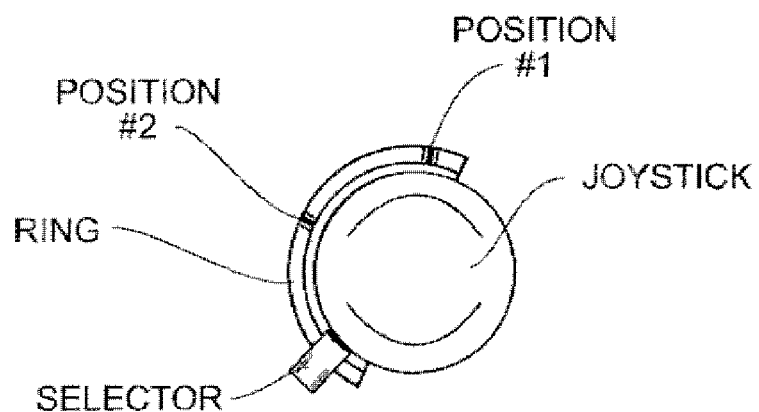
FIG. 8 is another top view of the rotary ring switch embodiment of FIG. 7.
Figure 9:
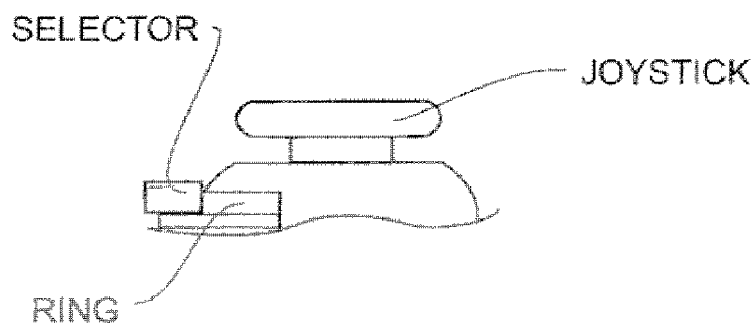
FIG. 9 is a side view of the rotary ring switch embodiment of FIG. 7.

FIGS. 7, 8, and 9 illustrate an optional rotary ring switch. In the illustrated exemplary embodiment, the rotary ring switch is located around a joystick and includes three positions on the ring that may be selected by sliding a selector along the ring to one of the positions. In an embodiment of the invention, the rotary ring switch surrounds the left joystick so that selection is made with the user's left thumb. The rotary ring switch may be used to select among button functions modes.

The present invention contemplates a variety of locations for the ring switch if one is provided, as well as a varying number of positions for selection. For example, the ring switch could surround the right joystick, the directional pad, the right button array, or the center button array.

The present invention contemplates using labels (not shown) on or near the buttons of the hand-held controller to indicate the functionality of one or more of the buttons.

It will be appreciated by those skilled in the art that location and shape of the buttons may vary among embodiments of the invention. The present invention contemplates a variety of button shapes and locations. Additional buttons may be added, or buttons may be removed within the scope and spirit of the invention.

The present invention contemplates additional or alternative functionality for the hand-held controller. For example, the hand-held controller may be able to detect aspects of its own movement via accelerometers and gyroscopes and translate that movement into remote vehicle control functions such as, for example, scrolling through a GUI menu. While the hand-held controller's movement could be translated into corresponding movement of the remote vehicle, such control may not be advisable in certain situations where precise control of the remote vehicle is critical and/or the controller may be subject to unforeseen jostling with potentially hazardous results in terms of corresponding movement of the remote vehicle.

An embodiment of the invention provides mode changing software for changing button mapping of the hand-held controller between, for example, driving a robot, manipulating an arm, controlling a camera, etc.

In an embodiment of the invention, switching among button function modes of the hand-held controller is accomplished by actuating a button or toggle-type switch, preferably using the operator's index finger(s). This can be accomplished using an above-described rotary ring switch, another button on the hand-held controller, or even the optional roller wheel described above. The present invention also contemplates switching button function modes on the left side of the controller which one switch or button, preferably located on the left side, and switching button function modes on the right side of the controller which another switch or button, preferably located on the right side.

According to an embodiment of the invention, button function modes include:

Drive Mode—the left joystick is used to steer the robot forward, back, left, and right, the left button array is used to control the attack camera (for a robot having, for example, a drive camera and an attack camera), the right joystick controls a spooler (for example containing fiber optic cable), the right button array controls a variety of functions such as the camera zoom, robot lights, robot speed, an camera choice (allows user to choose one or more cameras as, for example, primary and secondary), and the right shoulder is for flipper control.

Manipulate (Gripper) Mode—the left joystick is used to move the gripper forward, back, left, and right, the right joystick is used to move the gripper up and down and to fold or unfold the elbow, and the right shoulder buttons are used to rotate the gripper clockwise and counterclockwise.

Target (Attack Camera) Mode—The left joystick is used to move the attack camera forward, back, left, and right, and the right joystick is used to move the attack camera up and down.

Joint Mode—The left joystick folds and unfolds the gripper shoulder (e.g., using the top and bottom buttons), and rotates the turret clockwise and counterclockwise (e.g., using the right and left buttons). The right joystick folds and unfolds two gripper elbows. The left button array controls the attack camera, and the right button array controls a variety of functions such as the camera zoom, robot lights, robot speed, and camera choice. The right shoulder buttons are used to rotate the gripper clockwise and counterclockwise.

Menu (GUI Navigation) Mode—The left joystick navigates a cursor up, down, right, and left, the left button array moves the menu itself up, down, left, and right, and the right button array includes cancel and select functions.

Among the above exemplary button function modes, certain buttons may maintain the same functions, such as the top left button of the center button array being a pause/brake button, and the top right button of the center button array being a menu button. In addition, the button to change among the above functional modes may remain the same. In an embodiment of the invention, the left joystick is always used to drive the remote vehicle and the directional pad is always used to navigate soft buttons of the GUI. It is the other buttons that change functionality among modes.

It should be understood that the present invention contemplates a variety of button mapping scenarios, and a variety of single and combined function modes that allow the operator to control one, two, or more payloads of the remote vehicle with the same hand-held device by manipulating the buttons on the hand-held controller.

In an embodiment of the invention, the weight of the hand-held controller, including the cord, is less than or equal to two pounds. In a preferred embodiment, the weight of the hand-held controller itself is less than one pound, and the dimensions are no larger than 4.5"×2.5"×6.5".

According to an embodiment of the invention, the hand-held controller is ruggedized. For example, the casing and switch plate may comprise aluminum, and the unit or parts thereof may be coated in plastisol or another suitable coating. In addition, the tether connection may be environmentally sealed, and the buttons may additionally be made waterproof as is know to those skilled in the art, particularly in the area of waterproof cameras.

Figure 4:
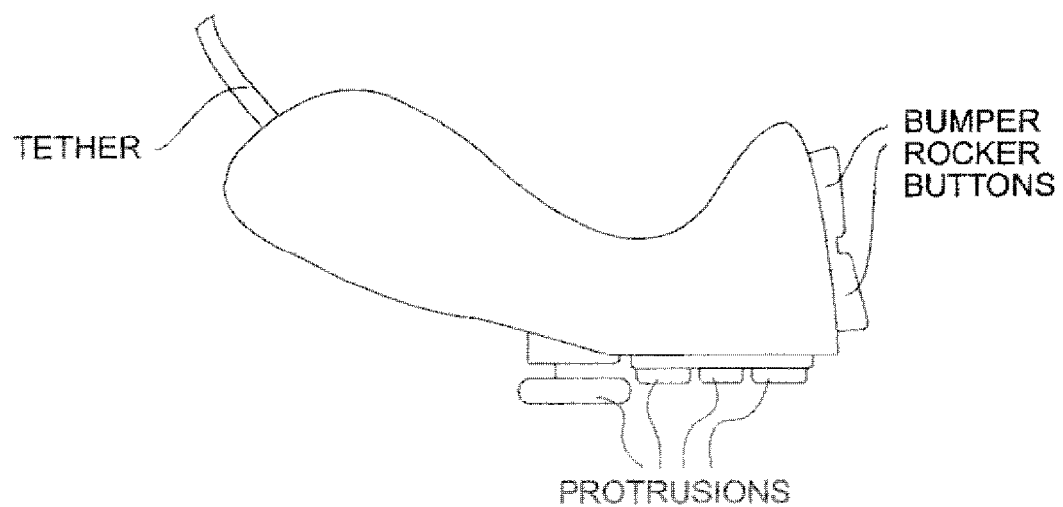
FIG. 4 is a side view of the embodiment of FIG. 2.
Figure 10:
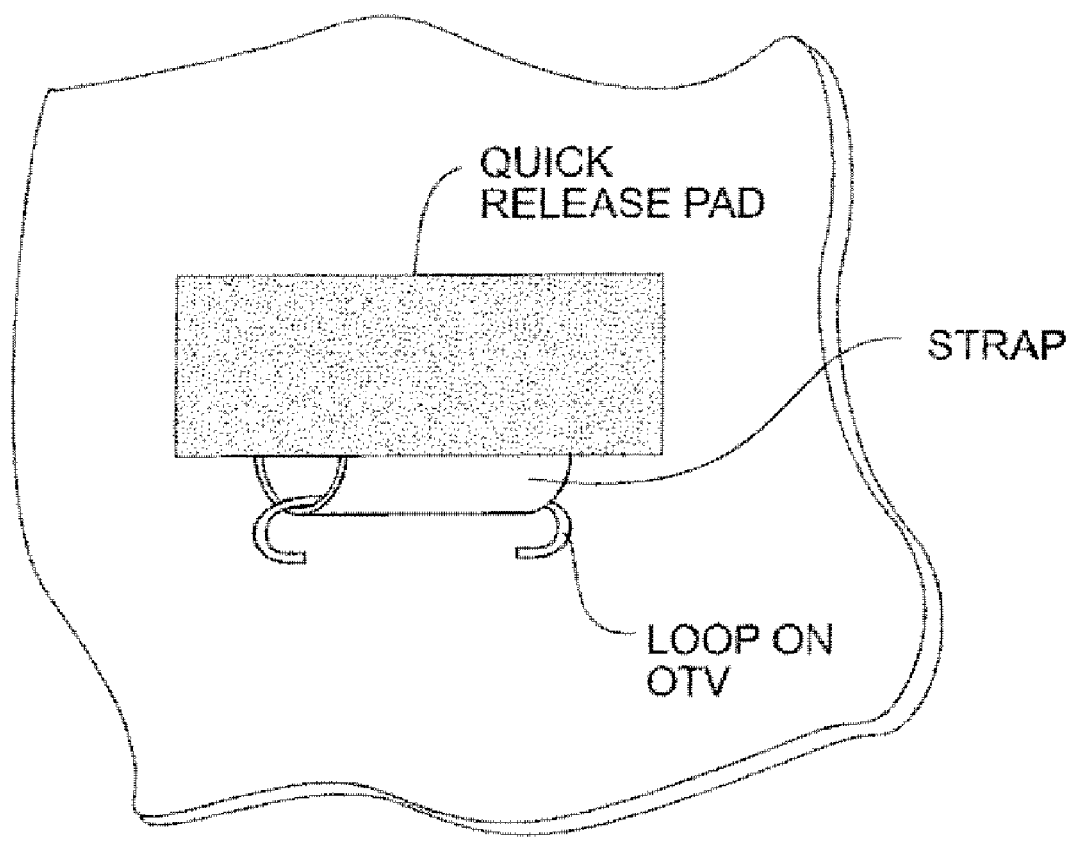
FIG. 10 illustrates an embodiment of a quick-release pad of the control system of the present invention.

For adhering the hand-held controller to the user's gear, an embodiment of the invention includes a quick-release system. An embodiment of the quick-release system includes a quick release pad, an embodiment of which is illustrated in FIG. 10. The quick-release pad preferably comprises Velcro® on an outer-facing side thereof, and has a size suitable to allow releasable but stable attachment of the hand-held controller to the pad. The pad is attached to a loop on the user's gear. In the embodiment of FIG. 10, the loop is a horizontal loop such as those provided on an OTV. A strap connected to the quick-release pad circles through the OTV loop to attach the quick-release pad to the OTV. An additional quick-release mechanism (not shown) may be used to releasably fasten the tether (which connects the hand-held controller to the processor) to the user's gear. Complementary material is located on an underside the hand-held controller to mate with the quick-release pad. In an embodiment of the hand-held controller including protrusions extending from a bottom thereof (see FIGS. 3 and 4), the complementary material is located on the protrusions. In an alternate embodiment with, for example, a flat bottom, at least a portion of the bottom would include complementary material. Because Velcro® can wear out and become less effective, the present invention contemplates the Velcro in the quick-release system being easily replaceable.

The head-mounted display illustrated in FIG. 1 generally indicates a display device worn on a user's head or as part of a helmet, which has a display optic in front of one or both eyes. A typical head-mounted display has one or two displays with lenses and semi-transparent mirrors embedded in a helmet, eye-glasses, or a visor. The display units are miniaturized and may include cathode-ray tubes (CRTs), liquid crystal display (LCD), Liquid Crystal on Silicon (LCos), or an organic light-emitting diode (OLED).

The head-mounted display allows the remote vehicle operator to see what the remote vehicle sees through one or more cameras, so that the remote vehicle can be controlled when it is not within the operator's line of sight, and also allows the operator to maintain situational awareness. In an embodiment of the invention, the head-mounted display is an Icuiti tactical display.

The head-mounted display displays a GUI with views from the robot's camera(s) and information about the robot such as battery life, payloads, communication status, etc., and also displays soft buttons that are mapped to the hand-held controller buttons and allow the user to more intuitively control the robot using the hand-held controller.

The present invention contemplates using one or more head-mounted displays with a single control system. In addition, the video stream from the robot camera(s) can be multi-casted for use by multiple clients. Indeed, the multiple clients need not only be multiple head-mounted displays, but may alternatively or additionally include a variety of displays and/or recoding devices in a variety of locations.

The head-mounted display is preferably capable of either wireless or tethered communication with the hand-held controller through the processor.

As stated above, a menu mode of the hand-held controller allows the user to navigate among soft buttons or icons displayed by the head-mounted display. Exemplary embodiments of the GUI display are illustrated in FIGS. 11 and 12.

Figure 11:
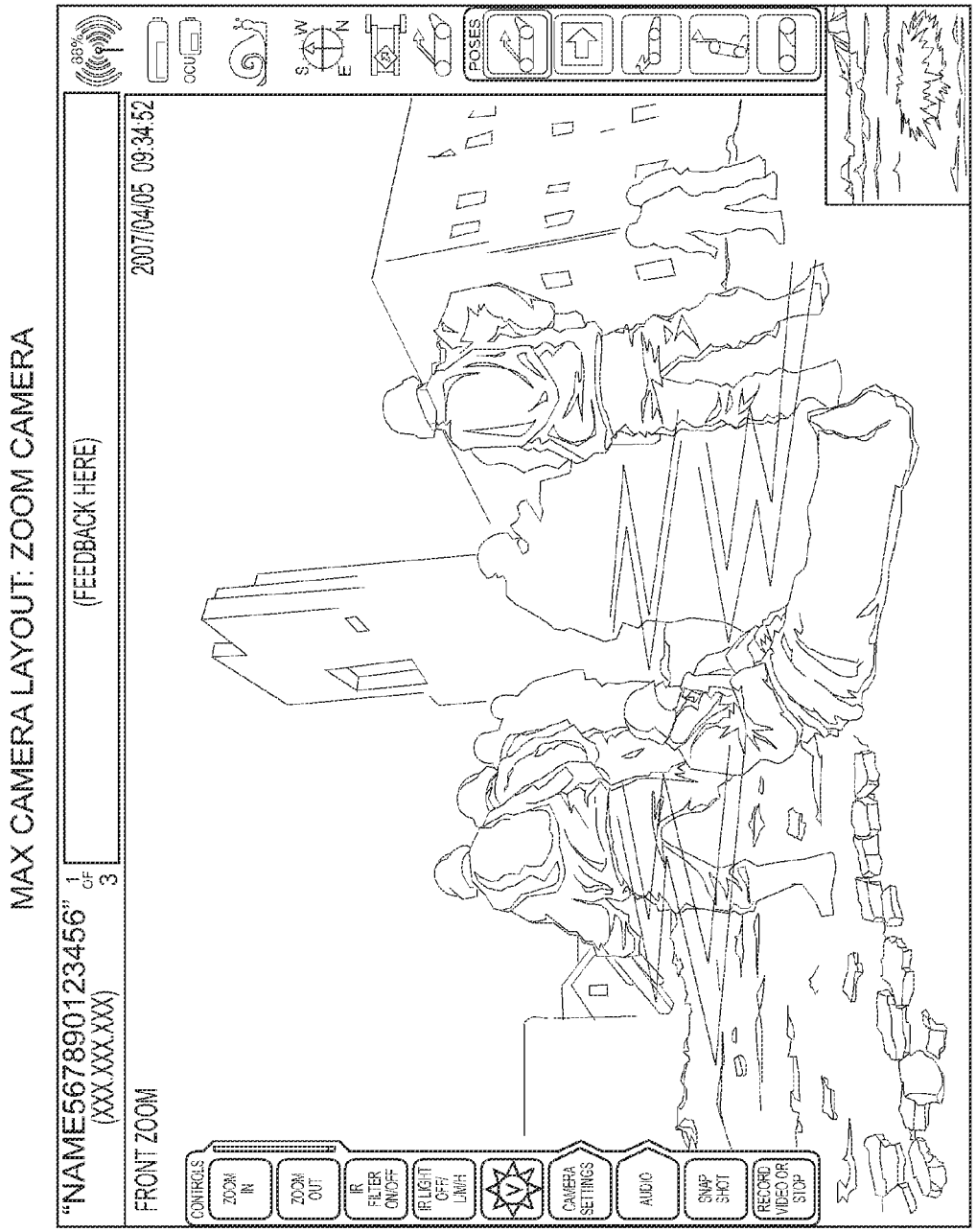
FIG. 11 is an embodiment of a user interface of the control system of the present invention.
Figure 12:
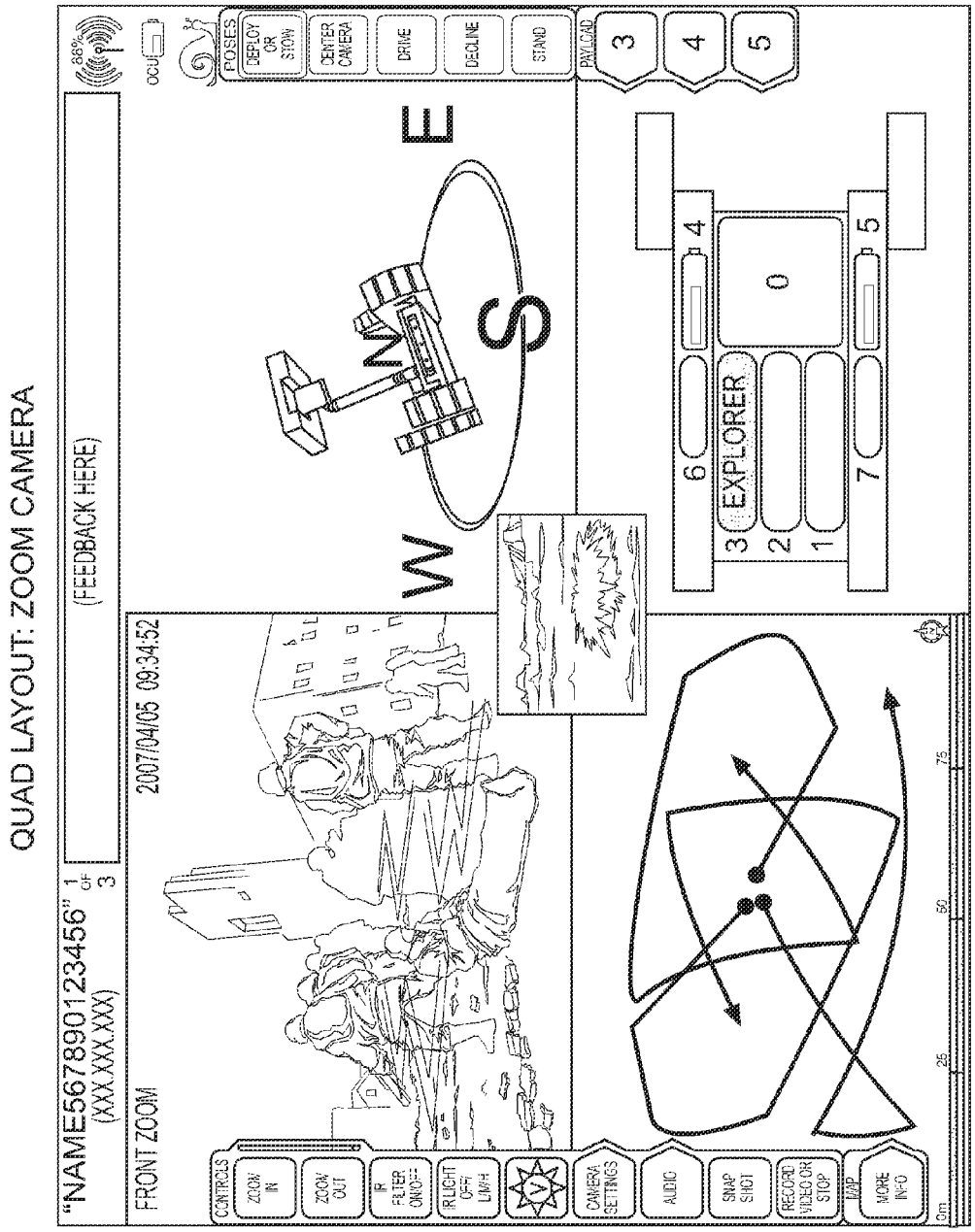
FIG. 12 is another embodiment of a user interface of the control system of the present invention.

As illustrated in the embodiment FIG. 11, the head-mounted display provides the user with a variety of information in what is indicated as a "max camera" layout. In this illustrated embodiment, the main image is a video stream from the robot's attack camera and the smaller image in the lower right corner is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status. In this embodiment, the icons include zoom in, zoom out, IR filter on/off, IR light off/low/medium/high, camera default position (designated in this embodiment as a V in a sun shape), camera setting choices, audio choices, snap shot, and video record on/off. In this embodiment, upon choosing (by pressing the soft button or icon by manipulating the hand-held controller in the menu mode) camera settings and audio, the GUI pops up a screen to select among a variety of setting options. In an embodiment of the invention, the icons can be minimized. Above the status of the camera, the robot's name can be displayed (illustrated herein as "Name567890123456").

The camera may be returned to its default position, or otherwise controlled, via the soft button mentioned above, or a button on the hand-held controller.

Additional icons or soft buttons may be displayed, for example on the right side of the head-mounted display view. In this embodiment, the icons or soft buttons include, from top to bottom, status of communication link (with robot), battery charge level (of the robot and the OCU), speed toggle (wherein the snail icon indicates that the robot is in a slow range of speed within the available scalable range of speed), robot heading, two icons indicating the robot's position and heading, and a variety of autonomous assist options such as predefined poses (described in detail below).

Another embodiment of the system's GUI, indicated as a "quad" layout, is illustrated in FIG. 12. The larger, upper left image is a video stream from the robot's attack camera and the smaller image in the center of the display is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status, as set forth for the prior embodiment. In an embodiment of the invention, the icons can be minimized. Above the status of the camera, the robot's name can be displayed (illustrated herein as "Name567890123456." Under the camera controls is a map icon allowing the user to select additional information from the system's mapping function. To the right of the map icon and under the video stream from the attack camera, mapping information regarding one or more of the robot's prior mission movements can be displayed. Alternatively, the missions of a number of nearby robots are displayed.

Additional icons or soft buttons may be displayed, for example on the right side of the head-mounted display layout. Similar to the previous embodiment, the icons or soft buttons include, from top to bottom, status of the communication link (with robot), battery charge level (of OCU), speed toggle wherein the snail icon indicates that the robot is in a slow range of speed (within the available scalable range of speed), and a variety of autonomous assist options such as predefined poses. In this embodiment, the poses are indicated by name rather that a graphical representation of the pose itself. Payload icons under the pose icons allow the user to activate a payload or bring up a control menu for that payload. They can also display information regarding selected payloads. Possible payloads include cameras, chemical detection devices, sniper detection devices, cable spools, batteries, etc. In the illustrated embodiment, payload 3 is an Explorer extension added to the chassis of the robot, and payloads 4 and 5 are batteries.

To the right of the video stream from the robot's attack camera is a representation of the robot's position and heading, including any tilt. Under the positional representation is an identification of the payloads and information regarding the payloads, such as an indication of remaining battery life.

In accordance with the present invention, the user may choose among a variety of GUI layouts, such as the "max camera" and "quad" layouts described above.

In the above illustrative embodiments of the GUI, the icons or soft buttons may be displayed continuously for the user, who navigates among them using a dedicated set of buttons on the hand-held controller (e.g., the directional pad), or may be displayed only when the hand-held controller is in a menu mode. Additional soft icons or buttons may be displayed as desirable. In an embodiment of the invention, the illustrated icons are displayed continuously for the user, and selection of a menu mode on the hand-held controller brings up an additional hierarchical menu of functions through which the user can navigate, for example, using the directional pad.

In an embodiment of the control system of the present invention, audio is provided on one or more of the processor, the hand-held controller, the head-mounted display, or a separate headset.

The control system of the present invention preferably has two states (on and off) and three modes: (1) training mode; (2) operation mode; and (3) maintenance mode. The modes of the control system are distinct from the button function modes of the hand-held controller. After being powered on, the system may default into an operation mode, default to the last mode selected, or may initially prompt the user to choose among the three modes. Most system functions, including the exemplary functions listed in the table below, are preferably performed in all three modes.

| | |
|---|---|
| Power | On/off |
| | Status |
| Communicate | Communicate with robot |
| | Status of communications |
| | Tethered and wireless communication |
| Control | Drive/stop |
| | Brake engage/release |
| | Speed control |
| | Flipper control |
| | Head/neck control |
| | Pose selection |
| | Camera selection |
| | Camera zoom |
| | Camera control options including aperture/exposure/resolution/black and white/color/etc. |
| | Microphone control on/off/speak |
| | Speaker control on/off/volume |
| | Request information/status/data |
| | Illumination on/off/other |
| | Select options |
| | Select robot |
| | Payload control |
| | Map controls (autonomous robots or assistance) |
| | Autonomy controls |
| Display | Display video |
| | Display health and status (system) |
| | Display options |
| | GPS location/navigational information |
| Audio | Emit |
| | Send |
| | Adjustment options |
| Process | Process data/audio/video |

The system is intended for use by a dismounted operator, dismounted means that the operator is freely moving about outside of the remote vehicle(s). However, the system may additionally be used by an operator that is not dismounted. The system of the present invention may be useful to an operator that is not dismounted in an instance where the operator has difficulty reaching all of the controls needed to operate the vehicle and its payloads, or the vehicle and other remote vehicles.

The system of the present invention should be capable of controlling remote vehicle mobility, executing operator tasks with one or more remote vehicles, and supporting maintenance functions.

Figure 13:
FIG. 13 illustrates an exemplary use of the control system of the present invention with a remote vehicle.

FIG. 13 illustrates a soldier using the control system of the present invention to control a robot. Although the robot is illustrated to be in the soldier's line of sight, the present invention is directed to non-line-of-sight operation as well, with the solder using the head-mounted display to see what the robot sees and thereby effectively control the robot.

Figure 13A:
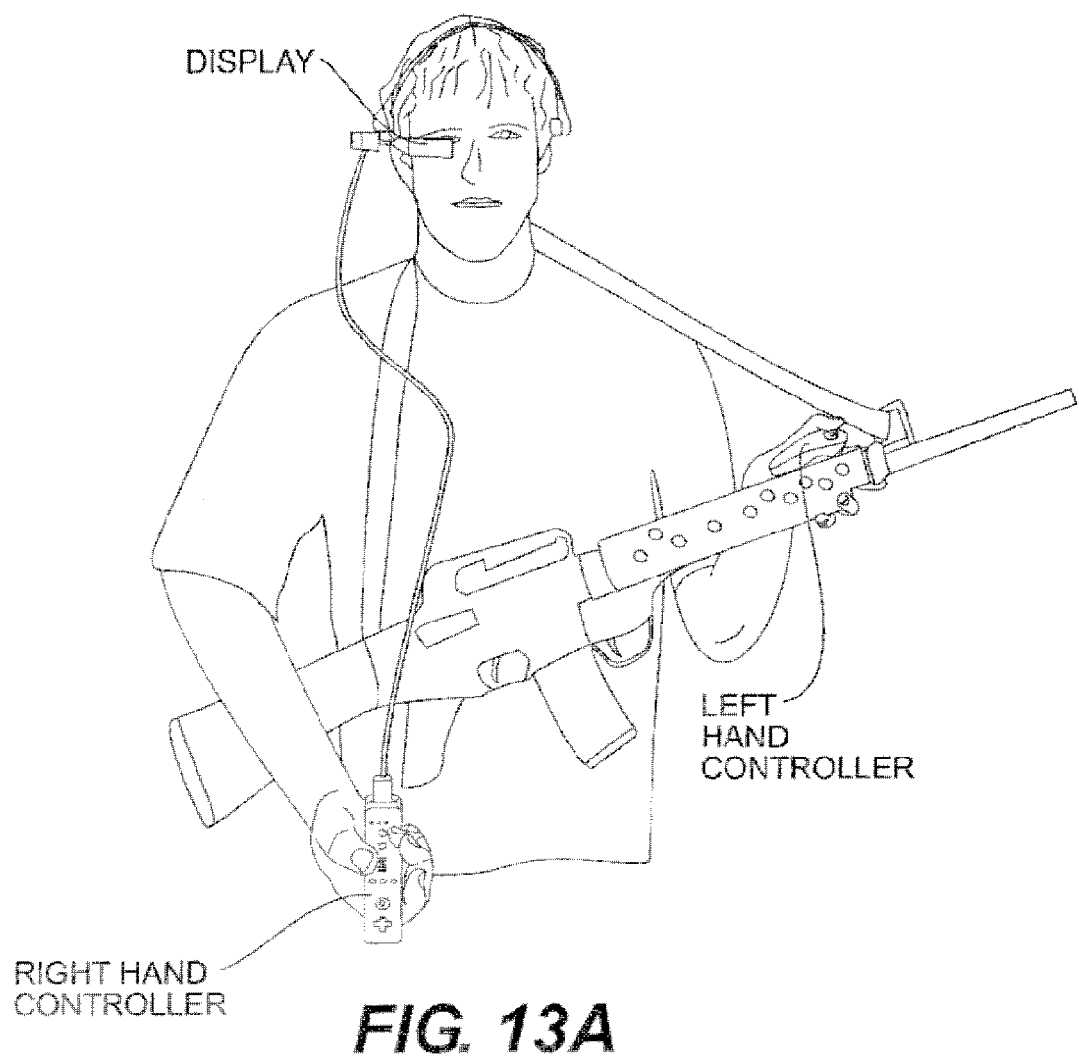
FIG. 13A illustrates an embodiment of the invention including a two-piece hand-held controller.

FIG. 13A illustrates an embodiment of the invention including a two-piece hand-held controller that functions substantially similar to the one-piece hand-held controller described above. This embodiment of the invention allows the left portion of the controller to be attached to the user's gun, so that one hand can remain on the gun while controlling the remote vehicle.

Figure 13B:
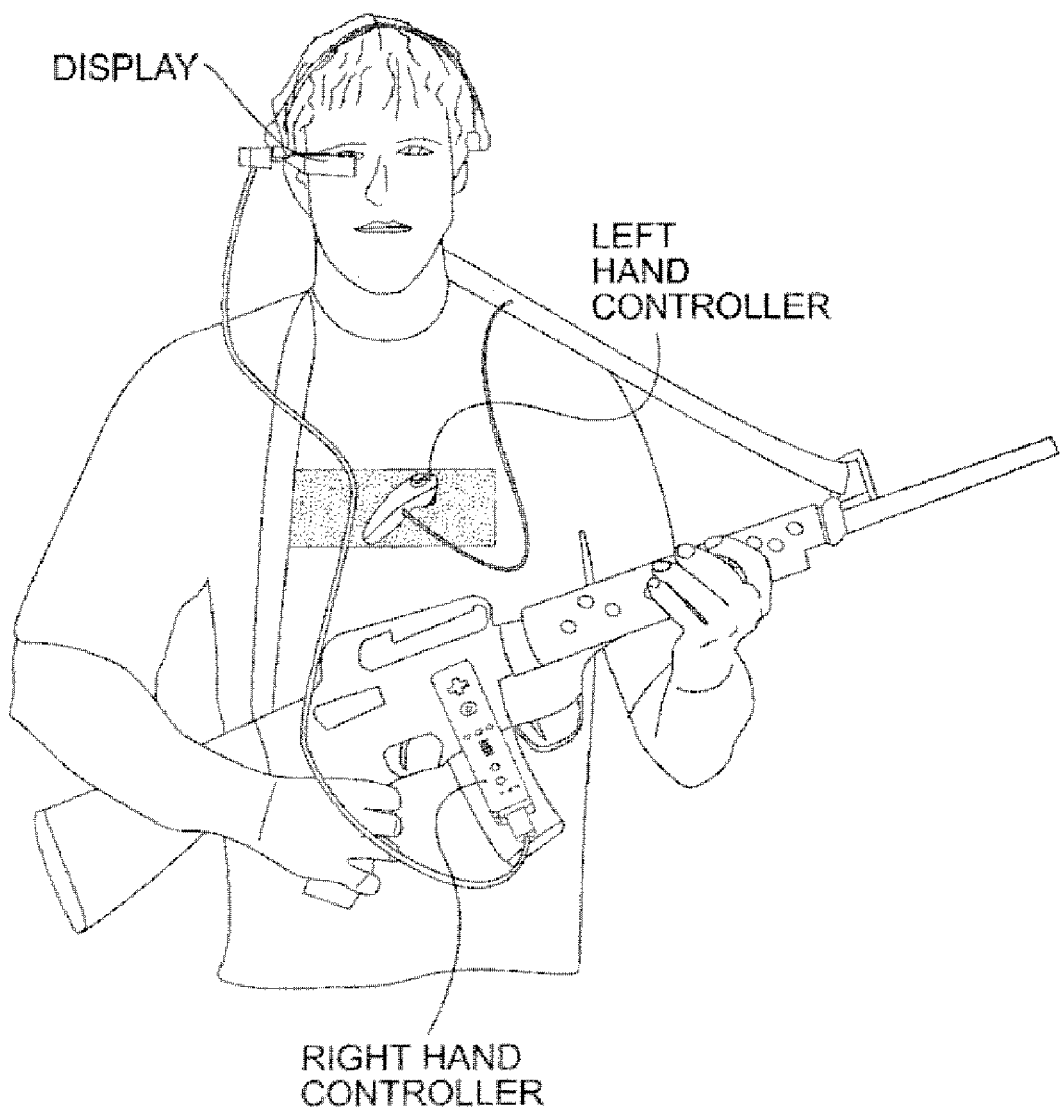
FIG. 13B illustrates another embodiment of the invention including a two-piece hand-held controller.
Figure 13C:
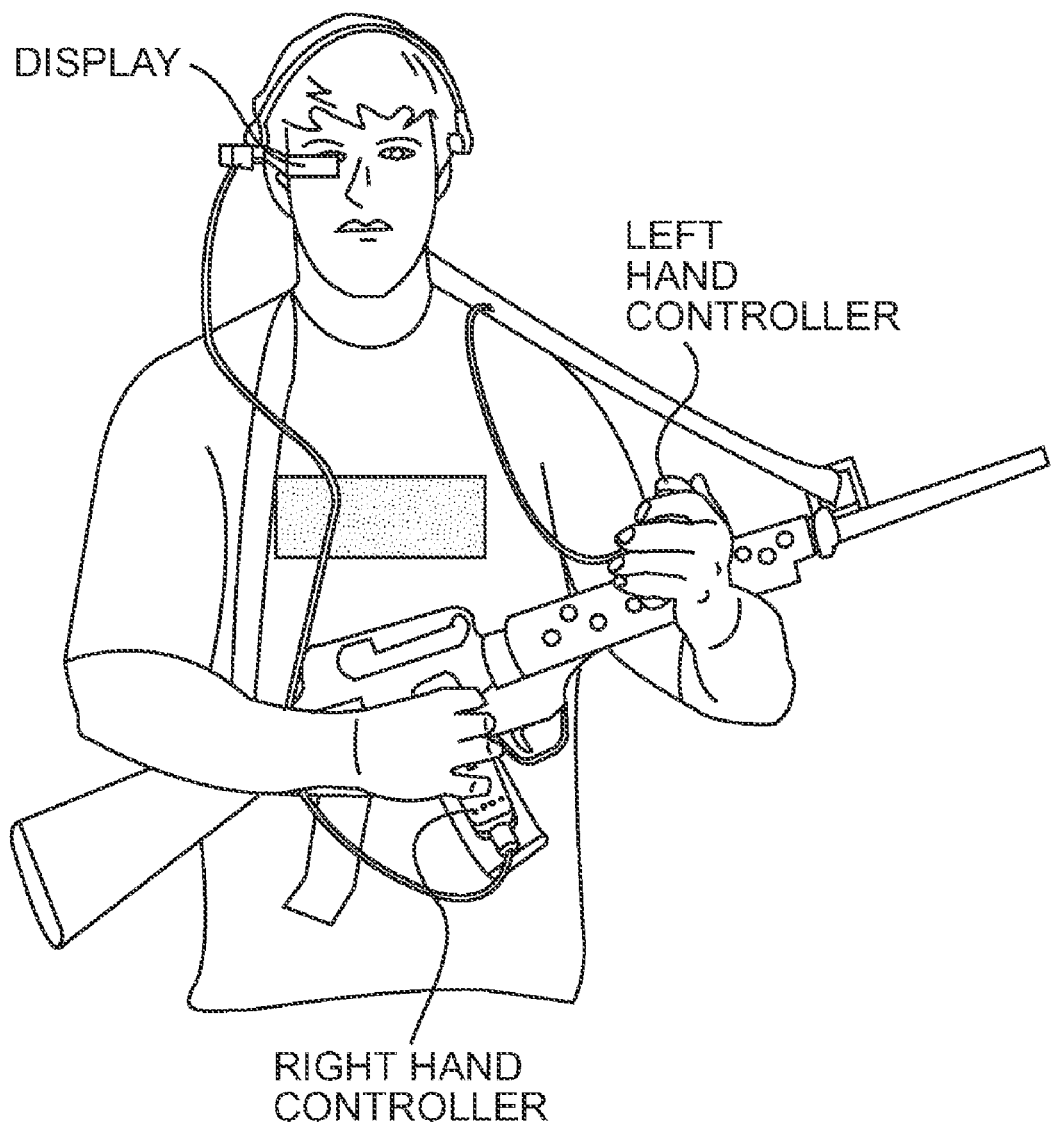
FIG. 13C illustrates another embodiment of the invention including a two-piece hand-held controller.

FIGS. 13B and 13C illustrate another embodiment of the invention including a two-piece hand-held controller. In this embodiment, the right hand controller is mounted to the gun and the left hand controller can be secured to a quick-release pad. The left hand controller would preferably hang from the user's left shoulder. This embodiment would be preferably where a user is trained to or tends to keep his firing hand on the gun.

The controller may have a variety of shapes and sizes to facilitate ease of gripping and actuation by a user. For example, the one or both pieces of the controller may include a grip portion shaped to be held between a little finger, a ring finger, and the ball of a thumb of a respective hand, leaving the index finger, middle finger, and thumb of the respective hand free to manipulate controls. One or both pieces of the controller may include a joystick t be manipulated by the user's thumb. The two-piece hand-held controller may include the same number of buttons as the one-piece controller above, or may include a more limited number of buttons.

In an embodiment of the two-piece hand-held controller, the two pieces may be mated to form a one-piece hand-held controller for use as described above. In this embodiment, the two pieces may look more like halves of the one-piece hand-held controller illustrated in FIG. 2.

As in the prior disclosed embodiments, the hand-held controller communicates with the display via a processor (not shown).

Remote vehicles can utilize a number of autonomous behaviors that can be implemented automatically or via the control system, such as via the GUI icons described above. Such behaviors, illustrated in FIG. 14, can be categorized as: (1) ballistic behaviors that autonomously execute once within a defined operating period; (2) semi-ballistic behaviors that execute once within a defined operating period and that operate autonomously while allowing for manual control during execution; or (3) persistent behaviors that execute continuously and autonomously while allowing the operator to manually control other behavior(s) of the remote vehicle. In an embodiment of the present invention, the autonomous behavior(s) may begin by either responding to sensor output and autonomously starting the behavior, responding to operator input via the depression of a key, soft key, or other actuator included the control system described above, or by responding to other behavior output.

An embodiment of the present invention provides the operator with varying levels of autonomy so that the operator may control the remote vehicle at times and choose to allow the remote vehicle to operate autonomously at times or concurrently. Autonomous behaviors that execute one-time operations simplify operator manipulation of the remote vehicle when such operation includes monotonous or difficult tasks.

Figure 14:
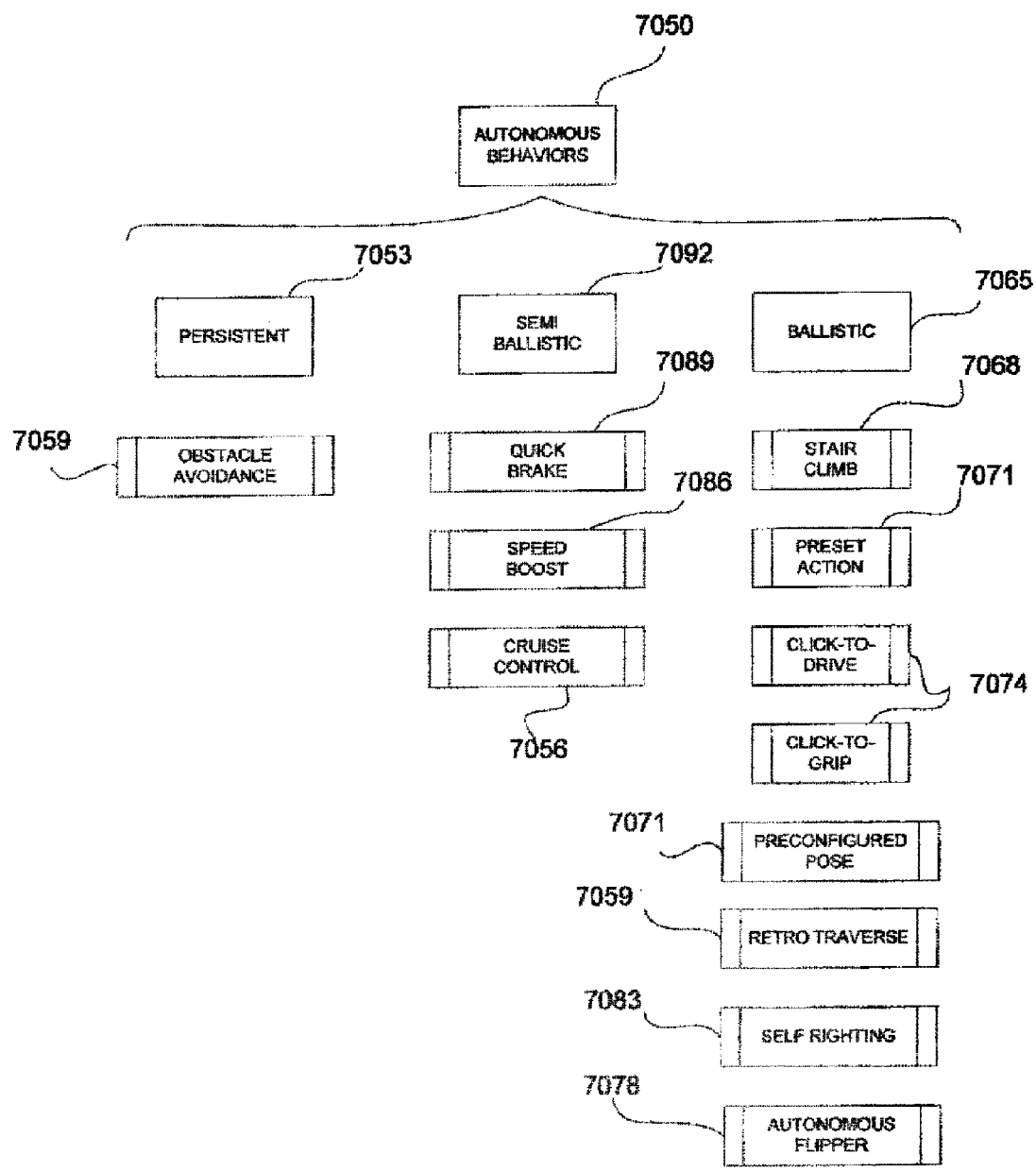
FIG. 14 is a block diagram illustrating an exemplary embodiment of autonomous behaviors.

FIG. 14 is a block diagram illustrating an exemplary embodiment of autonomous behaviors available to an operator and included within the remote vehicle's control system. Included within the control system manipulated by the operator is a software array of behaviors organized under a main autonomous behavior 7050 and fanning out into the various subtypes of autonomous behavior. In particular the main autonomous behavior 7050 identifies in memory three main subtypes of behaviors: ballistic behaviors 7065, semi-ballistic behaviors 7092 and persistent behaviors 7053. An embodiment of the present invention includes the capability to provide all three types of behaviors, but the present invention also contemplates providing only one or two types of behaviors. Ballistic behaviors 7065 comprise a particular behavior routine that executes for a finite period of time when the behavior is activated. Activation of a ballistic behavior 7065 causes that particular behavior's status to indicate that the behavior is active, and further causes that behavior to put in a vote to the actuator to gain control of its associated actuators. Exemplary ballistic behaviors 7065 include: stair climbing 7068, preset action sequence 7071, click-to-drive or click-to-grip 7074, custom pose presets 7077, autonomous flipper routine 7078, retro traverse 7080, and self-righting 7083.

Figure 15:
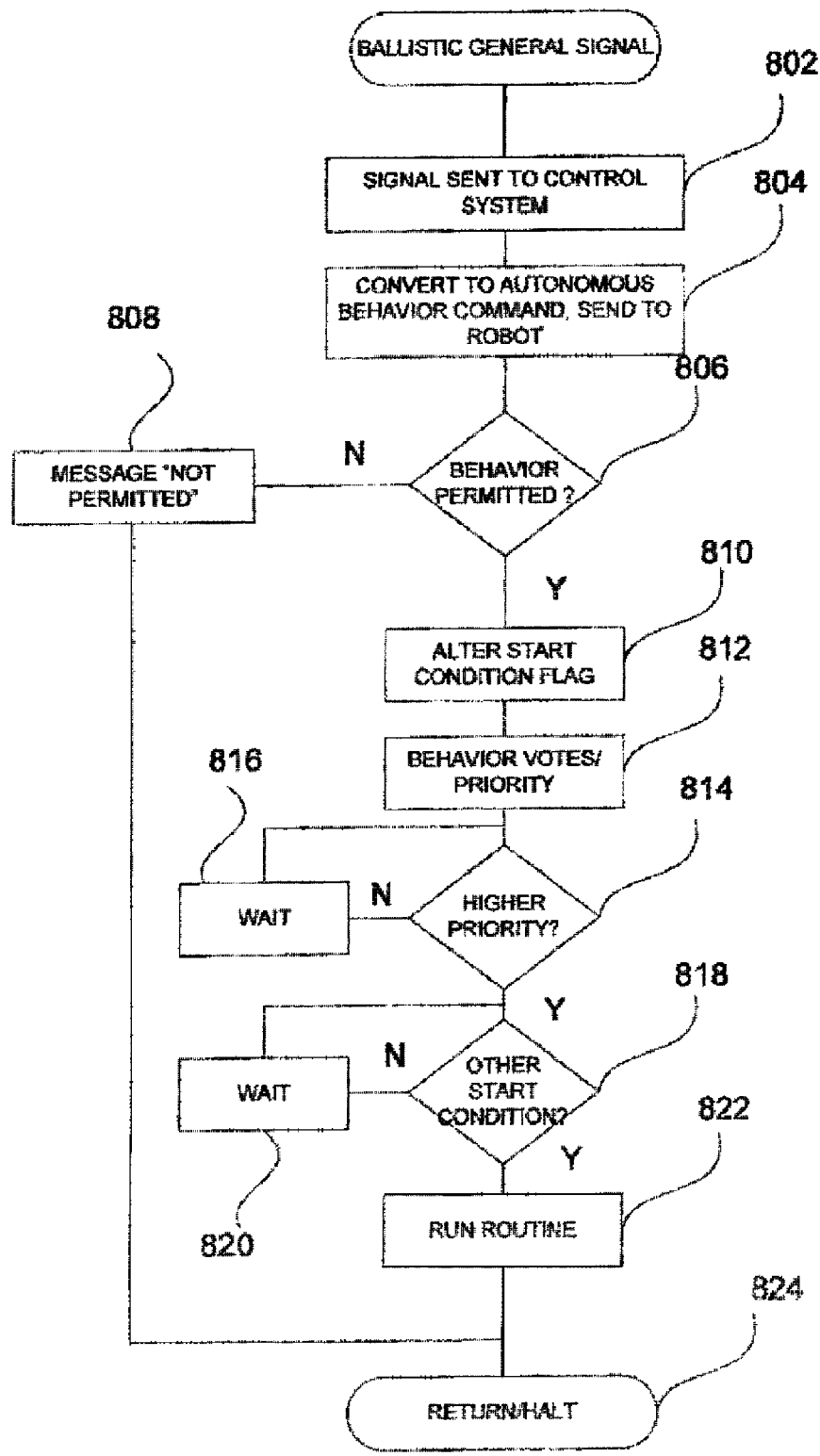
FIG. 15 is a flow diagram illustrating an activation routine used to activate a ballistic behavior and its associated routines.

FIG. 15 is a flow diagram illustrating an activation routine used to activate a ballistic behavior and its associated routines. To activate the behavior, the operator must actuate a control system button, switch, etc. to generate an associated signal, and the signal is transmitted 802 to the control system. The control system then calculates a command 804 representative of the actuated button, switch, etc. and sends the command to the remote vehicle via a communication connection. Once the command is received by the remote vehicle, the remote vehicle's control system 1155 (see FIG. 21) executes a routine to determine if the behavior is compatible 806 with the remote vehicle's current state. This means that the executed routine will evaluate all sensor output to determine whether or not the remote vehicle's position within its environment, the current internal state of the remote vehicle, the current operational behavior on the remote vehicle, or the remote vehicle's environment are incompatible with the chosen behavior. If the behavior is not okay to run (not permitted), the remote vehicle generates feedback information 808 that is sent to the user, alerting the user to the behavior's incompatibility. The ballistic behavior activation routine is then exited 824.

If the behavior is compatible (permitted), the remote vehicle changes the start condition of the chosen behavior to a positive value 810, causing the behavior to turn on. Once turned on, the behavior sends a vote to the arbiter 812 requesting control of its associated actuators. If the behavior has a higher priority than the behavior currently in control of the actuators 814, the remote vehicle will gain control of the actuators and wait for a second start condition (explained further below). If the behavior doesn't have a higher priority than the behavior currently in control of the actuators 814, the behavior will wait 816, and send another vote 812 to the arbiter. The behavior will continue to do this until it gains control of the actuator. Should the behavior have control of the actuator, and its second start condition is true 818, then the software routines included within the behavior will execute 822. When finished executing, the routines will alter the behavior's start conditions to a false or stop status effectively halting the behavior 824.

If the remote vehicle's second start condition 818 is not true, the behavior will wait 820 until such a condition is true. A second start condition check 818 is included to accommodate those behaviors that may be in a perpetual start mode, but that are not activated until they receive particular sensor information. Alternatively, the second start condition check 818 could be used to activate routines within behaviors that are currently in an "on" state. An example of the above routine includes starting the stair climbing behavior which can be accomplished by, for example, depressing a soft button included on the screen, which in turn creates 800 and sends 802 a signal to the control system. The control system interprets the signal as indicating the start of stair climbing, and creates and sends a command 804 to the remote vehicle indicating that the stair climbing behavior should be activated. A routine within the remote vehicle's control system 1155 then determines whether or not the remote vehicle is able to execute stair climbing 806.

In response to an allowance of execution of stair climbing, the routine will then alter the stair climbing behavior's first start condition 810 to a positive or true value and the stair climbing behavior will begin to send votes to the arbiter requesting control over the drive motors, tilt sensor, and other actuators and circuits involved in stair climbing. When the arbiter determines that stair climbing has the highest priority 814, stair climbing will then check to see if its second start condition is true. Such a start condition could include such input as the positioning of a target location over the stair case using a selection graphic included on the display screen. Once the target location is input, a message could be sent to the remote vehicle indicating that the second start condition is true 818 and further causing the routines within the stair climbing routine to execute 822. During the time period between gaining actuator control and realizing a second start condition, the stair climbing behavior will wait 820. Once the robot has reached the top of the stairs, as indicated by the tilt sensor, an end condition is reached and the stair climbing behavior resets its flags to a stop or negative start condition which effectively halts and stops 824 the stair climbing behavior.

Activation of a semi-ballistic or interactive behavior 7092, on the other hand, can cause one of either an alternative version of a pre-existing behavior to execute, or a one-time tuning behavior to execute. For example, a behavior or routine that starts a fire-and-forget process for a limited time (or stopped by a particular detection) but that permits user interaction or partial tele-operation during its course (in contrast to what is referred to herein as a "ballistic" behavior, which generally proceeds for a specific time period or until finished but would be interrupted and terminated by tele-operation intervention. Similar to ballistic behaviors 7065, alternative embodiments of the invention can include more or less semi-ballistic behaviors in the semi-ballistic set, or can not include a semi-ballistic behavior set 7092 within the autonomous behaviors 7050. Semi-ballistic behaviors 7092 may include, for example, quick brake 7089 and speed boost 7086. In an embodiment where the semi-ballistic behavior 7065 is used to fine tune another behavior, the behavior chosen to be fine tuned can either be selected by the operator via pressing a button, selecting a behavior on the display via soft keys, a mouse, or controller, or there could be a behavior pre-associated with a particular semi-ballistic behavior. Fine tuning a behavior preferably includes altering calculations within a routine included within a behavior, or altering variables included within the behavior.

Figure 16:
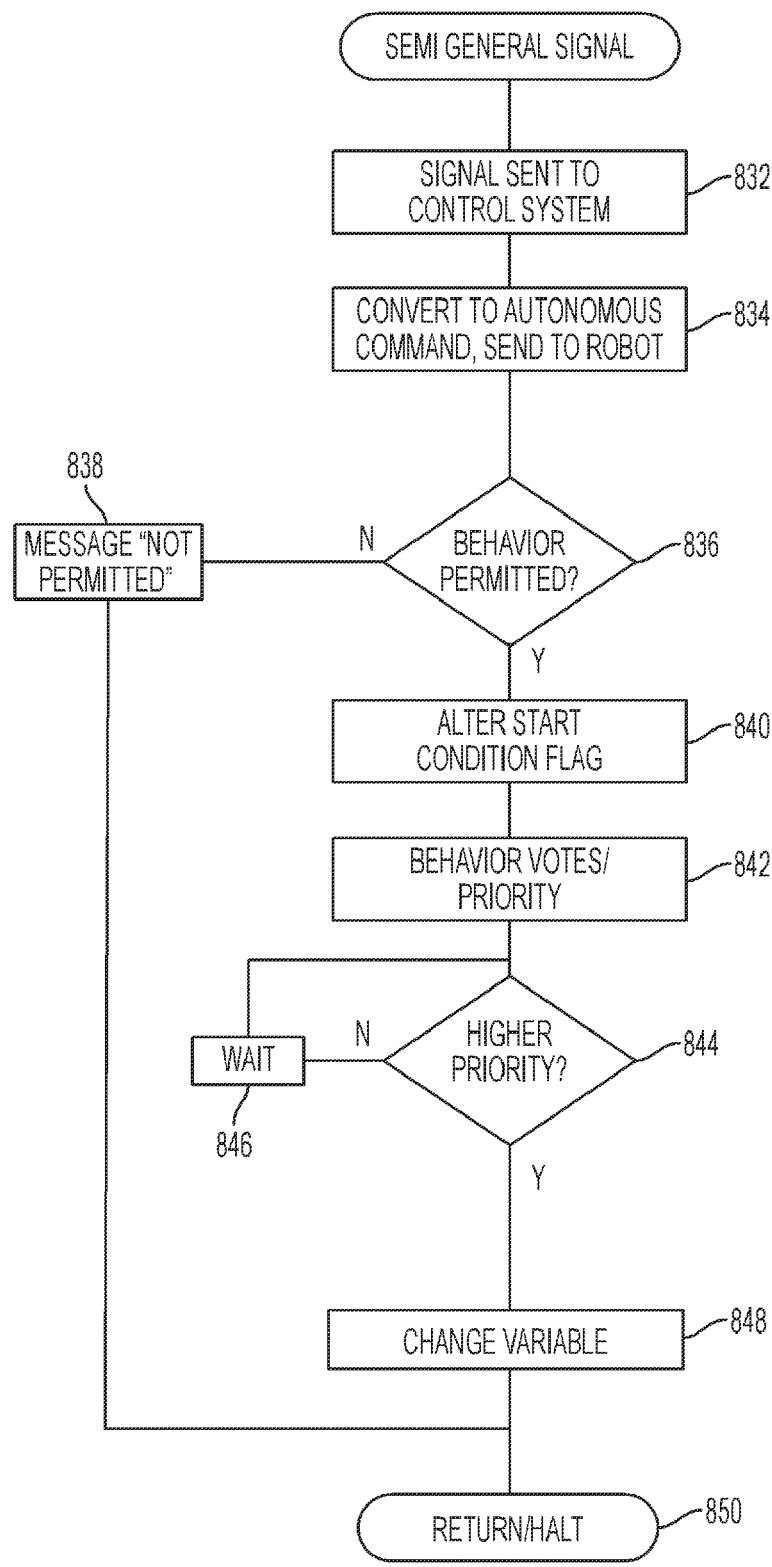
FIG. 16 is a flow chart illustrating a routine for activating a semi-ballistic behavior used to tune a behavior.

FIG. 16 is a flow chart illustrating a routine for activating a semi-ballistic behavior used to tune a behavior. To activate the behavior, the operator actuates a control system button or switch, which generates a signal associated with that particular button or switch 830. The signal is transmitted 832 to the control system, which calculates a command 834 representative of the actuated button or switch and sends the command to the remote vehicle via a communication connection. This command includes information indicating that the semi-ballistic behavior should be activated, along with information indicating which behavior the semi-ballistic behavior should be applied to. Once the command is received by the remote vehicle, its control system 1155 executes a routine to determine if the behavior is compatible 836 with the remote vehicle's current state. This means that the executed routine will evaluate all sensor output to determine whether the remote vehicle's position within its environment, its current internal state, its current operational behavior, or its environment are incompatible with the chosen behavior.

If the behavior is not okay to run (not permitted), the remote vehicle generates feedback information 838 that is sent to the user, alerting the user to the behavior's incompatibility, and the ballistic behavior activation routine is exited 850. Should the behavior be compatible (permitted), the remote vehicle changes the start condition of the chosen behavior to a positive value 840, effectually causing the behavior to turn on. Once turned on, the behavior sends a vote to the arbiter 842 requesting control of its associated actuators. If the behavior has a higher priority than the behavior currently in control of the actuators 844, then the remote vehicle will gain control of the actuators. If the behavior doesn't have a higher priority than the behavior currently in control of the actuators 844, then the behavior will wait 846, and send another vote 842 to the arbiter. The behavior will continue to do this until it gains control of the actuators. Once the behavior has control of the actuator, the routine within the behavior 848 will execute.

The routine selects the chosen behavior to be altered and tune variables or routines included within the behavior according to the routine within the semi-ballistic behavior. Once the routine within the semi-ballistic behavior finishes altering the chosen behavior, the routine alters the semi-ballistic behavior's start conditions to a false or stop status, effectively halting the semi-ballistic behavior 824. An example of a semi-ballistic behavior is the speed boost behavior 7086 which has a chosen behavior already associated with it, the drive behavior. When an operator actuates the button or switch associated with speed boost, a signal is created 830 and sent 832 to the control system, where the signal is converted into a command that is sent to the remote vehicle via a communication link 834. Once the remote vehicle's control system 1155 receives the command, a routine included in the remote vehicle's control system determines whether or not speed boost is compatible with the remote vehicle's current state. For example, should the remote vehicle currently be climbing stairs, the routine may alert the user that speed boost cannot be activated. When speed boost is okay to activate 836, the start condition in the speed boost behavior is set to a positive start value 840, and speed boost begins sending in votes 842 to an arbiter (see FIG. 31) to gain control of the actuators associated with the drive behavior. Once speed boost is determined to be the highest priority behavior, the routine within speed boost will then alter 848 any one of a speed range or velocity value within the drive behavior. Upon completing the change, the routine within speed boost alters speed boost's start condition to a negative value and the speed boost behavior halts and turns off speed boost 850.

Also included within the autonomous behaviors 7050 are persistent behaviors 7053, which include behaviors that can be turned on and kept on via an always true first start condition. A persistent behavior is activated via a proper second start condition. Persistent behaviors 7053 start when the remote vehicle is powered up and can be stopped by actuating a control system button, switch, etc. An embodiment of the invention includes a persistent behavior set 7053 including an obstacle avoidance 7059 behavior. While shown as a semi-ballistic behavior in FIG. 14, cruise control can alternatively be a persistent behavior.

Figure 17:
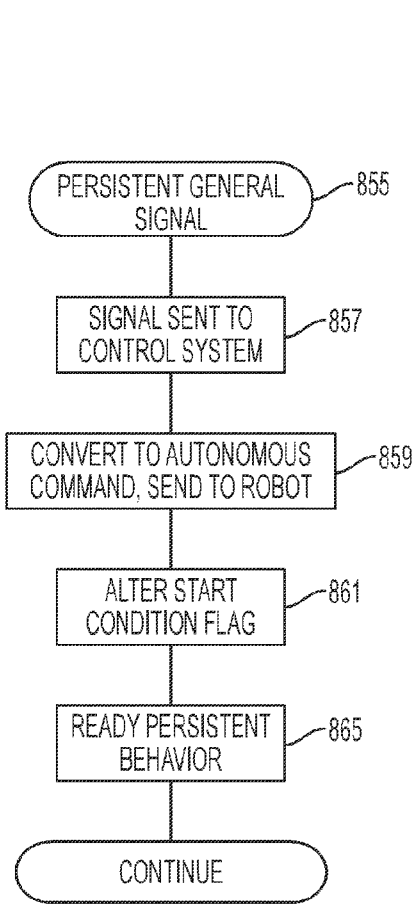
FIG. 17 is a flow chart illustrating a routine to activate or de-activate a persistent behavior.

FIG. 17 is a flow chart illustrating a routine to activate or de-activate a persistent behavior. To de-activate a currently activated persistent behavior, the operator actuates a control system button, switch, etc. generating a signal that is transmitted 857 to the control system. The control system then calculates a command 859 representative of the actuated button, switch, etc. and sends the command to the remote vehicle via a communication connection. According to an embodiment of the invention, the command either includes a start or stop command that causes the persistent behavior to have an on or off state. When on, the behavior will execute in response to sensor and system input. When off, the behavior will not execute.

Once the command is received by the remote vehicle, the remote vehicle's control system 1155 relays the command to the proper behavior, which causes the behavior's first start condition to be altered. When the command indicates that the persistent behavior should be turned on, the start condition will be changed to a positive or on condition. When the command indicates that the persistent behavior should be turned off, the start condition will be changed to a negative or off condition. Depending on whether the condition was made positive or negative, the persistent behavior will either start or stop 865. In an embodiment where persistent behaviors have an initial positive start condition, an operator will need to turn off the behaviors after the remote vehicle is powered up to keep the persistent behaviors from executing in response to system and sensor output.

Figure 18:
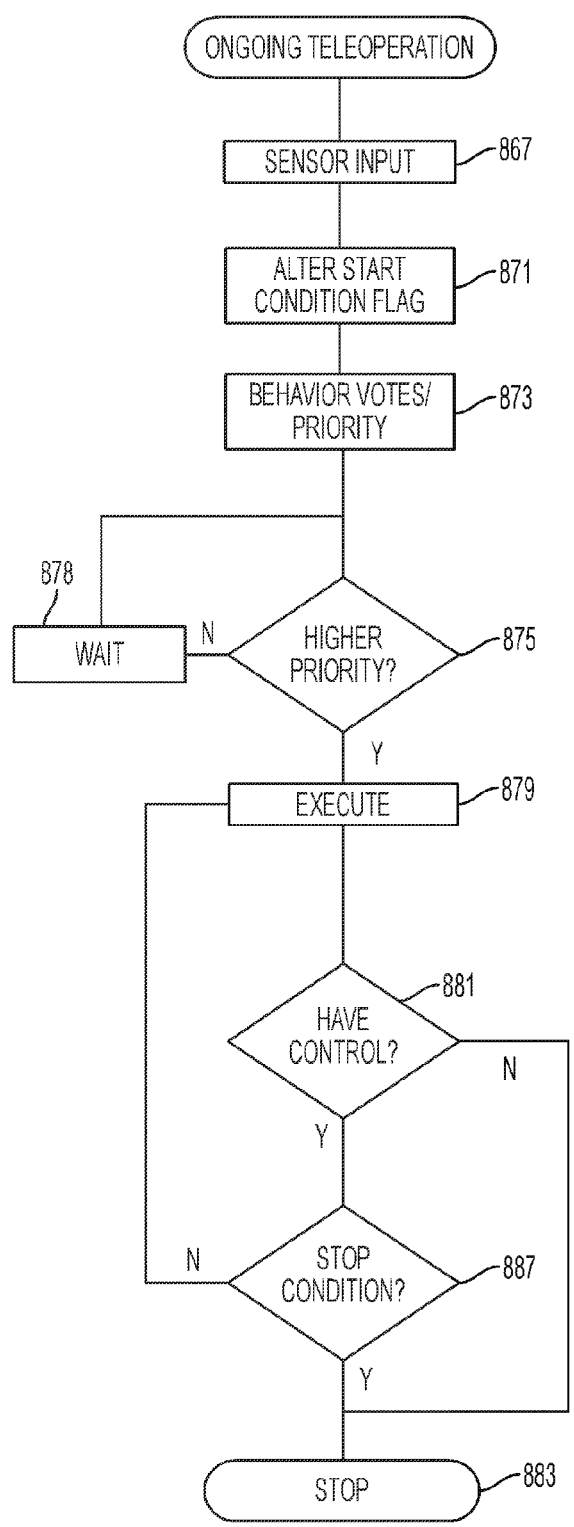
FIG. 18 illustrates the execution of routines within a persistent behavior.

FIG. 18 illustrates the execution of routines within a persistent behavior when the routines' second start condition is activated by system or sensor output. The flowchart in FIG. 18 assumes that the persistent behavior's first start condition is true, and has been true as a function of its "always on" characteristic. To initiate the execution of the persistent behavior, sensor or system output must be sent 867 to the persistent behavior by the remote vehicle's control system 1155. If such output is of the type that will cause the remote vehicle's second start condition to become positive, the persistent behavior's second start condition flag will be changed 871 to a positive or start value and the persistent behavior will begin to send votes 873 to the arbiter to gain control of the behavior's associated actuators and manipulators. If the behavior has a higher priority than the behavior currently in control of the actuators 873, then the behavior will gain control of the actuators. If the behavior doesn't have a higher priority than the behavior currently in control of the actuators 875, then the behavior will wait 878, and send another vote 873 to the arbiter. The behavior will continue to do this until it gains control of the actuators or manipulators. Should the behavior have control of the actuator, the routine within the behavior will execute 879. The routine will continue to execute until it loses control over the actuators 885, in which case one of the first or second start condition flag is changed to a negative or stop value 887 which causes the behavior to stop 883. If the first start condition flag changes to a negative or stop value, the behavior is disabled. In an embodiment of the invention, the behavior can thereafter be restarted using the routine displayed in FIG. 17. If the second start condition flag is changed to a negative or stop value, the behavior will stop until it detects sensor or system output that causes the behavior to start again.

An example of a persistent behavior is obstacle detection (avoidance) 7059, which is always on unless an operator actuates a control system button, switch, etc. for altering the first start condition of the obstacle detection behavior. When actuated, a signal is generated and sent 857 to the control system, where a representative command is sent 859 to the remote vehicle. Once received by the remote vehicle, the command is relayed to the obstacle detection behavior where it changes the first start condition flag 861 to a negative value. This change of value causes the obstacle avoidance behavior to be disabled. If the obstacle detection behavior remains on, and a sensor detects an obstacle, the sensor output is sent to the obstacle detection behavior 867, where it causes the obstacle detection behavior's second start condition flag to change to a positive or on state 871. Upon the second start flag's change in state, the obstacle detection behavior sends votes 873 to the arbiter to gain control of the drive assembly, actuators, and assemblies needed to avoid obstacles. When the arbiter determines that obstacle detection has the highest priority 875, obstacle detect then executes it routines 879. While executing, the behavior checks to make sure that it has control of the actuators 885, and halts the routines and behavior 883 when it loses control. The behavior also checks to see if the second or first start conditions have changed, and if they change from positive to negative, then the routines and behavior halt 883.

The above description of ballistic, semi-ballistic and persistent behaviors is exemplary. The present invention contemplates implementing other versions of the behaviors. For example, steps 879 through 887 of FIG. 18 may be substituted into the ballistic and semi-ballistic routines for steps 848 and/or 822.

Tutorial Routines

In an embodiment of the invention, the software included in the control system also includes tutorial routines able to perform the characteristics of a training system. The tutorial routines could include a storage bank for providing cells of storage to each mission for which the operator indicates that training information should be recorded. The training information can more aptly be called macros in that it records, according to a timeline, an environmental set of variables, a command set, and a set of system variables. Preferably, the command sets include both commands sent by the operator and commands generated and sent by routines within the remote vehicle's control system 1155. The command sets and variables are recorded as use routines able to recreate the recorded action according to a proper timeline. When a recorded mission is replayed, the use routines included in the macro are executed, which causes the control system to display information to the user as though it were sensing the recorded environmental and system sensor information, and further causes the remote vehicle to mobilize according to the recorded commands. The result is a replaying of the events of the mission. The routines can be stored and used later as a pre-defined action sequence, and they may further be used to train operators on the proper use of the control system and remote vehicle. When routines are used as a pre-defined action sequence, the replay routines call additional use routines that suppress environmental and system variable information and execute only the stored commands.

Robot Structure

Figure 19A:
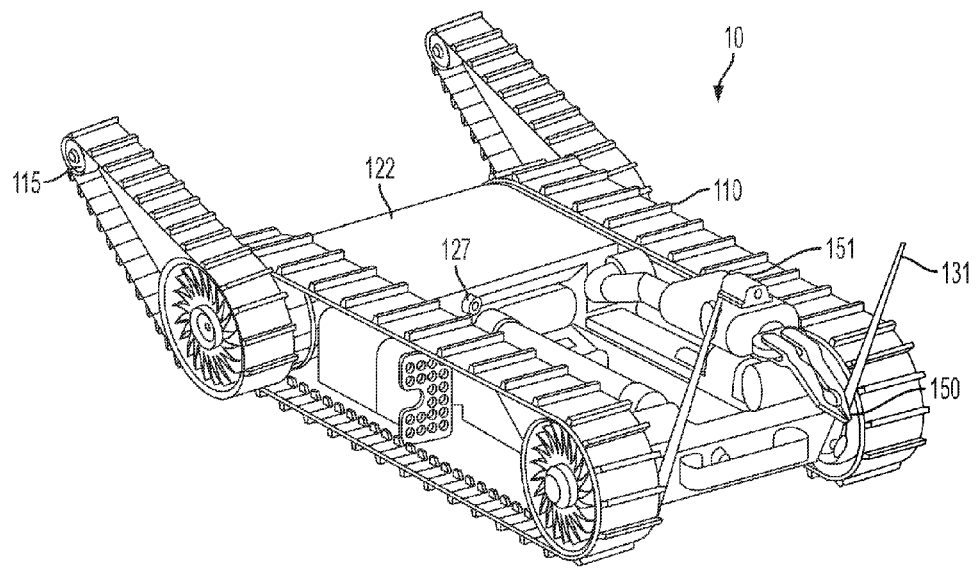
FIGS. 19A and 19B illustrate an embodiment of a remote vehicle of the present invention.
Figure 19B:
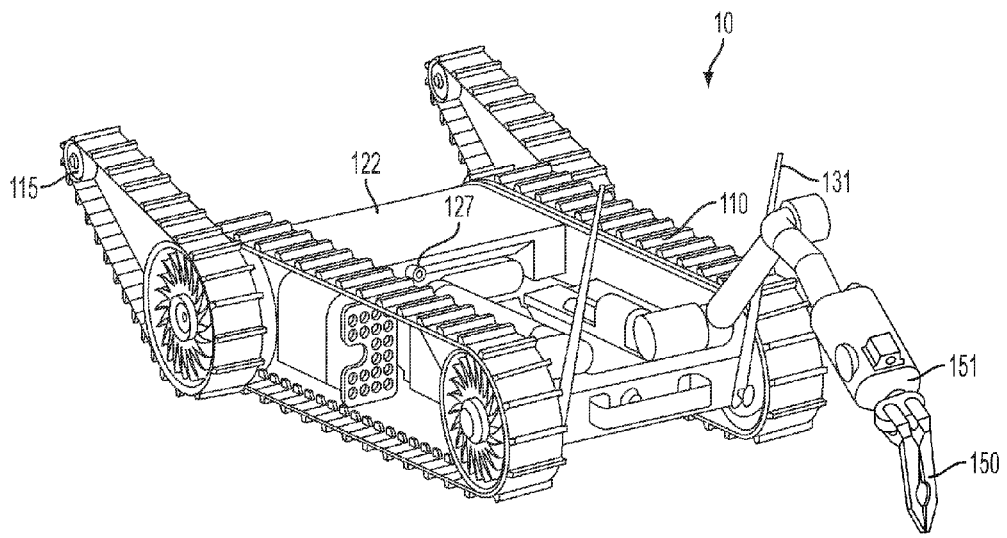

FIGS. 19A and 19B illustrate an embodiment of a remote vehicle of the present invention. A mobile robot 10 has a head 122 that includes a drive camera 127 mounted thereon to provide visual information regarding the environment of the mobile robot 10, an electro-optic infrared (EO/IR) module 4165 which uses LIDAR to map the environment and detect possible obstacles, main drive treads 110 for propelling and steering the mobile robot 10, and robot-mounted antennae 131 for communicating with an operator via the control system. The mobile robot 10 also includes rotatably extensible, treaded flippers 115 that can be deployed to augment traction and to overcome obstacles, and a robotic gripper 150 for grasping or manipulating objects in the mobile robot's environment. The mobile robot 10 further includes an attack camera 151 to aid in navigation of the mobile robot and the robotic gripper 150.

Figure 20:
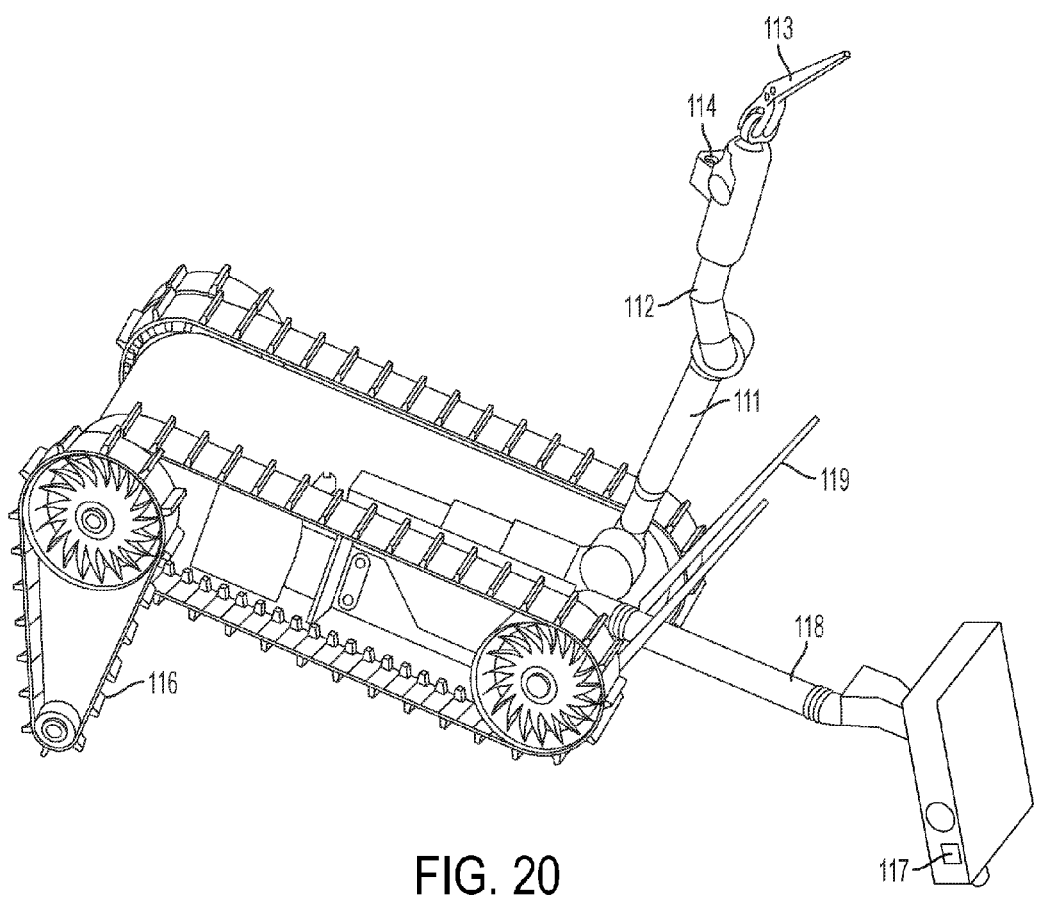
FIG. 20 illustrates a remote vehicle for use with an embodiment of the present invention.

FIG. 20 illustrates a mobile robot with both its robotic gripper 113 and attached upper arm 112 and lower arm 111 extended. Further shown is the extension of an arm 118 connected to the head 117, and the extension of the head 117 from the arm 118. Also shown is the advantage of having an attack camera 114 attached to the gripper's upper arm 112. The attack camera 114 is able to display the gripper's position within its environment in relation to the position of the gripper's upper arm 112. Using this information, the user can adjust the upper arm 112 to reposition the gripper 113 in its environment. Further shown is an extended flipper 116 which shifts the mobile robot's center of gravity.

Figure 21:
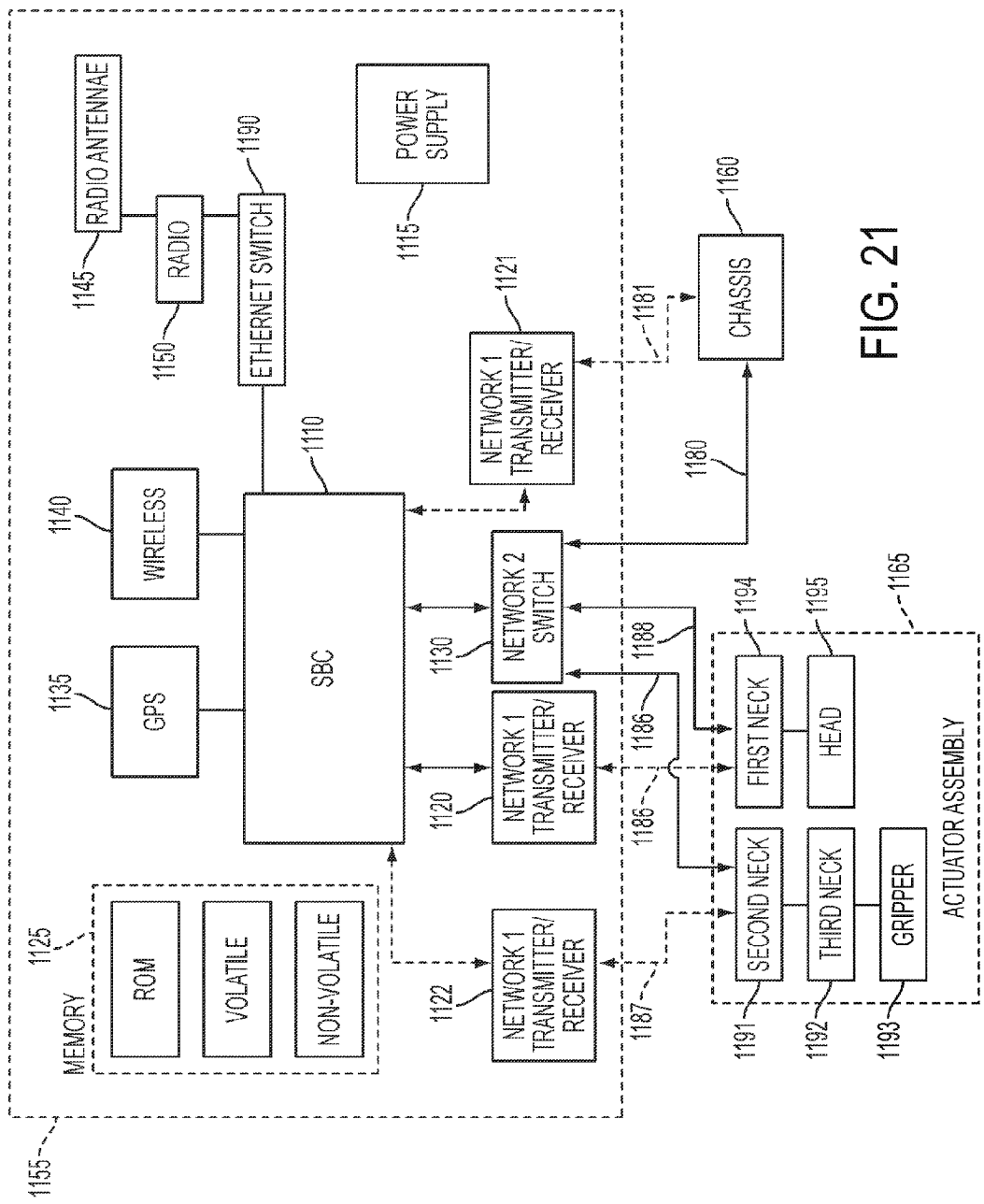
FIG. 21 is a block diagram depicting an embodiment of a remote vehicle control system.

FIG. 21 is a block diagram depicting an embodiment of a mobile robot control system. Included in the control system 1155 is a single board computer (SBC) 1110 such as, for example, a Freescale MPC5200. A microprocessor can be used in lieu of the single board computer 1110. Connected to the single board computer 1110 is a global positioning system (GPS) module 1135, a radio module 1150, and a wireless Ethernet transmitter and receiver 1140. A radio module 1150 is connected to the single board computer 1110 via an Ethernet switch 1190, and is further connected to a radio antenna 1145. The user can control the control system 1155 using a radio communicating over a secure connection created by the radio module 1150 and the radio antenna 1145.

Further included in the control system 1155 in the illustrated embodiment is a power supply 1115 and memory 1125 including any combination of ROM, volatile, and non-volatile memory. Also connected to the single board computer are network 1 transmitter and receivers 1120, 1121, 1122 and a network 2 switch 1130. The network 1 transmitter and receivers 1120, 1121, 1122 provide communication between the control system 1155 and an actuator assembly 1165 via a first connection wire 1187 installed between the first network 1 transmitter and receiver 1122 and second neck 1191 and a second connection wire 1186 installed between the second network 1 transmitter and receiver 1120 and first neck 1194. The network 1 transmitter and receivers 1120, 1121, 1122 also provide communication between the control system 1155 and the chassis 1160 via a third connection wire 1181 installed between the third network 1 transmitter and receiver 1121 and the chassis 1160. The network 2 switch 1130, on the other hand, provides communication between the network 2 switch 1130 and each of the chassis 1160, the first neck 1194, and the second neck 1191 via a first connection link 1180, a second connection link 1188, and a third connection link 1180, between the chassis 1160, first neck 1194, and second neck 1191, and the network 2 switch 1130.

In an embodiment of the invention, the network 1 transmitter and receivers 1120, 1121, 1122 include an RS485 transmitter for transmitting data over an RS485 network using a point-to-point configuration between each N1 (network 1) transmitter and receiver and a corresponding N1 transmitter and receiver. For example, the communication between the control system 1115 and the head 1195 is achieved by establishing a communication link between an N1a transmitter and receiver 1122 connected to the control system 1115 and an N1 transmitter and receiver 4315 connected to the neck's field programmable gate array (FPGA) 4330. A connection is then made between the N1 transmitter and receiver 4360 connected to the neck's FPGA 4330, and the N1 transmitter and receiver 4120 connected to the head's FPGA 4125. Thus, a network is created between the SBC 1110 and the head's FPGA 4125 via the nodes created by the N1 transmitter and receivers included in the control system 1155, the first neck 1194, and the head 1195. In an embodiment of the invention, the network has a two-wire configuration providing half duplex communication.

On the other hand, the network 2 (N2) transmitter and receiver 1130 of the illustrated embodiment includes an Ethernet switch for receiving and routing data over an Ethernet network. An example of this includes communication between the SBC 1110 and the head 1195, created by the N2 switch 1130 being connected to the SBC 1110 to establish a connection with the N2 switch 4320 connected to the neck's FPGA 4330 via a communication link 1188. A connection is then made between the N2 switch 4320 connected to the neck's FPGA 4330 and the N2 switch 4130 connected to the head's FPGA 4125. The connections made create a network between the SBC 1110 and the head's FPGA 4125. In an embodiment of the invention, the network is a full duplex communication implemented via Ethernet cable.

Connected to the control system 1155 is a chassis assembly 1160 as well as an actuator assembly 1165. In an embodiment of the invention, the actuators included in the actuator assembly 1165 are a first neck 1194 connected to a head module 1195, and a second neck 1191 connected to a third neck 1192 which is further connected to a gripper module 1193. Also preferred is that each of the necks 1194, 1191, 1192, include a substantially similar hardware circuit and software routine architecture 4301. In an embodiment of the invention, both of the actuator modules within the actuator assembly 1165 are connected to the control system 1155 via connection wires 1187, 1186, and connection links 1189, 1188. The chassis 1160 is connected to the control system 1155 via a connection wire 1181, and a connection link 1180. The present invention contemplates allowing the control system 1155 to communicate with the actuator assembly 1165 and the chassis 1160 via connection links only, wherein connection links include Ethernet, wire, wireless, radio, or any other link that provides communication between circuits. The present invention also contemplates allowing the control system 1155 to communicate with the actuator assembly 1165 and the chassis 1160 via connection wires only.

Further referring to FIG. 21, a diagnostic assembly 1147 can be included in the control system 1155 and is connected to the single board computer 1110 and communicatively connected through the single board computer 1110 to each of the sub-assemblies included in the remote vehicle 10. In an embodiment of the invention, the diagnostic assembly 1147 includes a microcontroller, sensors, and associated circuitry for inputting sensor feedback relating to the status of components and systems in the remote vehicle 10 to generate status commands that are then sent to routines included within the single board computer 1110. The following methods can be used to determine the status of the remote vehicle's components and systems, they include: inputting sensor data from sensors already included within the remote vehicle 10 and interpreting such sensor data to generate status reports; installing diagnostic-specific sensors in the remote vehicle 10 to monitor the operation of the remote vehicle's components and systems, and executing diagnostic routines configured to send command systems and components within the remote vehicle 10 to perform diagnostic specific actions for the purpose of generating status reports pertaining to the health of the system diagnosed.

Figure 22:
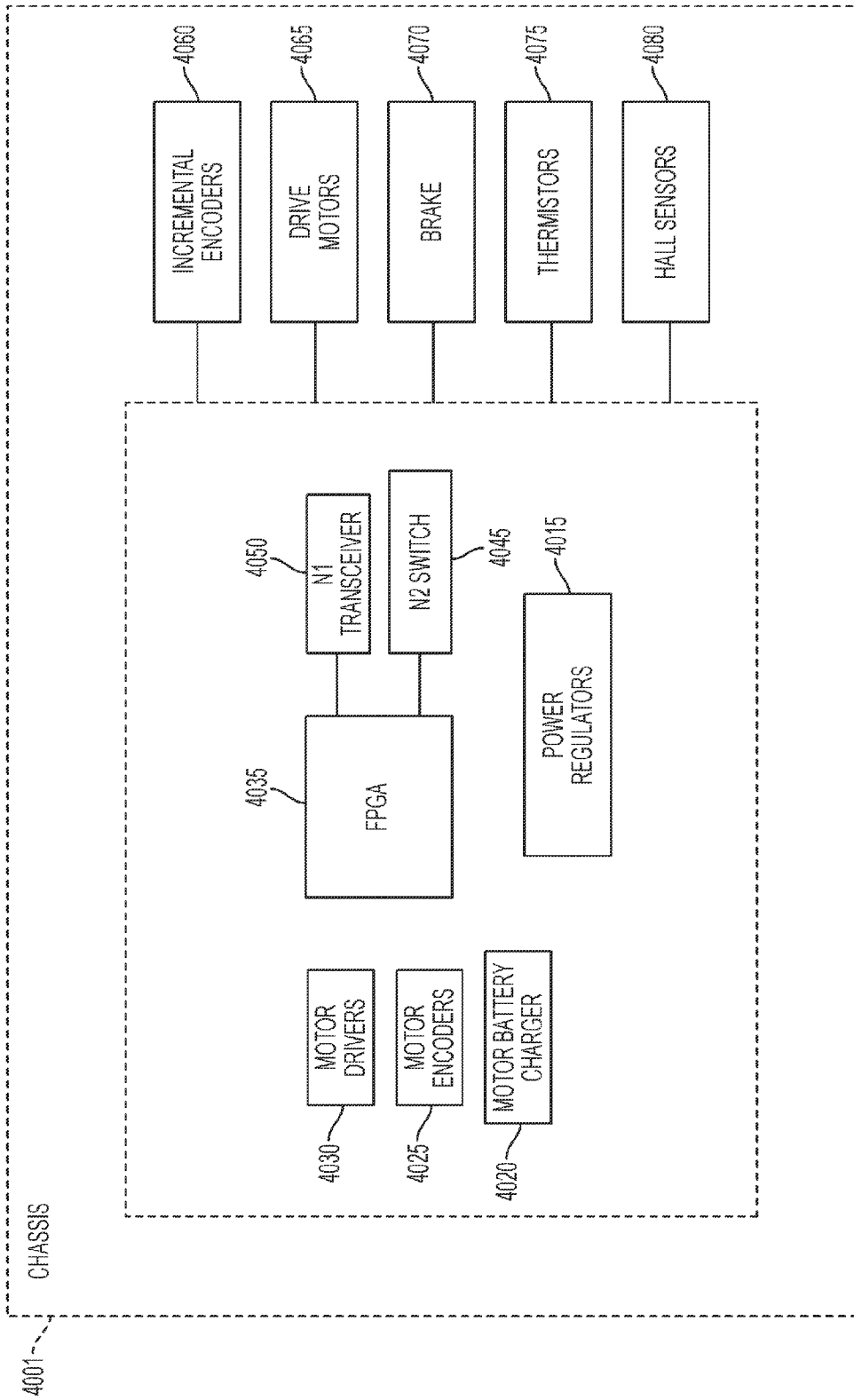
FIG. 22 illustrates an embodiment of a chassis assembly.

An embodiment of a chassis assembly 1160 is further described in the block diagram shown in FIG. 22. Included within the chassis 4001 base circuit 4055 is an FPGA 4035 connected to a network 1 transmitter and receiver 4050, and a network 2 switch 4045. In an embodiment of the invention, the FPGA 4035 is a Xilinx XC3S1000. Further included within the base circuit 4055 are power regulators 4015 including circuits configured to manage power within the chassis 4001. Additionally, included in the base circuit 4055 for motion control are motor drivers 4030, motor encoders 4025, and a motor battery charger 4020. The chassis 4001 also includes a number of motion control components connected to the base circuit 4055, including incremental encoders 4060, drive motors 4065, a brake 4070, thermistors 4075, and hall sensors 4080.

Figure 23:
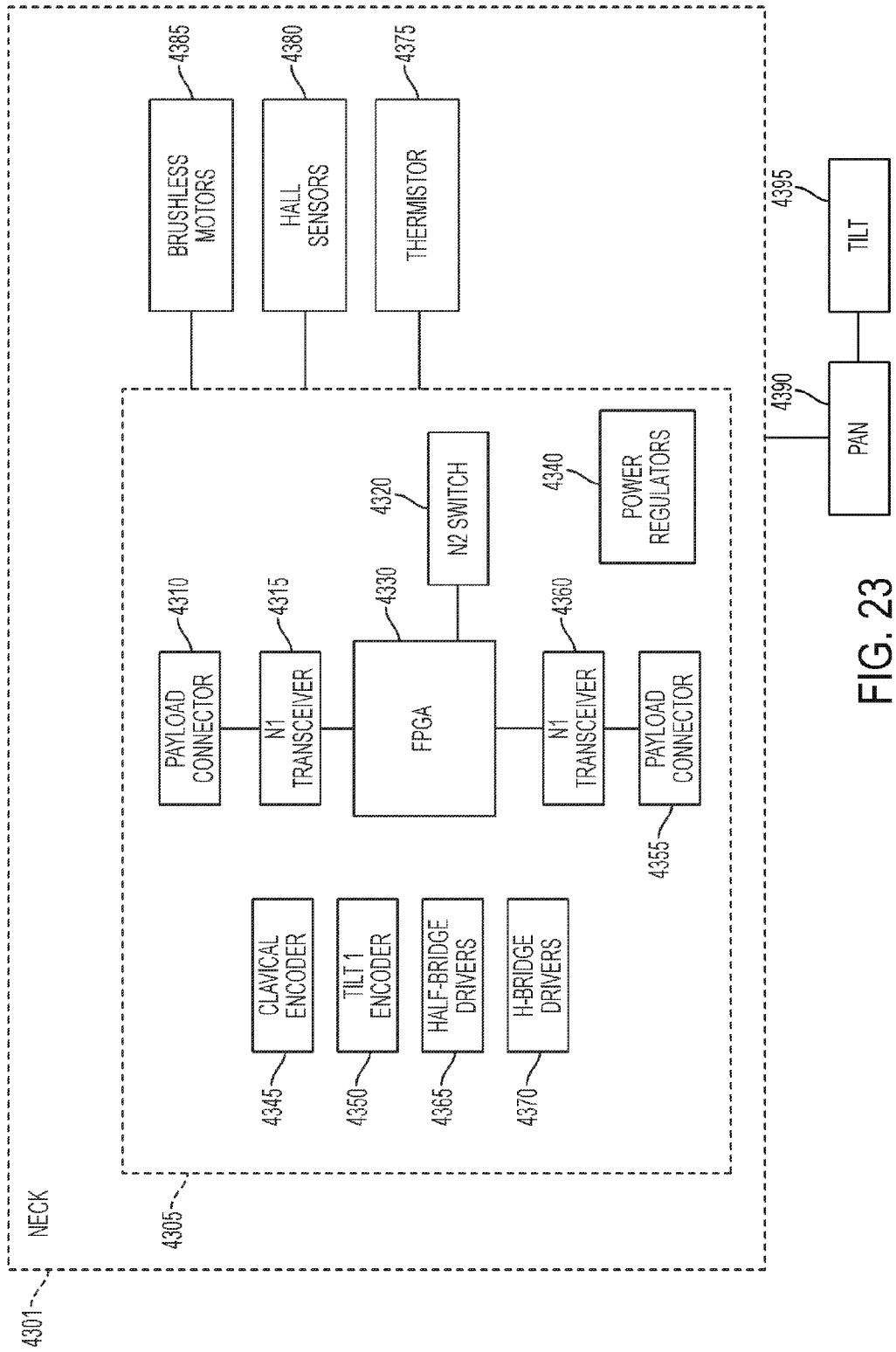
FIG. 23 illustrates an embodiment of a neck module.

A block diagram of an embodiment of a neck module 4301 is shown in FIG. 23. The neck module 4301 includes a base circuit 4305 having an FPGA 4330 connected to a first network 1 transmitter and receiver 4315, a second network 1 transmitter and receiver 4360, and a network 2 switch 4320. Included within the base circuit 4305 are power regulators 4340 that are circuits configured to regulate power within the neck module. The first and second network 1 transmitter and receivers 4315, 4360 are connected to a payload connector 4310, 4355. The payload connectors 4310, 4355 are plugs configured to mate with a corresponding plug on a payload such as an additional neck module 1191, 1192, a head module 1195, or a gripper module 1193. Further included within the base circuit 4305, to aid in motion control, are a clavical encoder 4345, a tilt 1 encoder 4350, half-bridge drivers 4365, and h-bridge drivers 4370. Additional motion control components included within the neck module 4301 and connected to the base circuit 4305 are brushless motors 4385, hall sensors 4380, and a thermistor 4375.

The neck module 4301 is also connected to a pan module 4390 and a tilt module 4395. The pan module 4390 allows the user to pan the distal portion of the neck about the neck's pivot point, while the tilt module 4395 allows the user to tilt the distal portion of the neck about the neck's pivot point. A slip ring and magnet assembly for the connections between the pan module 4390 and the neck module 4301, between the pan module 4390 and the tilt module 4395, and between the tilt module 4395 and a further connection.

Figure 24:
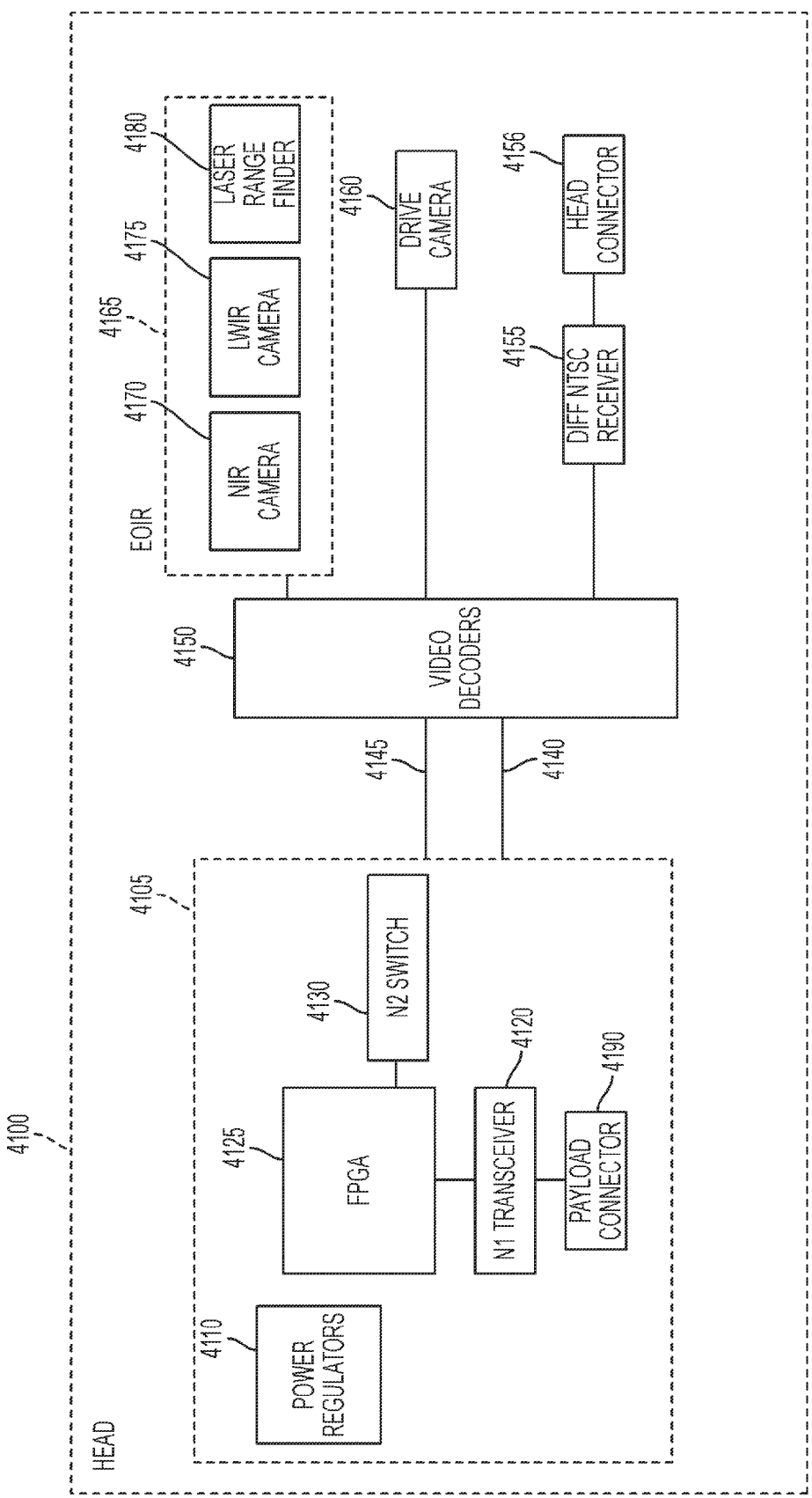
FIG. 24 illustrates an embodiment of a head module.

A block diagram of an embodiment of a head module 4100 is shown in FIG. 24, and includes a base circuit 4105 with a centrally located FPGA 4125. Connected to the FPGA 4125 are a network 2 switch 4130, and a network 1 transmitter and receiver 4120 which is further connected to a payload connector 4190. In an embodiment of the invention, the payload connector 4190 is a plug configured to mate with a corresponding plug on a neck module 4301 such as neck module 1 1194. Additionally, included in the base circuit 4105 are power regulators 4110 that are circuits configured to manage power within the head module 4100. The base circuit 4105 is connected to a set of video decoders 4150 via a CCIR-656 video communication bus 4145 and a serial bus 4140. Input to the video decoders 4150 includes: (1) the output from a drive camera 4160; (2) the output from a differential NTSC receiver 4155 which is further connected to the head module connector 4156; and (3) the output from the electro-optic infrared (EOIR) module 4165. Output from the EOIR module 4165 includes a near infrared (NIR) 4170 camera, a long wave infrared (LWIR) 4175 camera, and a laser range finder 4180.

Figure 25:
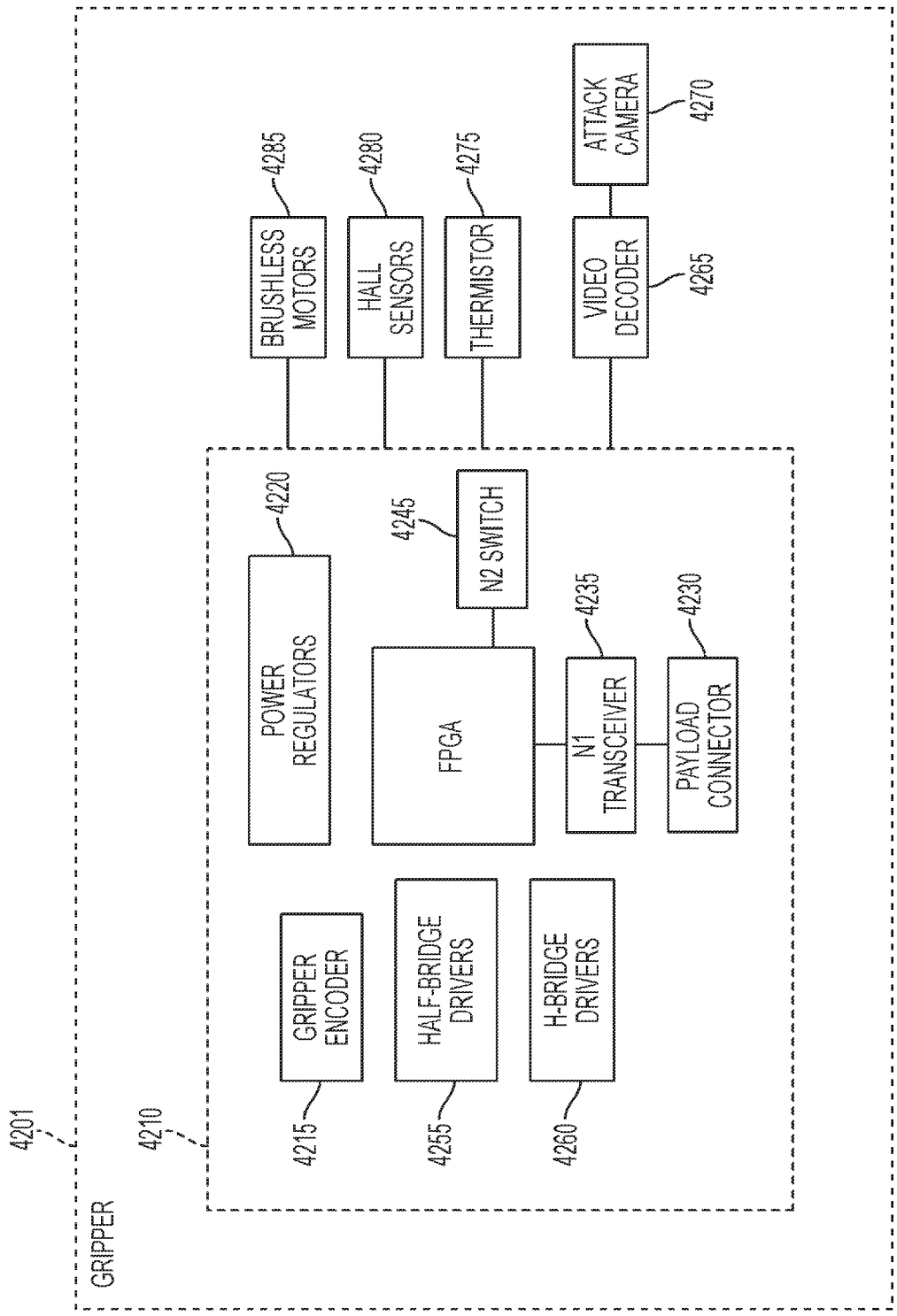
FIG. 25 illustrates an embodiment of a gripper module.

An embodiment of a gripper module 1193 is shown in the block diagram of FIG. 25. Located within the base circuit 4210 of the gripper module 4201 is a FPGA 4240 connected to a network 2 switch 4245, and network 1 transmitter and receiver 4235 that is further connected to a payload connector 4230. The payload connector 4230 is preferably a plug configured to mate with a corresponding plug on neck module 3 1192. Also included within the base circuit are power regulators 4220 including circuits for regulating power within the gripper module 4201, and the following components for motion control: gripper encoders 4215; half-bridge drivers 4255; and h-bridge drivers 4260. Additional motion control components connected to the base circuit 4210 and included within the gripper module 4201 are brushless motors 4285, hall sensors 4280, and a thermistor 4275. A video decoder 4265 is also connected to the base circuit 4210. An attack camera 4270 located proximate to the gripper 4201 creates input to the video decoder 4265 so that the user can view the gripper 4201 actions.

Network Configuration

Figure 26:
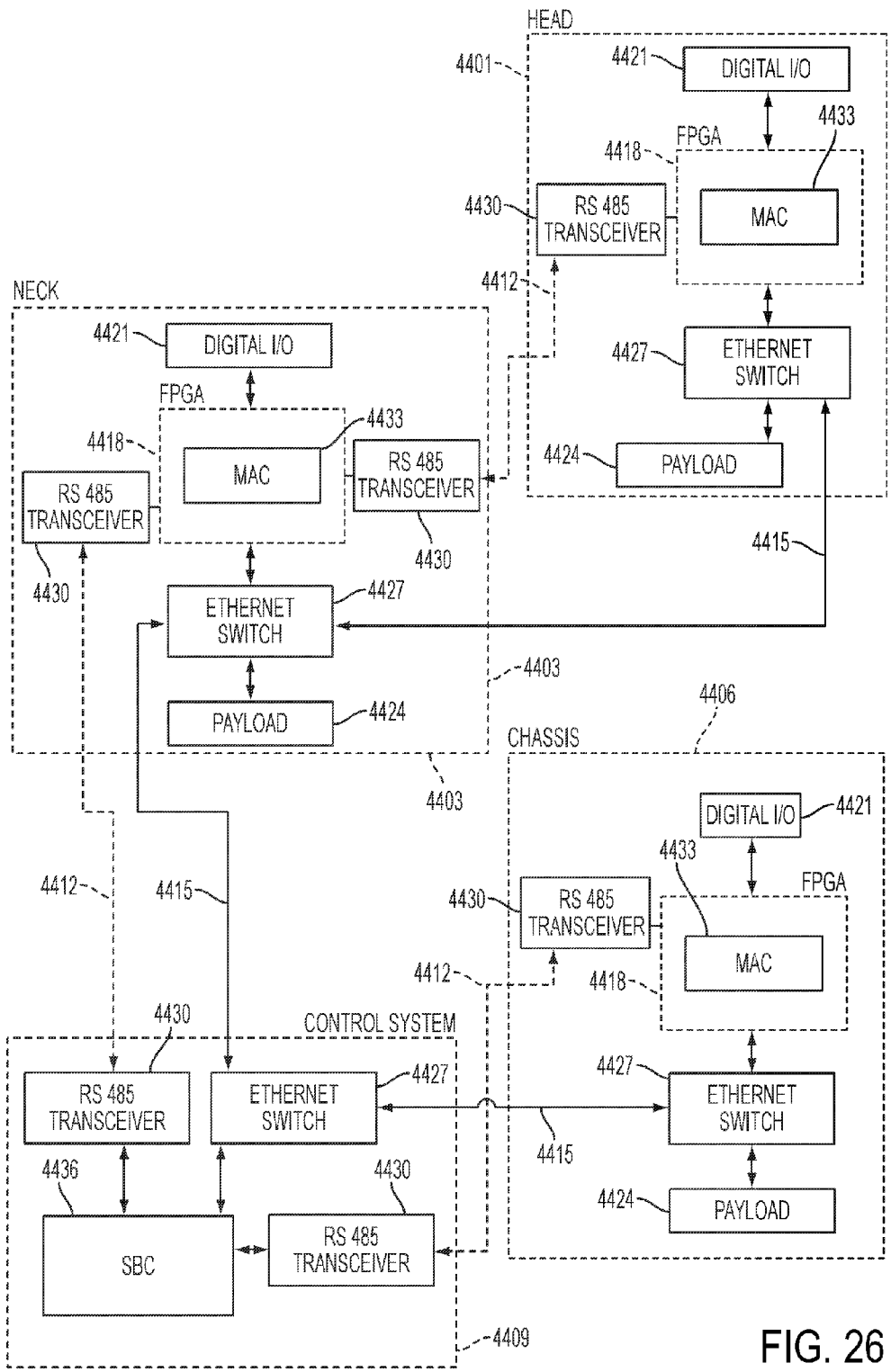
FIG. 26 illustrates an embodiment of a network installed between a head, a neck, a control system, and a chassis.

FIG. 26 illustrates an embodiment of a network installed between the head 4401 and the control system 4409 and the chassis 4406. There are two sub-networks included within the network: (1) the Ethernet network created by the Ethernet switches 4427 included within each module and the communication link 4415 that connects each Ethernet switch to a corresponding switch; and (2) the RS485 network created by the RS485 transmitter and receivers 4430 and the connection wires 4412 that connect each RS485 transmitter and receiver to a corresponding transmitter and receiver. An alternative network may include RS422 transmitter and receivers in lieu of RS485 transmitter and receivers. Such an embodiment would provide full duplex communication, meaning each transmitter and receiver could simultaneously receive and transmit data packets.

The RS485 network embodiment illustrated in FIG. 26 includes master nodes and slave nodes. A master node includes the node created by the single board computer 4436, the node created by the head 4401 and the node created by the chassis 4406. Such nodes are master nodes because they provide a central point to which other nodes, slave nodes, communicate. An example of such communication includes the communication between the single board computer 4436, the chassis 4406, and the head 4401. The single board computer can receive information from the head 4401 representative of a drive command and pass such information onto the chassis 4406. This configuration would consider the single board computer 4436 a master node, and the chassis 4406 and the head 4401 slave nodes.

The network includes a control system 4409 with a single board computer 4436 for processing information transmitted to the computer 4436 by each network. To gather such information, the single board computer 4436 is connected to a single Ethernet switch 4427 which in turn is linked to an Ethernet switch 4427 within the neck 4403 via a communication link 4415 and an Ethernet switch 4427 within the chassis 4406 via a communication link 4415. The single board computer 4436 connects to two RS485 transmitter and receivers 4430, one transmitter and receiver 4430 is connected to a RS485 transmitter and receiver 4430 in the neck 4403 via a connection wire 4412, and a second transmitter and receiver 4430 is connected to a RS485 transmitter and receiver 4430 in the chassis 4406 via a connection wire 4412. While an embodiment of the invention includes both an Ethernet network and a RS485 network, an alternative embodiment can include only an Ethernet network. Such a network would provide a full duplex communication network requiring less infrastructure than a RS485 network. The inclusion of both an RS485 network and an Ethernet network is advantageous because it provides two networks, including an Ethernet network capable of communicating from one far node to another, thus bypassing the token ring configuration of the RS485 network which requires passage of data through intermediate nodes.

Each actuator assembly includes a core circuit capable of implementing an alternative network that includes only an Ethernet network. The core circuit includes a field programmable gate array 4418 with a media access controller 4433, where the FPGA is capable of managing multiple digital input 4421 and is further programmed to interface with the media access controller (MAC), which includes information or commands generated either by the FPGA or the digital I/O 4421 to generate frames of data to be sent to other modules within the robot via packets sent by the Ethernet switch 4427. Furthermore, the MAC is able to parse frames of data included within packets it receives from the Ethernet switch and extract information or commands that are either processed by routines included within the FPGA or relayed to the digital I/O 4421. Due to the full duplex communication network created by the Ethernet switch 4427, the MAC is able to simultaneously transmit and receive packets of data. The RS485 transmitter and receiver 4430, on the other hand, is half duplex communication meaning that the transmitter and receiver 4430 cannot transmit data and receive data simultaneously. "Actuator assembly" refers to the head 4401, the neck 4403 or the chassis 4406. "Module" refers to a component within the head 4401, the neck 4403, the control system 4409, or the chassis 4406.

Each Ethernet switch 4427 is also connected to a payload 4424, wherein payload can include a drive assembly, an EO/IR, or other assembly. Use of an Ethernet switch 4427 allows for simultaneous communication between the payload 4424 and other modules within the network including the head 4401, neck 4403, and chassis 4406. An example of this would include video information transmitted from a payload 4424 such as the video decoders 4150. The form of such information is a constant stream of video feedback from the drive camera 4160. The example network created using the Ethernet switch 4427 allows for simultaneous receiving of video information from the drive camera 4160 and transmitting and receiving of information from the single board computer 4436.

Figure 27:
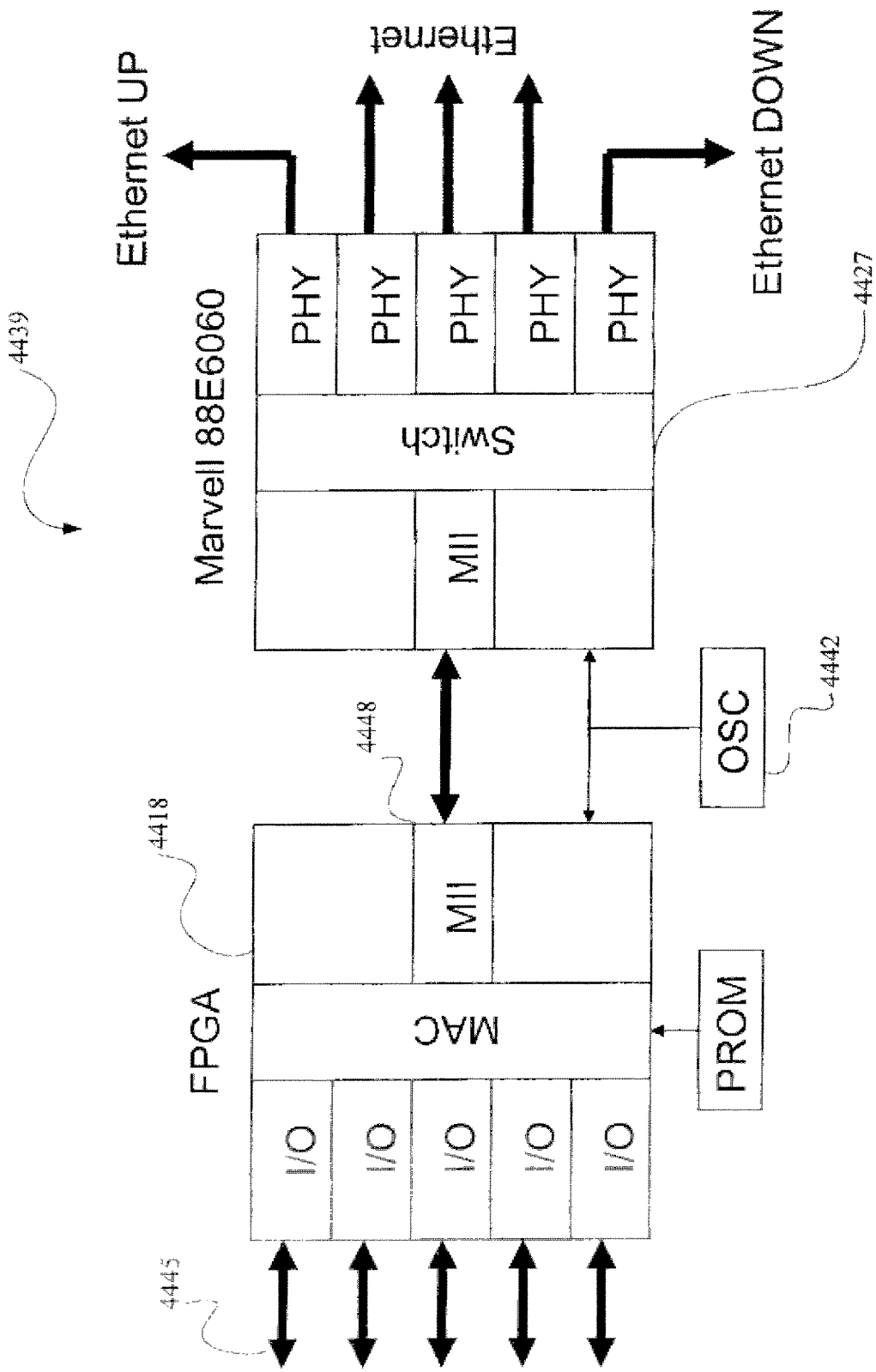
FIG. 27 illustrates an embodiment of an Ethernet endpoint block.

FIG. 27 illustrates an embodiment of an Ethernet endpoint block 4439 including an FPGA 4418 configured to include a MAC and connected to an Ethernet switch 4427. The Ethernet switch 4427 is connected to the MAC included on the FPGA 4418 via a medium independent interface bus that provides a logical interface with a communication protocol selecting the line speed and whether the connection is in a half or full duplex mode. The MAC parses the I/O ports 4445 included on the FPGA and generates frames of data to be included in packets. The packets are transmitted out through the Ethernet switch 4427 to the rest of the modules in the network. Included on the Ethernet switch 4427 are physical devices or line interfaces that handle the transfer of data from the Ethernet cable to the Ethernet switch 4427. An oscillator 4442 is included to facilitate the exchange of information between the MII buses.

Figure 28:
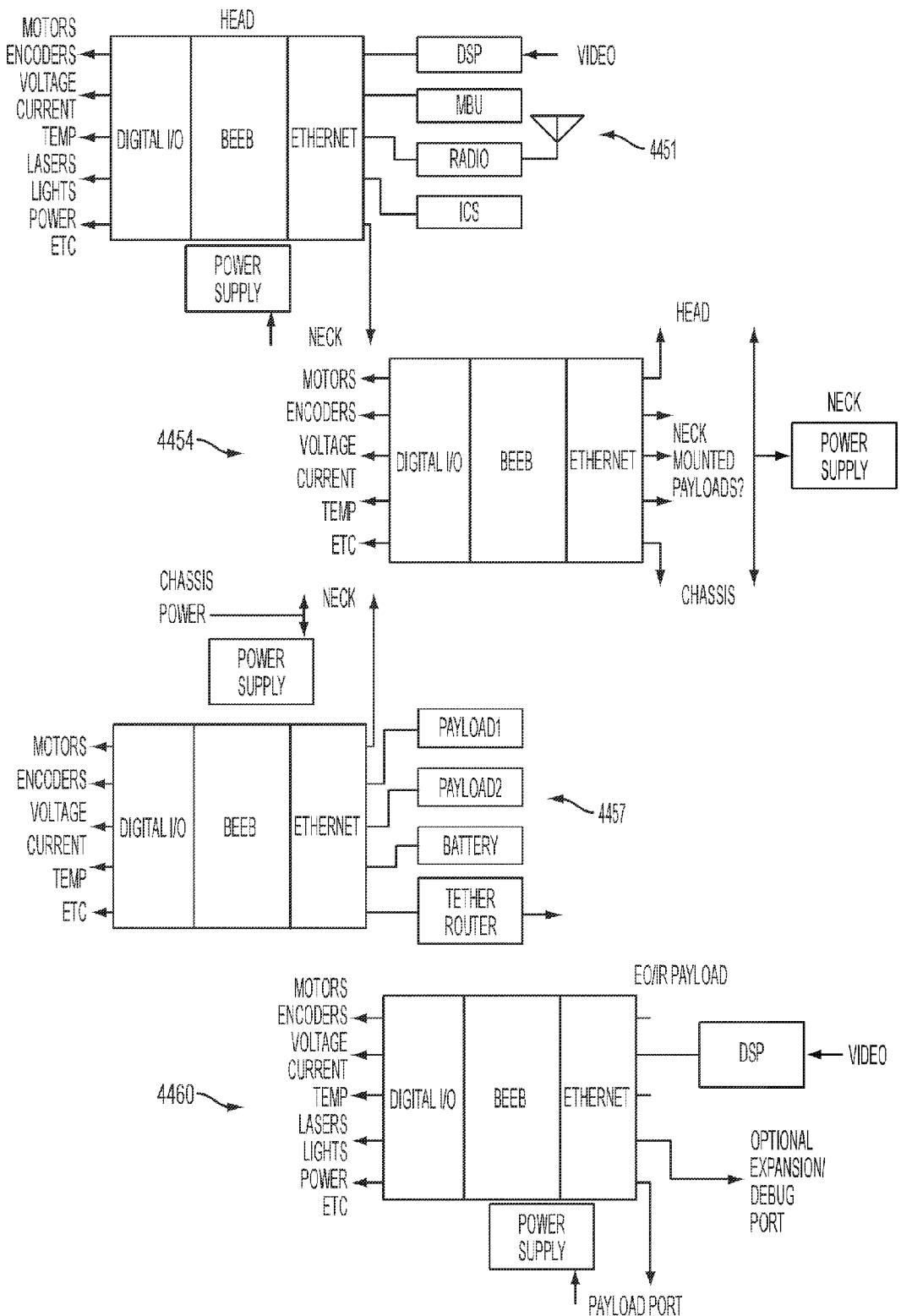
FIG. 28 illustrates an embodiment of the invention using the Ethernet endpoint block in the chassis, neck, head and EO/IR payload.

FIG. 28 illustrates an embodiment of the invention using the Ethernet endpoint block in the chassis, neck, head and EO/IR payload. Further shown is the connection of various payloads to the Ethernet endpoint block as well as the running of Ethernet to other modules. Advantages of an Ethernet endpoint block include: low EMC footprint, noise/bounce tolerant, modularity, can uniformly read/control each endpoint. In addition, an Ethernet network can handle far node-to-far node communication.

Referring to FIG. 26, both the RS485 network and the Ethernet network can be used for communication. As an example, the Ethernet network can be used for quick data transmission of video output from the EO/IR module to the single board computer 4436, while the RS485 network is used to transmit drive commands from the computer 4436 to the head 4401 via the neck. Such a transmission would include the creation of video output by the EO/IR module 4424, the video output would then be relayed to the Ethernet switch 4427 where it would be transmitted directly to the single board computer 4436 in the central control system 4409. The video data would be transmitted via a cable 4415 connected at one end to the Ethernet switch 4427 and at the other end to an Ethernet switch in the neck 4403, and via a cable 4415 connected at one end to the Ethernet switch 4427 in the neck 4403 and at the other end to an Ethernet switch 4427 in the control system 4409. The Ethernet switch 4427 in the control system 4409 is connected to the single board computer 4436 included in the central control system 4409. Although the video information must pass through two additional Ethernet switches, such information can pass through each switch without the need for additional signal processing by the intermediary Ethernet switches.

If the RS485 network is used to send a drive command from the single board computer 4436 to the head 4401, the data must first be sent to an RS 485 transmitter and receiver included in the control system 4409, which then transmits the data over a wire 4412 connected at the other end to an RS485 transmitter and receiver located in the neck 4421. The data must then be processed by the FPGA 4418 included in the neck 4403 and then passed on to a second RS485 transmitter and receiver 4430 included in the neck 4403. The second RS485 transmitter and receiver 4430 then transmits the data over a wire 4412 to an RS485 transmitter and receiver 4430 included in the head 4401 which is further connected to an FPGA 4418 included in the head 4401. The RS485 network processes the data at the intermediary node (in the neck 4403) between the head 4401 and the control system 4409. The Ethernet network, on the other hand, is able to send the data through the neck 4403, or intermediary node, without requiring additional signal processing. Including both and RS485 and Ethernet network can prevent bottlenecks created by the passage of large amounts of data over a single network, and further allows for faster transmission time due to the inclusion of multiple networks. Alternative embodiments of the system can include one or more Ethernet networks, or one or more RS485 networks. Further embodiments include a full duplex RS485 network implemented using RS422 transceivers and receivers.

Gripper Manipulator

Figure 29A:
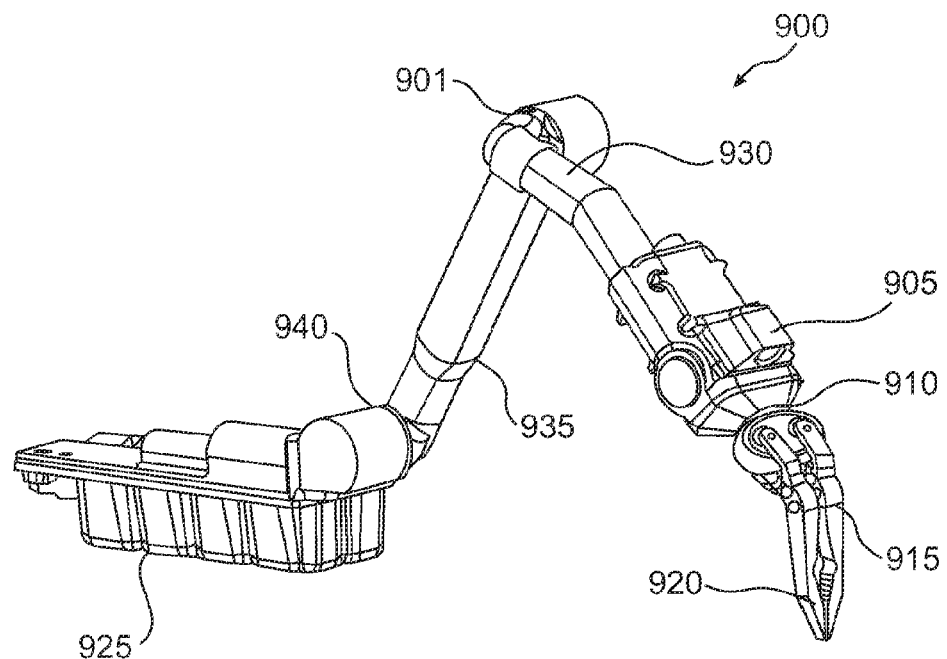
FIGS. 29A and 29B illustrate an embodiment of a robotic arm.
Figure 29B:
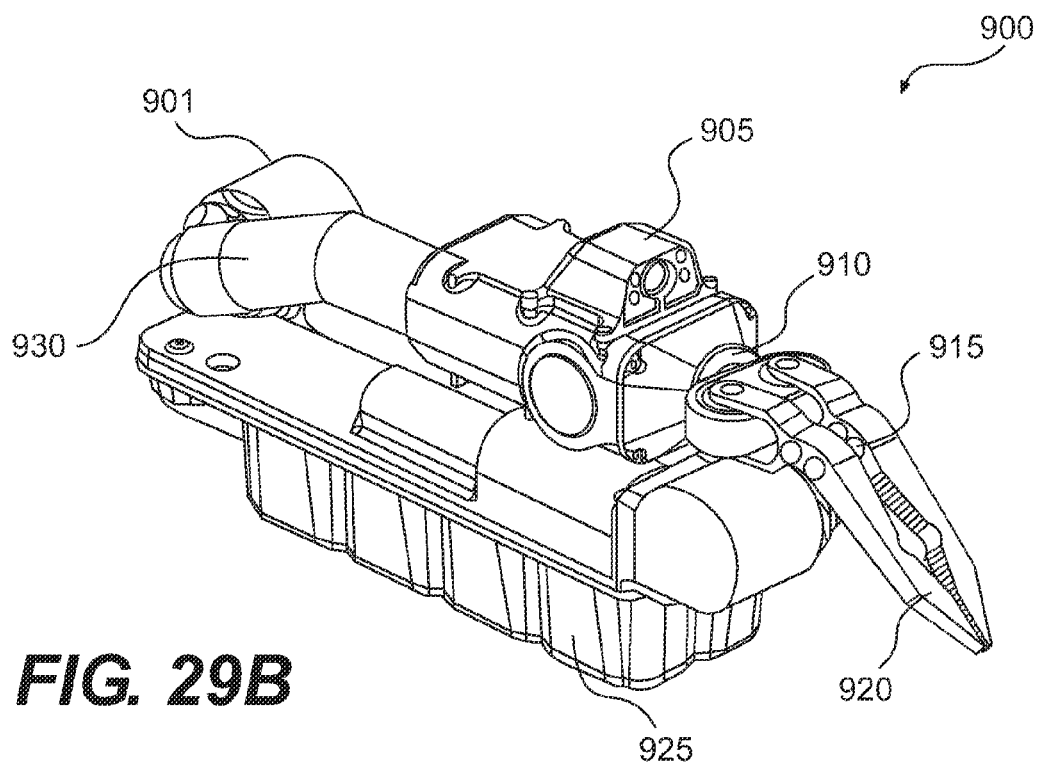

FIGS. 29A and 29B illustrate an embodiment of robotic arm 900 for functioning as a gripper affixed to the mobile robot 10. The robotic arm 900 preferably includes a base 925 with circuitry required to control the arm. Additionally, the arm 900 includes a pair of actuators 920 installed toward the end of the arm and able to grip and manipulate objects. Further included near the actuators 920 are joints 915, 910 which may be mobilized to alter the position of the actuators 920 in space, and a camera 905 installed proximate the actuators 920 so that the operator may control actuator 920 movement based on video feedback. The actuators are connected to a secondary arm 930 which pivots at a joint 901, and which is connected to a main arm that pivots at a joint 940.

The joint 940 connected to the arm base 925 and the primary arm 935 can be controlled by the operator via the control system outlined above. When drive commands are sent to the mobile robot 10 indicating that the joint 940 should be actuated, a drive command is sent to the drive assembly located proximate the joint 940 which in turn causes a motor located in the drive assembly to mobilize actuators connected to the joint 940 via gears and subsequently mobilize the primary arm 935. Similarly, drive commands sent to the drive assembly located proximate the joint 901 connecting the primary arm 935 to the secondary arm 930 can cause a motor located in the drive assembly to mobilize actuators connected to the joint 901 via gears and subsequently mobilize the secondary arm 930. Joints 915, 910, capable of mobilizing the manipulators 920 located on the gripper, can also be actuated via drive commands sent to a drive assembly proximate the joint 915 and including a motor. Additionally, the camera 905 installed near the gripper actuators 920 can input video data regarding the gripper's environment and further transmit such data to the control system 1155 where it is further transmitted to the control system to be displayed on a screen so that the operator may view the gripper's environment.

Software Architecture

Behavior System Overview

Figure 30:
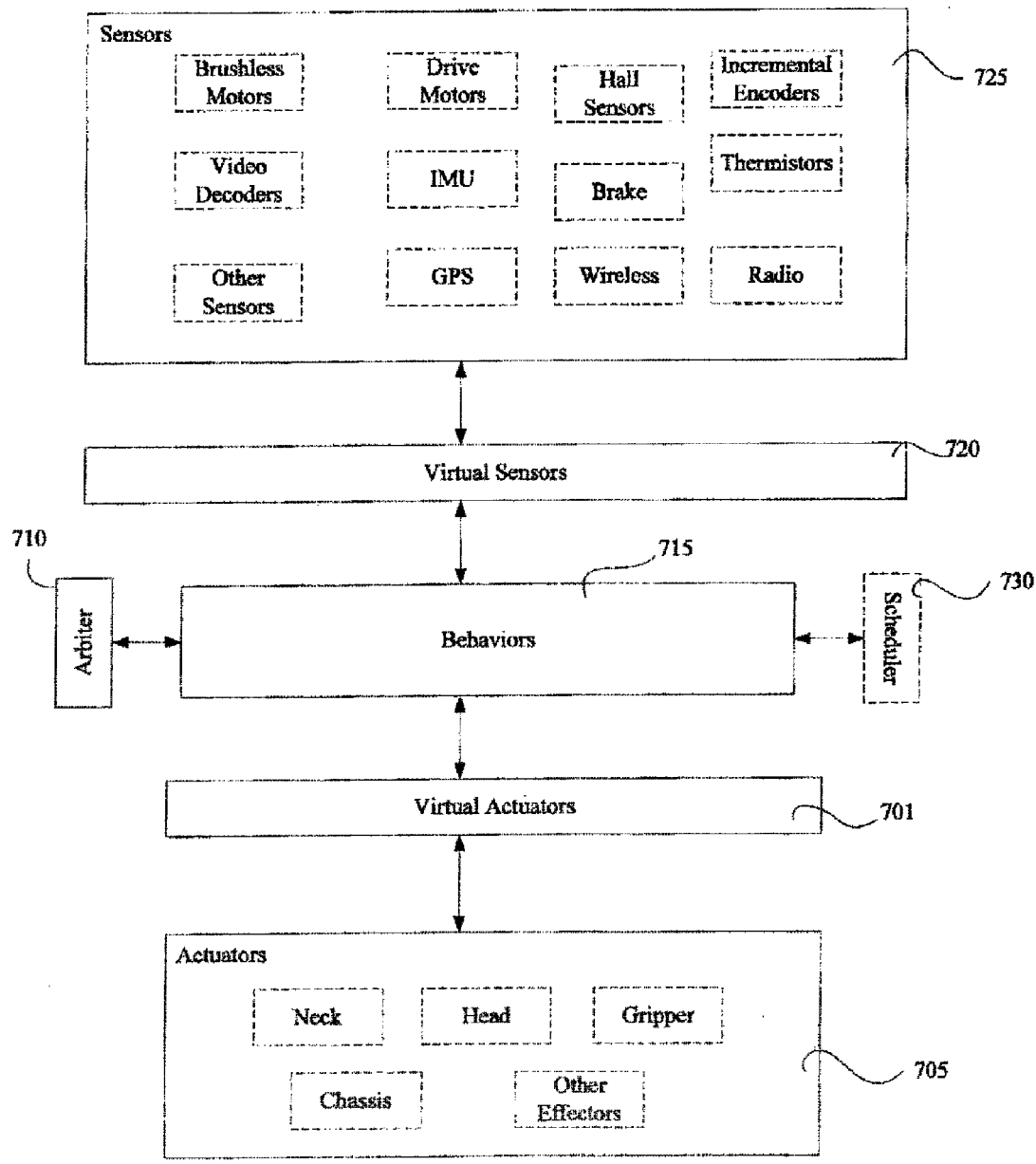
FIG. 30 illustrates an embodiment of a behavior system to be included within a remote vehicle.

In accordance with the present invention, a remote vehicle (such as the mobile robot 10 described above) has included within its control system 1155 a behavior system comprising software routines and circuits. FIG. 30 illustrates an embodiment of a behavior system to be included within a remote vehicle. At the heart of the system are behaviors 715 including different behavior software routines that further include behavior software subroutines. The behavior software routines are the main routines and are referred to as the individual behaviors, for example the stair climbing behavior software routine is referred to as the stair climbing behavior. The individual behaviors 715 include within them sub-routines, which are routines that implement the actions associated with each behavior. An example would include the stair climbing behavior which includes within it a stair climbing routine, a maintain alignment routine, as well as other routines necessary to fully implement the stair climbing behavior.

In an embodiment of the invention, each behavior includes a status check routine that constantly checks sensor input to determine a change in start condition. When the start condition is a positive value, the behavior initiates a routine, included within the behavior that begins sending software commands to an arbiter (coordinator) 710 included within the behavior system. The commands sent to the arbiter 710 are votes that tell the arbiter 710 that the behavior would like control of the actuators used by the routines included within the behavior. An example of this would include the stair climbing behavior, that responds to a positive change in its start condition by sending votes to the arbiter 710 indicating that stair climbing would like control over the tilt sensor, the drive assembly, the drive and attack cameras, and all other actuators and manipulators needed to implement the stair climbing behavior. Each behavior could have its own specific set of routines, or some or all behaviors 715 may be able to share a common set of routines included within the behavior system.

Figure 31:
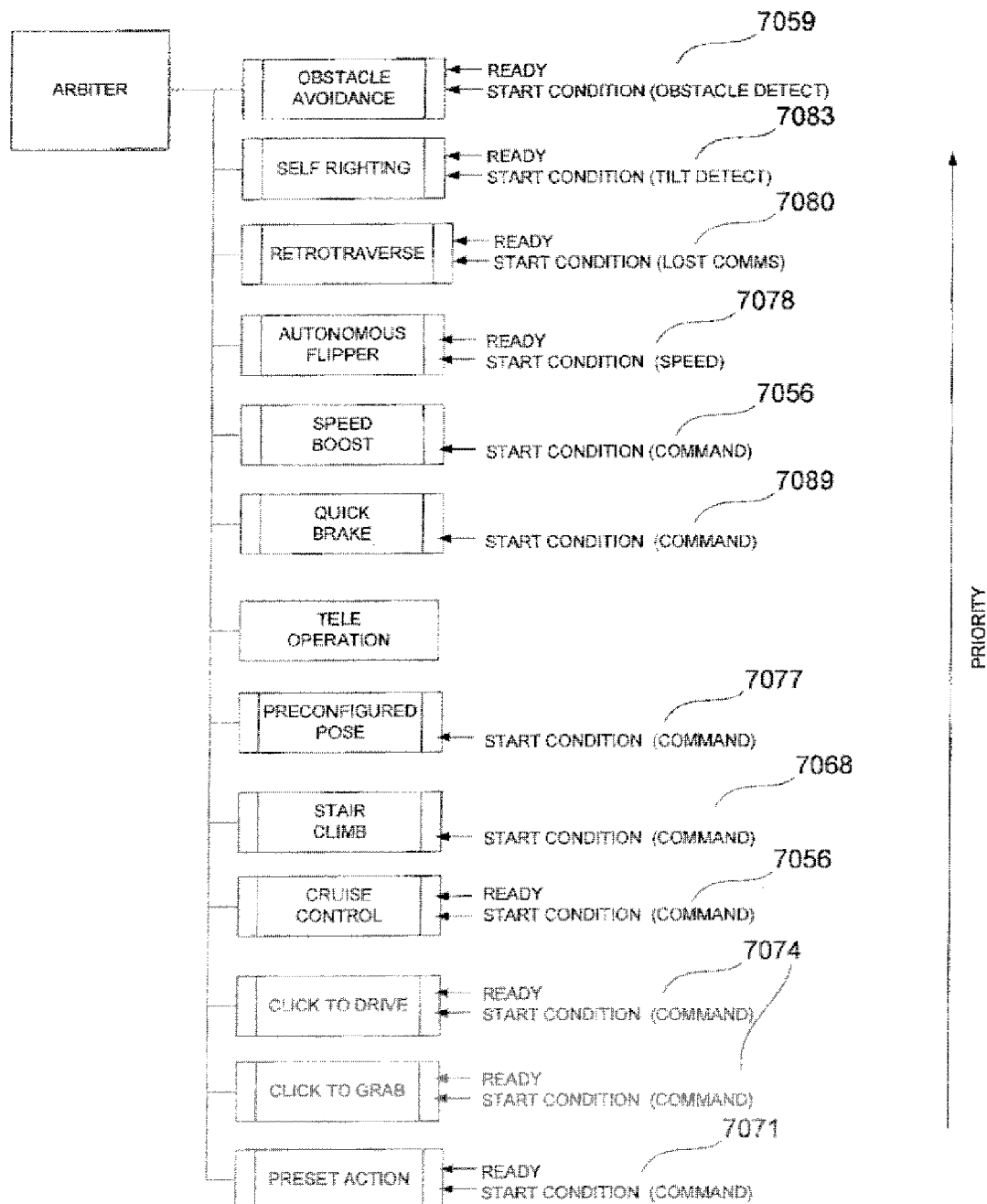
FIG. 31 illustrates a listing of behaviors within the behavior system in an exemplary order of priority.

Also included within each behavior is a priority. FIG. 31 illustrates a listing of behaviors within the behavior system in an exemplary order of priority. As shown, a behavior such as the obstacle avoidance behavior 7059 has a higher priority than the stair climbing behavior 7068 as it is more important that the remote vehicle avoid an obstacle than climb a stair. This practicality can be displayed in a situation where there is a bomb located on a set of stairs, and the behavior system stops the stair climbing behavior 7068 on detection of an obstacle by a sensor, so that the higher priority obstacle avoidance behavior 7059 may control the remote vehicle's drive assembly to drive away from the obstacle which in this case is a bomb. Were the obstacle avoidance behavior 7059 is not a higher priority than the stair climbing behavior 7068, the remote vehicle would have continued to drive toward the bomb, likely hitting it and causing injury to the remote vehicle and those humans present in the surrounding environment. Another exemplary embodiment of the behavior-based system's priority schema includes a situation where the remote vehicle 10 travels through an environment with the cruise control 7056 behavior activated. While traveling through the environment on cruise control, the remote vehicle's sensor assembly detects an obstacle located forward of the remote vehicle 10 and within the its path of movement. Rather than continue operating in cruise control 7056 and hitting the obstacle, the remote vehicle 10 exits cruise control 7056 and enters obstacle avoidance 7059 upon detection of the obstacle. The importance of this design attribute can be displayed in a situation where the remote vehicle 10 includes an autonomous robotic platform that houses human soldiers, and the obstacle includes an improved explosive device (IED). In such a situation, hitting the obstacle would likely cause harm to the human passengers onboard the robotic platform, and so it is preferable that the robotic platform exit cruise control and avoid the obstacle.

The arbiter 710 included within the system is a software routine that manages the votes and priorities of the individual behaviors 715 in conjunction with the scheduler 730, to determine when and in what order the behaviors 715 will gain control over the actuators and manipulators within the remote vehicle. To accomplish this, the arbiter 710, at any point in time, reviews all the behaviors 715 currently voting for control. To determine which behavior 715 will gain control, the arbiter 710 reviews each voting behavior's priority level, and the scheduler's 730 indication of which behavior should gain control based on the length of time that the current behavior or a past recorded behavior, has or had control of the actuators and manipulators. An embodiment of the invention includes a scheduler 730, but alternative embodiments may include a system with a single arbiter 710 that determines the controlling behavior based on priority level and votes.

To input sensor output to the behaviors 715 and their corresponding routines, the system has a set of virtual sensors 720 in communicative connection with a set of sensors 725. The sensors 725 can include sensor components and related circuitry and software routines that provide feedback representative of the remote vehicle's current external and internal environment. An example includes a wireless receiver providing feedback regarding detectable wireless signals within the remote vehicle's external environment, and a brake that uses an electrical switch to provide feedback about the state of the brake within the remote vehicle's internal environment via an electrical signal generated when the electrical switch is closed. Output from the sensors 725 is further conditioned by virtual sensors 720 which include circuits and software able to input sensor 725 signals and process the signals to provide outputs representative of each signal, but in a form able to be processed by the routines within the behaviors 715.

In an embodiment of the invention, each of the sensors 725 has a corresponding virtual sensor 720 configured to the requirements of that sensor. An example is the brake sensor which outputs an electrical signal in response to the actuation of the brake. The virtual sensor 720 associated with the brake sensor may be configured to input the raw analog signal into a signal processing circuit that further conditions the analog input and outputs a digital signal which is further processed by a software routine that outputs a logic value representative of the brake's status. Output from the virtual sensors 720 is inputted to the behaviors 715 where it is used in behavior routines to mobilize the remote vehicle and further respond to raw sensor output.

Included within the behavior system are actuators 705 able to responds to output from virtual actuators 701 by mobilizing and performing actions. To control the actuators 705 within the robot 10, the behaviors 715 output control commands which can include drive commands, communication commands, and other commands able to control actuators included on the robot 10. Each actuator is able to receive drive commands in a particular format. The virtual actuators 701 include software routines and circuits able to input the software control commands from the behaviors 715, and convert them into control commands able to be received by the actuators 705. In particular, the motors included within the chassis can take drive commands in a format that preferably includes an electrical signal. The virtual actuator 701 associated with the motors within the chassis are able to take the software command generated by the behaviors 715 and convert the command into a signal that is then transmitted to the motors within the chassis.

Each of the core software routines included within the behavior-based control system illustrated in FIG. 30 are included within a software architecture. Preferably, this architecture consists of the Aware 2.0 software platform distributed by iRobot Corporation. Included within the core software routines are the virtual sensors 720, the behaviors 715, the virtual actuators 701, the arbiter 710, and the scheduler 730 when the embodiment is an embodiment that includes a scheduler 730.

Autonomous Remote Vehicle Behaviors

In an embodiment of the invention, these behaviors are included on the remote vehicle in memory, and are executed by the single board computer. There are three types of behaviors: Ballistic, Semi-Ballistic, and Persistent. The descriptions below refer to mobile robot 10 described above. The present invention contemplates employing autonomous behaviors on a variety of remote vehicle types as would be appreciated by one of ordinary skill in the art.

Ballistic Behaviors

Stair Climbing

The stair climbing behavior drives the mobile robot 10 to traverse a set of stairs in an autonomous manner, after receiving a command to initiate the behavior and information indicating the location of the stairs from the operator. The mobile robot 10 may include a pitch/roll sensor that indicates whether the mobile robot 10 is tilted relative to the ground, which is used by the stair climbing behavior to decide whether the mobile robot 10 should continue climbing the stairs.

The mobile robot 10 can be positioned in the vicinity of a staircase 920, and the user may initiate the autonomous stair climbing behavior by simply identifying the location of the stairs 920 and inputting a command to activate the stair climbing behavior. The mobile robot 10 can then ascend or descend the stairs 920 without requiring further input from the operator.

Figure 32:
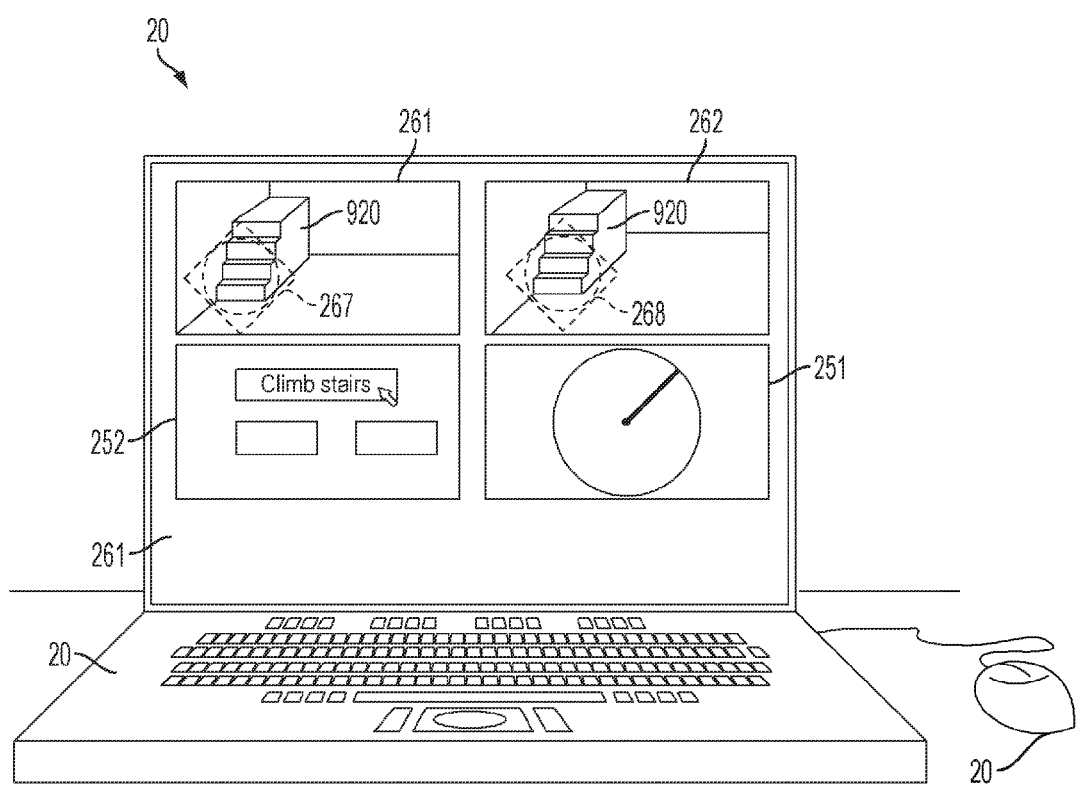
FIG. 32 illustrates an embodiment of a stair climbing behavior.

Referring to a control system console illustrated FIG. 32, an embodiment of a stair climbing behavior is initiated when the operator navigates the mobile robot 10 to within a threshold distance of the stairs, such that the stairs are visible in the image data displayed both in a drive camera window 261 and an attack camera window 262. The operator positions a first selector 267 to enclose or abut a region of the window 261 corresponding to the stairs, and similarly positions a second selector 268 to enclose or abut a region of the window 262 that also corresponds to the stairs.

With the target stairs 920 identified by the first and second selectors 267, 268, the operator can then trigger the stair climbing behavior by clicking an on-screen button or otherwise inputting a command that causes transmission of a control signal that activates the stair climbing behavior. In accordance with an embodiment of the invention, the operator further inputs whether the mobile robot 10 should climb up the stairs or descend the stairs. In another embodiment, the mobile robot 10 includes a routine for autonomously determining whether the target stairs 920 are ascending or descending relative to the mobile robot 10, and informs the stair climbing behavior accordingly.

Figure 33A:
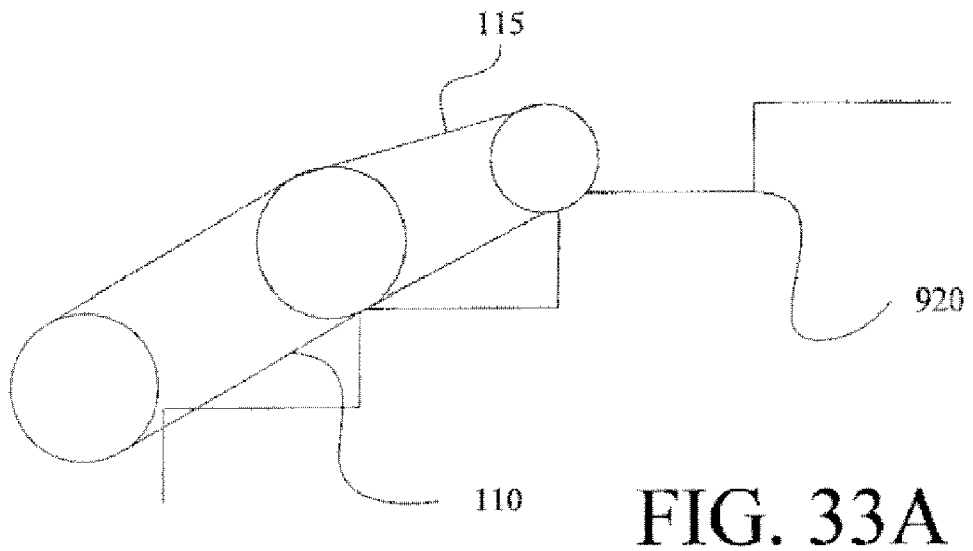
FIGS. 33A and 33B illustrate positions of a remote vehicle relative to target stairs.
Figure 33B:
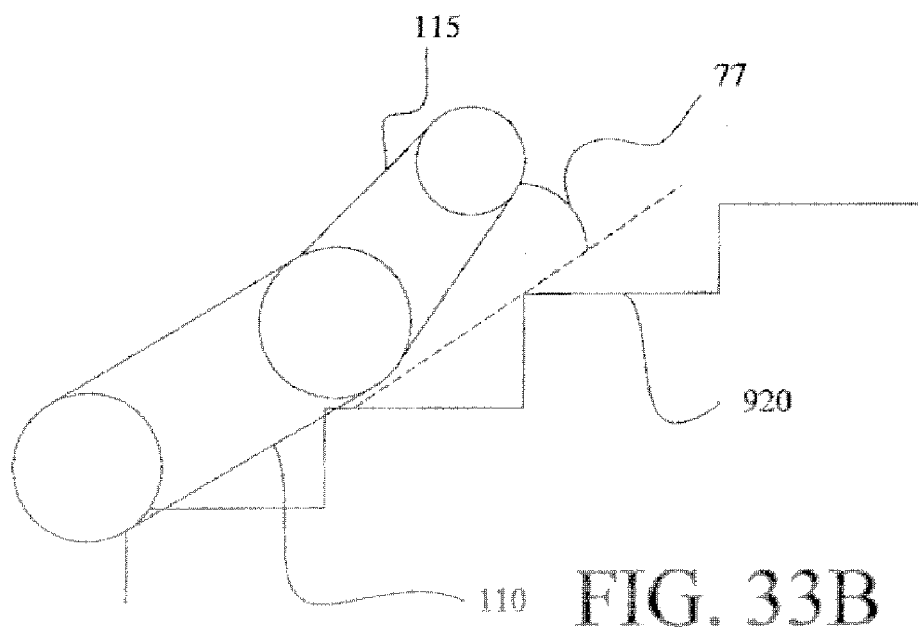

FIGS. 33A and 33B illustrate positions of the mobile robot 10 relative to the target stairs 920 as the mobile robot ascends or descends the stairs 920 in accordance with the stair climbing behavior. The mobile robot 10 may initially extend the flippers 115 to a predetermined angle to facilitate the stair climbing operation. FIG. 33A illustrates an embodiment of the invention wherein the flippers 115 may rotate out to a 180° angle relative to the main treads 110 to ensure contact with the stairs 920 and to raise the front end of the mobile robot 10 up onto the stairs 920. When descending, the mobile robot 10 may instead extend the flippers to an angle 77 that is approximately 45° relative to the main treads 110 (see the embodiment of FIG. 33B).

When the tilt sensor of the mobile robot 10 indicates that the angle of tilt of the mobile robot 10 is zero relative to the horizon, the stair climbing behavior may stop and navigation authority may be resumed by another routine.

Figure 34:
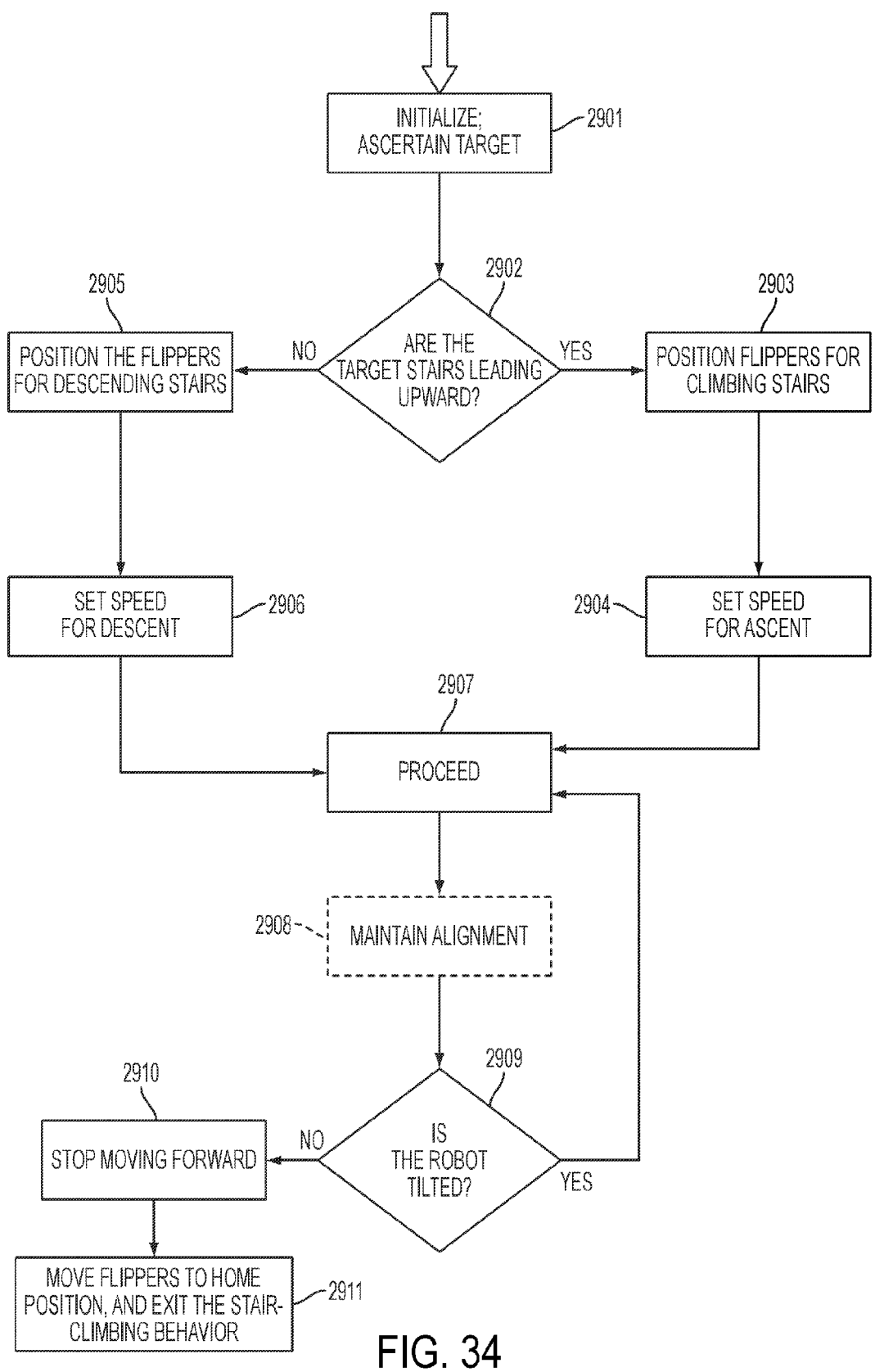
FIG. 34 illustrates an embodiment of a method for performing a stair climbing behavior.

FIG. 34 illustrates an embodiment of a method for performing the stair climbing behavior. At step 2901, the behavior initializes internal variables (by setting the initial turn rate and roll rate to zero, for example), and then determines at step 2902 whether the mobile robot 10 should ascend the stairs. If so, the mobile robot positions the flippers 115 to the appropriate angle for ascending the stairs at step 2903, outputs a speed value for ascending the stairs at step 2904, and proceeds to traverse the stairs at step 2907. The mobile robot 10 may ascend the stairs at a predetermined speed while under control of the stair climbing behavior. The predetermined speed may be, for example 0.2 meters per second.

If the mobile robot 10 is determined at step 2902 not to be intended to ascend the stairs, then the behavior positions the flippers 115 to an angle appropriate for descending the stairs, sets a speed appropriate for descending stairs, and proceeds to navigate the stairs at step 2907. Thereafter, the behavior may optionally perform steps to maintain the mobile robot's alignment with the stairs at step 2908 (for example, to prevent the robot falling off the side of unprotected stairs), and then determines at step 2909 whether the tilt sensor indicates the existence of tilt.

If tilt exists, the behavior continues to ascend the stairs 920 autonomously by returning to step 2907. Otherwise, step 2910 stops the mobile robot 10 from proceeding further, and returns the flippers 115 from the ascending or descending position back to the neutral, undeployed position at step 2911.

To ascertain whether there are more stairs to traverse, the stair climbing behavior may use a median pitch filter routine to integrate tilt sensing information from multiple sources, and to reduce false positive determinations of being level. In one embodiment, the median pitch filter routine tracks pitch information from the tilt sensor and uses only those values that fall within the median of all previously recorded values. Accordingly, the routine can reduce the detrimental impact of transient values on the determination of whether the stair traversal is complete.

According to an embodiment of the invention, the median pitch filter routine stores native pitch/roll sensor output in memory. An on-board timer then increments and the routine periodically checks whether it has been incremented by a full half second. If so, then the routine moves on to the next step. Otherwise, the routine stores the tilt sensor output, and increments the timer. The median pitch filter routine then examines the pitch/roll sensor native output over the full half second and determines the respective highest and lowest frequencies of the signal. Using this information, the median pitch filter routine then calculates the median frequency. The median pitch filter routine outputs this calculated median frequency as the pitch/roll sensor output to the robot's control assembly.

The maintain alignment routine may be used by the stair climbing behavior to keep the mobile robot 10 moving in a consistent direction with respect to the vertical axis of movement, and allows the mobile robot 10 to ascend or descend stairs with a turn rate magnitude of zero. While moving forward with a zero turn rate, for example, the routine simultaneously samples the roll angle as determined by the pitch/roll sensor output and subsequently calculates a turn rate magnitude from the output. In an embodiment of the invention, the equation by which the turn rate magnitude is calculated may be approximately k*X degrees per second, in which k is a constant having a value within the range of $\frac{1}{10}$ to 3 and X represents the roll angle. Other embodiments may use differing formulas. At one step, the routine checks the roll angle to determine whether it has a value other than zero. If so, the routine returns to the first step and moves forward with a roll angle of zero. Otherwise, the routine re-aligns the mobile robot 10 by turning the mobile robot 10 by the calculated turn rate magnitude. Once the mobile robot 10 is re-aligned, the process goes back to the first step and continues to climb forward with a roll angle of zero.

This embodiment of the stair climbing behavior utilizes a tilt sensor allowing the robot 10 to position itself without the need for walls. Alternative embodiments may include the use of a SICK LIDAR sensor to detect walls to position the robot as the robot moves up the stairs, or the use of SONAR to detect walls and position the robot as it moves up the stairs. Other alternative embodiments include a fully autonomous version of stair climbing that is implemented upon the detection of stairs. Such a version may include a sensor placed toward the outer rim of the robot's lower chassis to detect negative obstacles such as downward stairs, or may require multiple sensors to indicate that there is an obstacle within the allowed height, meaning that software routines within the robot would associate certain dimensions with stairs. Still other alternative embodiments include a routine that commands the robot to re-position its arms to 180° when it reaches the top of the stairs, or a robot that utilizes a magnetic compass or IMU in addition to or in lieu of a tilt sensor.

Preset Action Sequence

Figure 35:
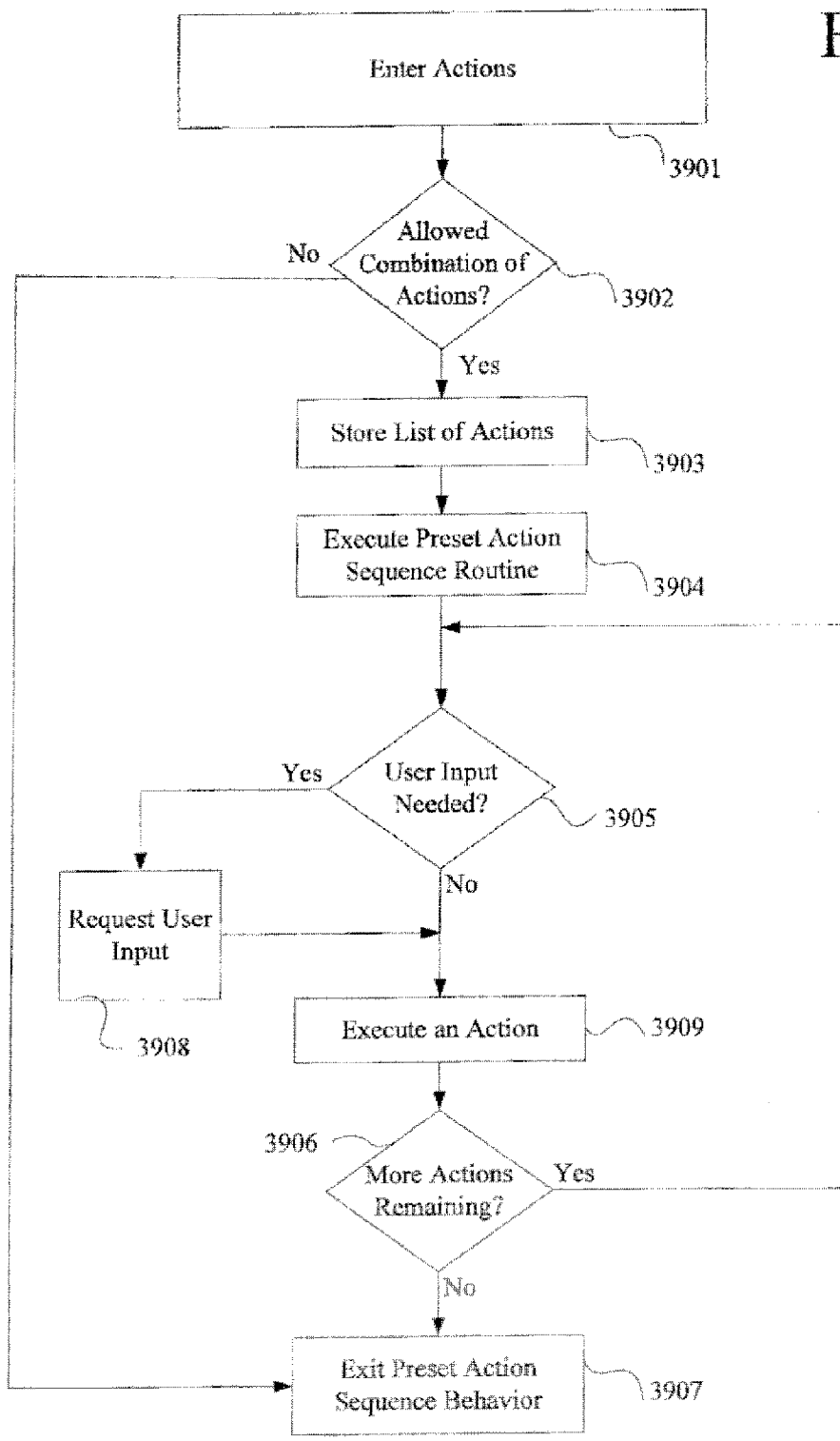
FIG. 35 illustrates an embodiment of a preset action sequence behavior.

FIG. 35 illustrates an embodiment of a preset action sequence behavior by which an operator can create a custom action sequence routine that is an aggregation of user-chosen routines and behaviors. An action sequence routine may consist of a combination of available robot behavior routines and events. Alternatively, the operator can include actions and movements available to the mobile robot 10 but not defined by a pre-existing behavior or routine. An exemplary method for constructing the preset action sequence behavior using a console as illustrated in FIG. 35 includes depressing soft keys 253 either by moving a mouse over the button image on the screen 261 and then depressing a mouse button, or by contacting and applying a force to the area on the screen 261 that corresponds to the button image 253. Once the button is actuated a command is sent to the control system 1155 to include the action or behavior routine in the preset action sequence behavior. Further methods of input include actuating buttons or switches of the control system described above, or by any other suitable method. Alternatively, a software routine of the preset action sequence behavior can be loaded directly into the mobile robot memory 1125, for example via an external memory device inserted into the mobile robot 10. Furthermore, the preset action sequence behavior can be created by recording a macro of the actions of the robot while the user is driving the robot and actuating various autonomous behaviors. Additionally, the present action sequence can be created using any combination of the methods described above.

Once the preset action sequence behavior is initiated by the operator, the operator can then input the desired sequence of behaviors, actions, and events in step 3901. Such a sequence can be any combination of autonomous behaviors, actions, and events available on the robot, and manual behaviors, actions, and events available on the mobile robot 10. Upon entering step 3901, a routine included within the preset action sequence behavior routine determines if the combination of behaviors, actions, and events chosen by the user is allowed in step 3902. Such a determination is made by evaluating the requirements for each behavior, action, and event and then inputting the determined results against a series of error checking routines that evaluate whether the selected combination is allowed per requirement vectors stored in memory. Should a combination not be allowed, the routine included in step 3902 will either alert the user of the error and perhaps require them to chose an alternative sequence, or exit the preset action sequence behavior routine step 3907.

An example of a combination action sequence that might be precluded would be the use of Speed Boost in addition to the Stair Climbing behavior. A Boolean value representative of whether the chosen action sequence is allowed is outputted. Should the value not be allowed, then the behavior routine either re-displays the initial action entry screen and perhaps instructs the user to enter a different action sequence step 3901, or exits the preset action sequence behavior. Alternatively, if a speed value is selected in the Speed Boost behavior that is incompatible with the Stair Climbing behavior, then the behavior routine may re-display the initial action entry screen and instruct the user to enter a different value for the speed. Other embodiments may make substitutions for the forbidden actions and proceed with the behavior's subsequent steps. In an embodiment of the invention, the screen also relays to the operator the conflicts present in the previous list of chosen actions. Alternatively, the screen may request that the operator change only the actions that are not allowed.

Further referring to FIG. 35, upon identification of an allowed action sequence, the behavior routine stores the selected sequence step 3903 in memory 1125. Once an allowed sequence is stored, the control system 1155 executes the preset action sequence starting in order from the first action chosen by the operator in step 3904. The step of initiating an action step 3904 is followed by a check to see if operator input is needed for the action to perform properly in step 3905. In an embodiment of the invention, a need for operator input is only indicated in absolute cases so that efficiency and autonomy is preserved. In an embodiment of the invention, autonomy is enhanced by allowing the mobile robot 10 to determine the value of operator input based on prior operator data and environmental data. In other embodiments, the mobile robot 10 may refrain from inputting data for operator inputs and should indicate when operator input is needed. If the mobile robot 10 determines that operator input is needed, it should prompt the operator to input the required data and then perform the action in step 3909. Example user input may include any one of a speed value, time duration of an autonomous behavior, a direction heading, or other value needed to execute any one of the included behaviors, actions, or events. Should the initiated action need no further user input, the behavior routine will then continue to execute autonomously and perform the action in step 3909.

Once the action has been performed in step 3909, the mobile robot 10 checks to see if there are further actions listed in the sequence step 3906. In the event that additional actions remain, the next action in the sequence is initiated and the operator input check is done before the action is performed. Otherwise, if no additional actions remain, the mobile robot 10 exits the preset action sequence behavior in step 3907. An embodiment of the invention allows the mobile robot 10 to enter another behavior or event when no additional actions remain.

An alternative routine may substitute the portion of the behavior routine associated with the execution of an action 3910, with a single step of executing the behavior routine as recorded. Such a step would not allow the user to input additional data, but would rather execute the actions in the order in which they were chosen.

Click-to-Drive and Click-to-Grip

Figure 36:
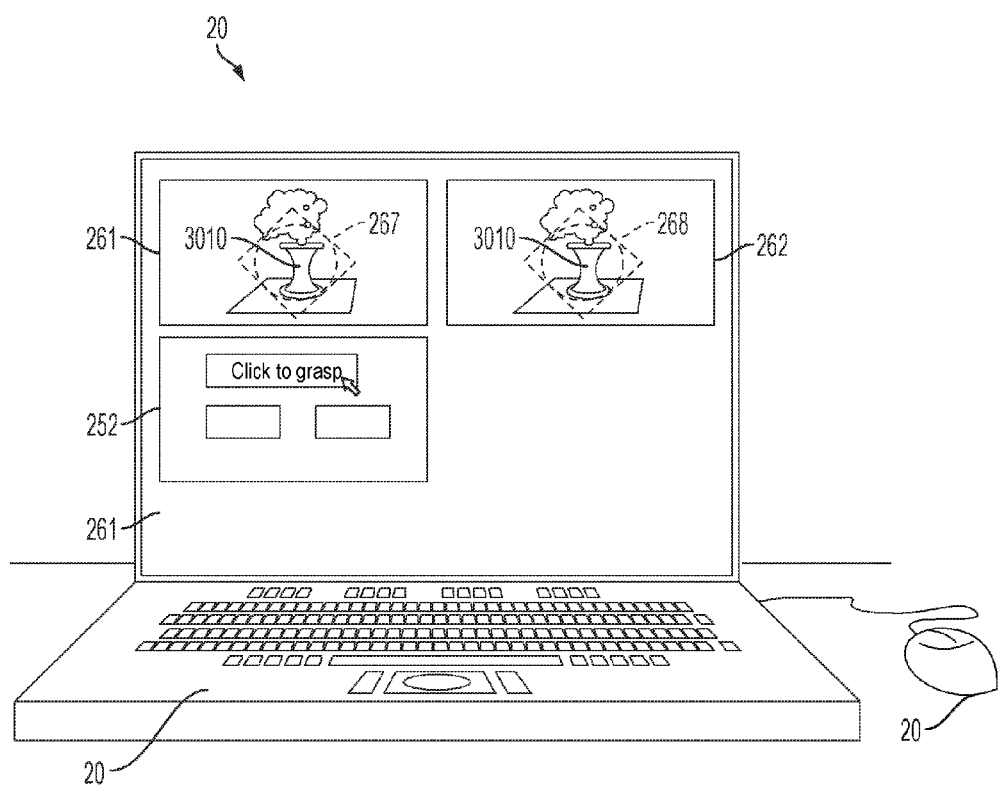
FIG. 36 illustrates an embodiment of a control system display for a click-to-grip behavior.

In an embodiment of the invention, the robot includes two "fire and forget" behaviors allowing an operator to chose a destination pixel displayed to the operator via the above-described control system and either drive toward the destination or move toward the destination and grip an item. Both of these behaviors are intended for one-time use and allow the operator to accomplish complex actuation and driving with less intervention. The click-to-grip behavior also utilizes image data from first and second cameras displayed in respective first and second windows 261, 262 to identify a target object for the behavior. The embodiment of FIG. 36 illustrates that the robot's gripper can be manipulated to move toward an object and grip the object in response to a user clicking on the object within an image of the environment. To accomplish gripping, the operator positions the first and second selectors 267, 268 to identify the target object 3010 in both the drive camera display 261 and the attack camera display 262. In an embodiment of the invention, the operator has already actuated a button or switch to actuate the click-to-grip behavior. Alternatively, the operator may additionally actuate a "begin behavior" button or switch, which transmits a control signal to the mobile robot 10 that activates the click-to-grip behavior.

Figure 37:
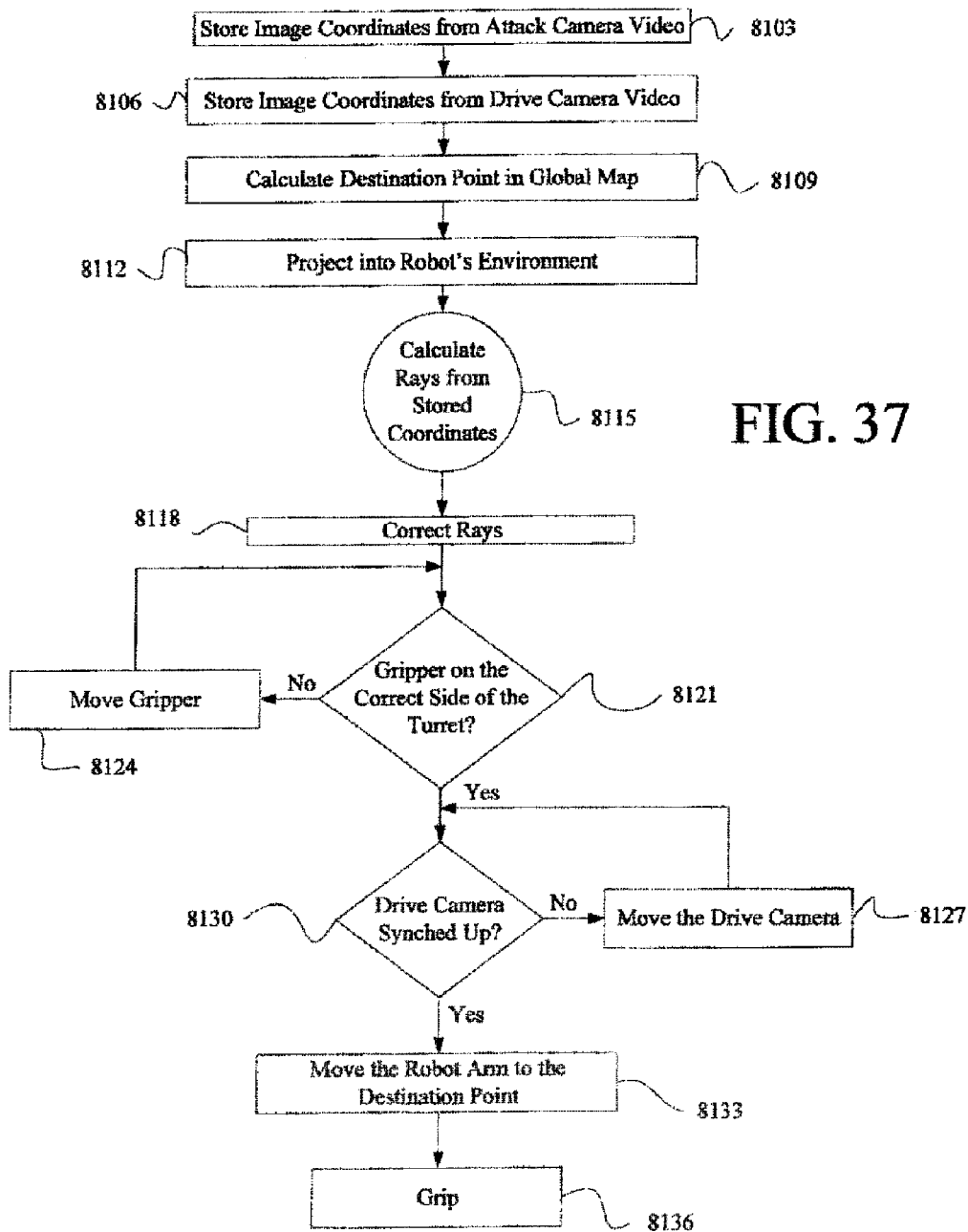
FIG. 37 illustrates an embodiment of a click-to-grip routine.

Once the object is chosen in both displays 261, 262, the position of the object within those displays is used to calculate its coordinates. FIG. 37 illustrates an embodiment of a click-to-grip routine executed during the click-to-grip behavior. Upon selection of the object by the operator, the routine stores the image coordinates from the attack camera video display 8103 and the drive camera video display 8106. Using these image coordinates and stored values corresponding to the resolution of the attack camera and the drive camera, the routine calculates the destination point 8109. The coordinates are projected into the robot's current environment 8112 and from the projected coordinates, a set of rays are calculated 8115 that are representative of travel vectors from the robot's current position to the destination position. The rays are then corrected 8118 and a check is done to ensure that the gripper is on the correct side of the turret 8121. If the gripper is not on the correct side of the turret, the robot moves the gripper 8124. Once the gripper is correctly positioned, a check is done to ensure that the drive camera is synched up with the object to be gripped 8130. If the camera is not synched up, then the robot can move the camera 8127 which may include moving the camera to a position included within the newly calculated travel vector. Once the drive camera is synched up with the destination object, the robot moves the gripper toward the destination point 8133 grips the object 8136 after arriving at the destination point.

Figure 38:
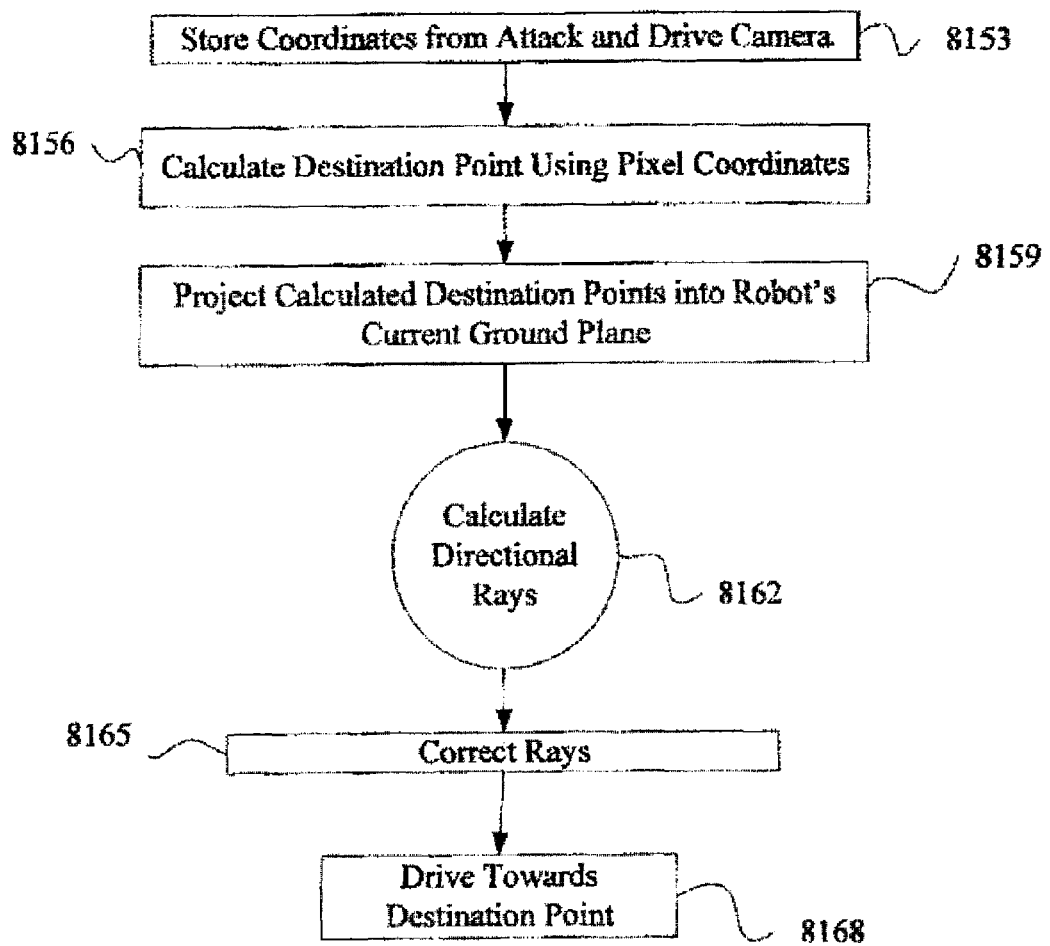
FIG. 38 illustrates an embodiment of a click-to-drive routine.

Similarly, click-to-drive uses video feed from the attack and drive cameras to determine a destination point. FIG. 38 illustrates an embodiment of a routine included on the robot for implementing click-to-drive. The routine responds to activation of the click-to-drive behavior and selection of a destination pixel by storing the selected coordinates from the attack and drive camera video displays 8153. Once the coordinates are stored, the routine calculates a destination point 8156 and projects the destination point onto the robot's current ground plane 8159 so that directional rays can be calculated 8162. Once calculated, the rays are corrected 8165 and used by the robot to drive toward the destination point 8168. Like click-to-grip, click-to-drive is a fire-and-forget behavior and therefore will terminate once the robot reaches the destination point. In an embodiment of the invention, the click-to-drive and click-to-grip behavior include fail safe routines where the behavior will terminate and reset when the robot is powered down, loses communication with the control system, or is interrupted by a behavior with a higher priority.

The present invention also contemplates an embodiment where the click-to-grip and/or the click-to-drive behavior are operable in two modes: (1) a high degree of precision mode and (2) a low degree of precision mode. The high degree of precision mode allows the operator to choose the object's corresponding pixel image on the display screen and responds to the actuation of a button triggering a gripping sequence that takes the precise pixel location and converts it to a destination point. The low degree of precision mode, on the other hand, allows the operator to choose a heading direction and responds to actuation of button triggering a sequence that flies the gripper in the general direction of the objects included within the heading. An embodiment of the invention includes a robot with the ability to choose a path within an approved heading that provides the most direct route and avoids obstacles. In both modes, the gripper moves using a "fly in motion," which actuates all joints in a fluid motion. Fly-in motion moves the claw forward in a single fluid motion actuating all necessary joints to keep the direction of movement uniform. The gripper will stop if it encounters unexpected obstacles, and will move forward 50% of the estimated distance to reduce the risk of over-travel. An alternative embodiment of the invention moves forward 100% of the estimated distance. After moving 50% of the estimated distance, the operator may reposition the gripper and then trigger the click-to-grip behavior again. Both modes can also move away from the object using the same path that was used to move the gripper forward. Further alternatives include a robot that:

uses sensors to identify the basic shape of the object and orient the wrist joint of the manipulator arm accordingly;

has motors that can fine tune the manipulator arm;

has a pre-programmed manipulator arm motion routine;

uses analysis of the object's dimensions to close the gripper's fingers until the aperture is the required size or until torque sensors in the gripper indicate that the fingers have a required amount of resistance;

has a gripper that grips the object until the grip routine exits;

has an emergency halt routine that halts the gripper and awaits instructions if an unexpected obstruction is encountered;

uses camera triangulation, camera depth-of-field, and object size estimation to estimate the range to the target; and/or has a distance sensor to provide distance feedback used by the routine to adjust movement toward the object to be gripped.

Custom (Preconfigured) Poses

Figure 39:
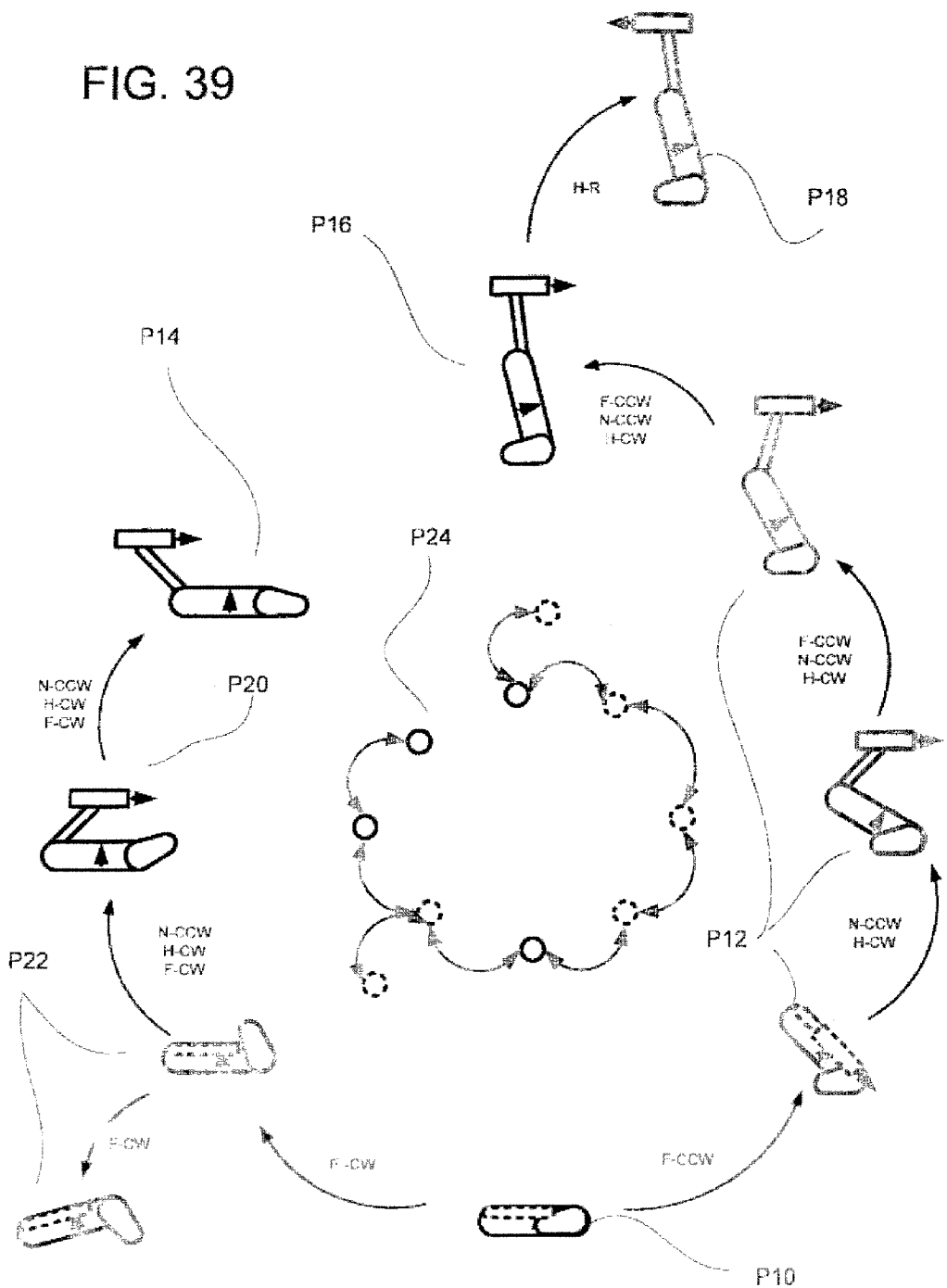
FIG. 39 illustrates an embodiment of a technique for moving among preconfigured poses.
Figure 40:
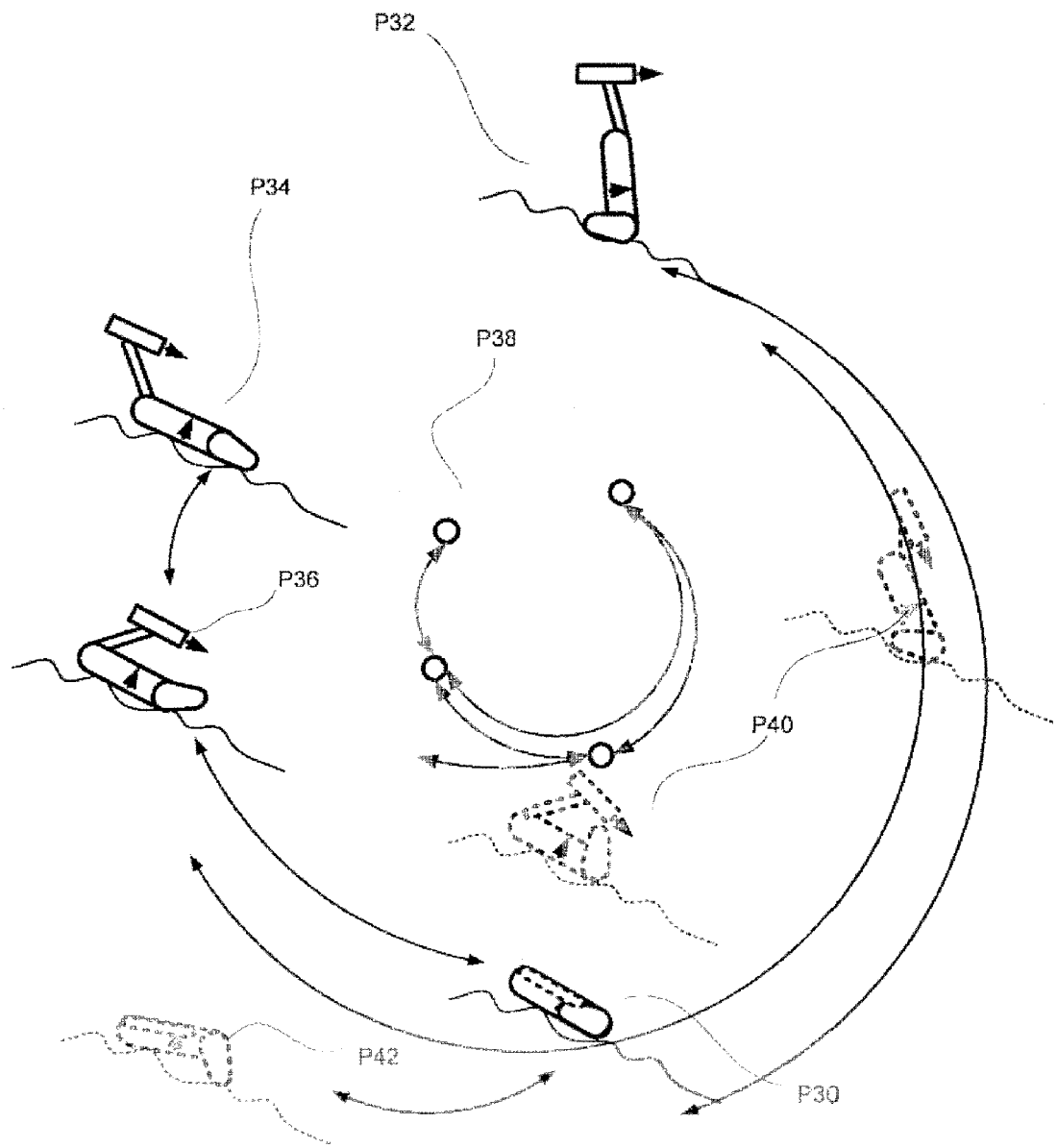
FIG. 40 illustrates another embodiment of a technique for moving among preconfigured poses.

As shown in FIGS. 39 and 40, once a preconfigured pose available via a GUI, soft button, dedicated button, switch, toggle, or other selection device has been selected, the robot must move some or all of the flippers, neck, and head with respect to the robot main body and main drive in order to move from the present pose to the preconfigured pose (e.g., prairie dog P16, stowed P10, driving on a flat surface P14, driving on a bumpy or angled surface P20, stair climbing). Some robot configurations may use symmetric flipper arm and body (each the same size), providing alternative poses (e.g., inverted Y in which the body and/or head is positioned directly above a steepled symmetric flipper and body, inverted arrow in which body and/or head are positioned above V-oriented symmetric flipper and body—which may further require inverted pendulum gyroscopic AKA "Segway" balancing). Only a few exemplary poses are shown in FIGS. 39 and 40. Actions by the robot or in which "the robot moves" mean that the actuators of the robot are driven under motor control and amplification as directed by the controller circuit on the robot itself.

Changing or returning to a preconfigured pose from any arbitrary pose may require determining the current position and orientation of the robot's body, drive or flipper arms, neck, and/or head. In an embodiment of the invention, the robot's movement is determined through the use of motor encoders (relative or absolute) and the robot's camera (with camera lens) is mounted at a controllable height above the robot's body, as controlled by the movement of the neck. A pan/tilt head with a camera is mounted at the top of the neck. The neck may contain a physical neck index switch allowing the system to reset the neck location in an absolute sense as the neck's movement passes through a specified location. By using the starting angle of the neck and motor encoders, the angular location of the neck at any given time can be calculated. Likewise, the pan and tilt position of the head camera can be calculated using the start locations. Alternatively, some or any of the flipper arm angle, neck angle, head angle (tilt), and head turn (pan) may use absolute encoders.

By using the current locations of each of the robot elements (body, flipper arm, neck, head pan & tilt) via motor encoders or other proprioceptive sensing, the static geometry of the robot itself (for example, the length of the neck and its arc of travel, the distance from the center of rotation to the base of the neck, known x, y, z locations of the center of mass of each of the body, flipper arms, neck, head) and on-board orientation sensors in any robot element (accelerometers, tilt sensors, gyroscopes, and/or horizon detection), it is possible to produce a frame of reference for each robot element. Each frame of reference is represented by a matrix giving the x, y, z location of the robot element and the rotation vectors for forward, left and up.

A similar frame of reference can alternatively be created for each element in turn using well-known Denavit-Hartenberg Parameter computations, e.g., going from the robot base toward the head and camera location. For example, the frame of reference for the neck can be computed using the body frame of reference, Denavit-Hartenberg Parameters describing the neck geometry, and the current neck angle of rotation. Using these three inputs, a new frame of reference can be computed for the neck. Similarly, the pan frame of reference is calculated, followed by the tilt frame of reference. In an embodiment where the camera is attached to the head, the frame of reference for the head is the frame of reference for the camera itself. Such calculations from sensor data, performed on the robot itself, permit the robot's starting state to be determined, e.g., including the robot's location and vector (frame of reference) and the camera's location and vector (frame of reference). Embodiments of the invention may not require all of the calculations. For a particularly robust robot, merely the element configurations as expressed by the relative position of the body, flipper arms, neck, and head may be sufficient.

FIG. 39 illustrates an embodiment of a technique for moving between positions—by mapping necessary states between preconfigured poses and current states, including necessary states P24. This state diagram shows that for some robot configurations, a loop among the states is not necessarily formed, and the path between intervening states may be limited to passing through particular sequences of intervening states. For example, a robot in stowed pose P10 (solid lines indicating a preconfigured pose), with head and neck retracted and flippers aligned along the main tracks, may be placed in any of three exemplary preconfigured poses (prairie dog P16, bumpy travel P20, and flat travel P14).

In order to move to prairie dog pose P16, in which the robot is stably elevated on the flipper tracks with the neck elevated to a substantially maximum height, the robot must begin by lifting the body, by turning the flipper tracks counterclockwise F-CCW (from the side shown in FIG. 39). As the robot moves through intervening poses P12, the center of mass/gravity of each of the body, neck, and head are maintained above the midpoint of the flipper arms. As shown in FIG. 39, this may be accomplished by specifying predetermined intervening states and actuations for the robot to pass through (e.g., where "CW" is clockwise from the side shown in FIG. 39 and "CCW" is counter clockwise, first arranging the body and head above the arms by moving the body only via the flippers F-CCW, then by elevating the neck N-CCW and head H-CW, then by unfolding all at once vertically flipper F-CCW, neck N-CCW, and head H-CW).

To return to the stowed position P10, or as shown in FIG. 39 to move to either of the driving positions P20 or P14, the robot moves back through the necessary states in the opposite order and with the opposite CW or CCW motions.

In order to move to, e.g., bumpy driving pose P20, in which the robot is stably positioned to be driven at slower speeds on the main tracks with the flipper tracks up to handle small obstacles, the neck and head being positioned behind the main body to provide a driving view but maximum static stability, the robot must begin by turning the flipper tracks clockwise F-CW (from the side shown in FIG. 39). As the robot moves through intervening poses P22, the flipper arms move to a ready-for-driving (or potentially climbing) position. As shown in FIG. 39, this may be by specifying predetermined intervening states and actuations for the robot to pass through (e.g., first arranging the flipper by moving only the flippers F-CW, then by elevating the neck N-CCW and head H-CW).

In order to move to, e.g., flat driving pose P14, in which the robot is stably positioned to be driven at higher speeds on the main tracks with the flipper tracks also in contact with the ground, the neck and head being positioned behind the main body to provide a driving view but maximum moment about the leading end to resist flipping forward upon sudden stops or braking, the robot continues from the bumpy driving pose P20 by moving the flippers F-CW, elevating the neck N-CCW and tilting the head H-CW (from the side shown in FIG. 39). In order to "return" to any of the previous preconfigured poses, the robot must pass through the intervening preconfigured poses and intermediate poses.

As discussed, FIG. 39 demonstrates a model in which intervening and intermediate poses are predefined states on a closed, not necessarily looping, state map, in order to ensure that the robot does not tip over, self collide, or inappropriately lose balance or pose in transitioning from a present pose to a preconfigured pose. This is a methodical, but less flexible approach than having the robot actively maintain balance using proprioception, tilt, acceleration, and rotation (gyro) sensors.

FIG. 40 shows an embodiment in which the robot, although passing through similar states, constantly monitors balancing proprioception (position encoders), tilt, acceleration, and/or rotation (gyro) sensors. This system may deal more successfully with uneven ground (shown in FIG. 40) than a system using predefined positions. As shown in FIG. 40, a robot on level, tilted, or uneven ground in the stowed position P30 may be moved into, e.g., prairie dog pose (on uneven ground P32), flat driving pose (on uneven ground P34), and bumpy driving pose P36 by monitoring position encoding, calculating the overall center of gravity of the robot over that portion of the robot in contact with the ground (either the main body, the main body and flipper tracks, or just the flipper tracks), maintaining the individual centers of gravity of the body, flipper arms, neck, and head in positions over a stable center of ground contact, and monitoring and/or controlling acceleration and movement of the elements to obtain relative tilt, orientation to terrestrial gravity, and/or static and/or dynamic stability. As shown in FIG. 40, because the preconfigured poses are reached by active monitoring and control of balance, the robot need not pass through all preconfigured intermediate pose states, but will pass through arbitrary, yet stable and balanced poses P40, on its way from one pose to another (e.g., from bumpy driving P36 to prairie dog P32 without passing through the stowed configuration P30). As such, the state map P38 will permit direct transition from one preconfigured pose state to another through a continuously changing, but continuously balanced pose transition, and from arbitrary current poses P42 directly to preconfigured poses P30 via a continuously changing, but continuously balanced pose transition (or a succession of continuously balanced pose transitions). The robot may also seek preconfigured poses by moving only from a present position into a confined solution space of next positions that includes only balanced poses.

In an embodiment of the invention, the robot may display to the user a representation of itself within its environment (see FIGS. 11 and 12) based on current information from the robot to the control system. Upon the user selecting a pose, the robot flippers and body move to angle themselves using accelerometers that input a direction of gravity reference. To achieve, for example, a prairie do position, accelerometer input is used by the robot to position its body at about 55° plus or minus about 2° from the horizontal (with respect to gravity). The robot tries to position its body at this orientation even on non-level ground. The robot is kept balanced during pose transitions by monitoring its body position relative to the horizontal. As can be seen from the illustrated prairie dog position, the neck may be set at about 130° relative to the body.

In an embodiment of the invention, the prairie dog pose may need to be deactivated to tilt the robot head, but no to pan it.

In an embodiment of the invention, the robot returns from the prairie dog pose to a driving position quickly, if not gracefully, to facilitate expedient withdrawal or other movement.

In an embodiment of the invention, the robot can be controlled to actively return to a preconfigured pose set when disturbed via the continuously balanced pose transition, including a self-righting routine intervening before the robot seeks the last set preconfigured pose. For example, if the robot is temporarily forced into a different pose, or is tipped over or otherwise disturbed, using tilt sensors, proprioceptive encoders, accelerometers, and/or gyro sensors, it may detect this and initiate seeking of the predetermined pose. In moving to ad from preselected poses, a embodiment of the invention further includes an inherent collision avoidance behavior or system that uses a geometric model of the robot in its environment to ensure that the robot parts will not collide with each other when moving to and among poses.

Preferably, each pre-selected pose is activated by either depressing a button included on the keyboard of the operator control unit 20, or by depressing a soft key displayed on the operator control unit's display screen 5010. Morphing into a preselected pose requires that the remote vehicle 10 reposition its body from its current position into an alternative position, which further requires the remote vehicle 10 to mobilize its body within the immediate space surrounding the remote vehicle 10. Movement within the immediate space surrounding the remote vehicle 10 can be dangerous when the remote vehicle 10 is performing inherently dangerous tasks such as firing a weapon mounted to the remote vehicle's chassis, or searching for explosive devices. It is therefore preferable that the operator control unit 20 require that the custom pose behavior include a preliminary arming routine.

Figure 63A:
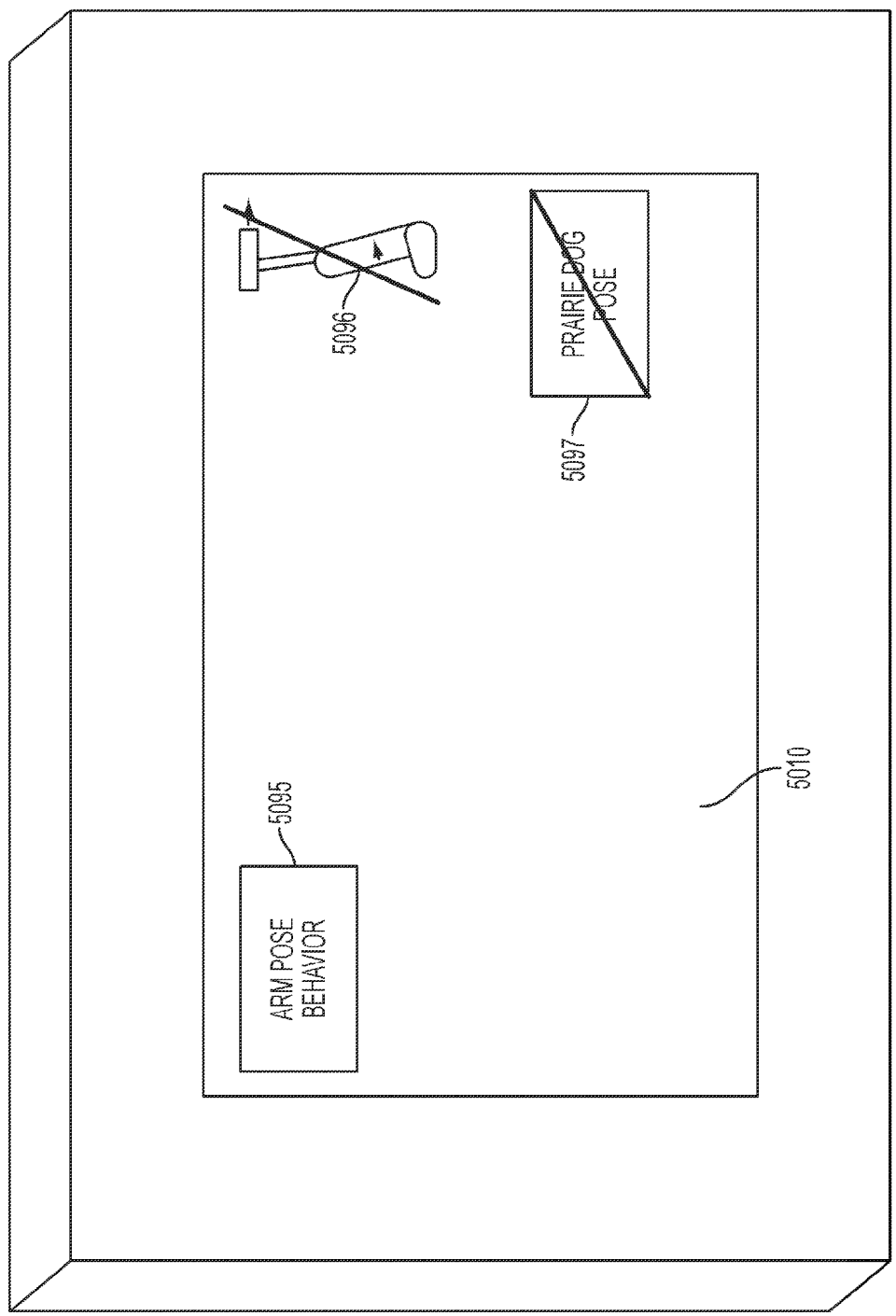
FIGS. 63A and 63B illustrate embodiments of an operator control unit's display screen.

Illustrated in FIG. 63A is the operator control unit's display screen 5010 that includes a number of soft keys configured to activate software routines included on the operator control unit 20 when a force is applied to an area on the display screen 5010 corresponding to the graphical representation of the soft key. The arming routine of the custom pose behavior is configured to execute when the "Arm Pose Behavior" soft key 5095 is depressed. When the arming routine executes, the arming routine enables the arming behavior, and further enables the graphical representation of each preset pose, and enables the soft keys included on the display 5010 that are configured to activate each preset pose. Graphical representations of the poses are included to further alert the user to the status of the arming behavior. For example, a graphic representative of the prairie dog pose 5096 is included on the display 5010, and is displayed with a line passing through the graphic to indicate that the custom pose behavior is disabled. Furthermore, a "Prairie Dog Pose" soft key 5097 is included on the display screen 5010 and is configured to activate the prairie dog pose when depressed. A display of the "Prairie Dog Pose" soft key 5097 with a line passing through it also indicates that the custom pose behavior is disabled. Furthermore, when the "Prairie Dog Pose" soft key 5097 is disabled, the soft key is configured not to respond to a force applied to the area of the display screen 5010 corresponding to the "Prairie Dog Pose" soft key 5097.

Figure 63B:
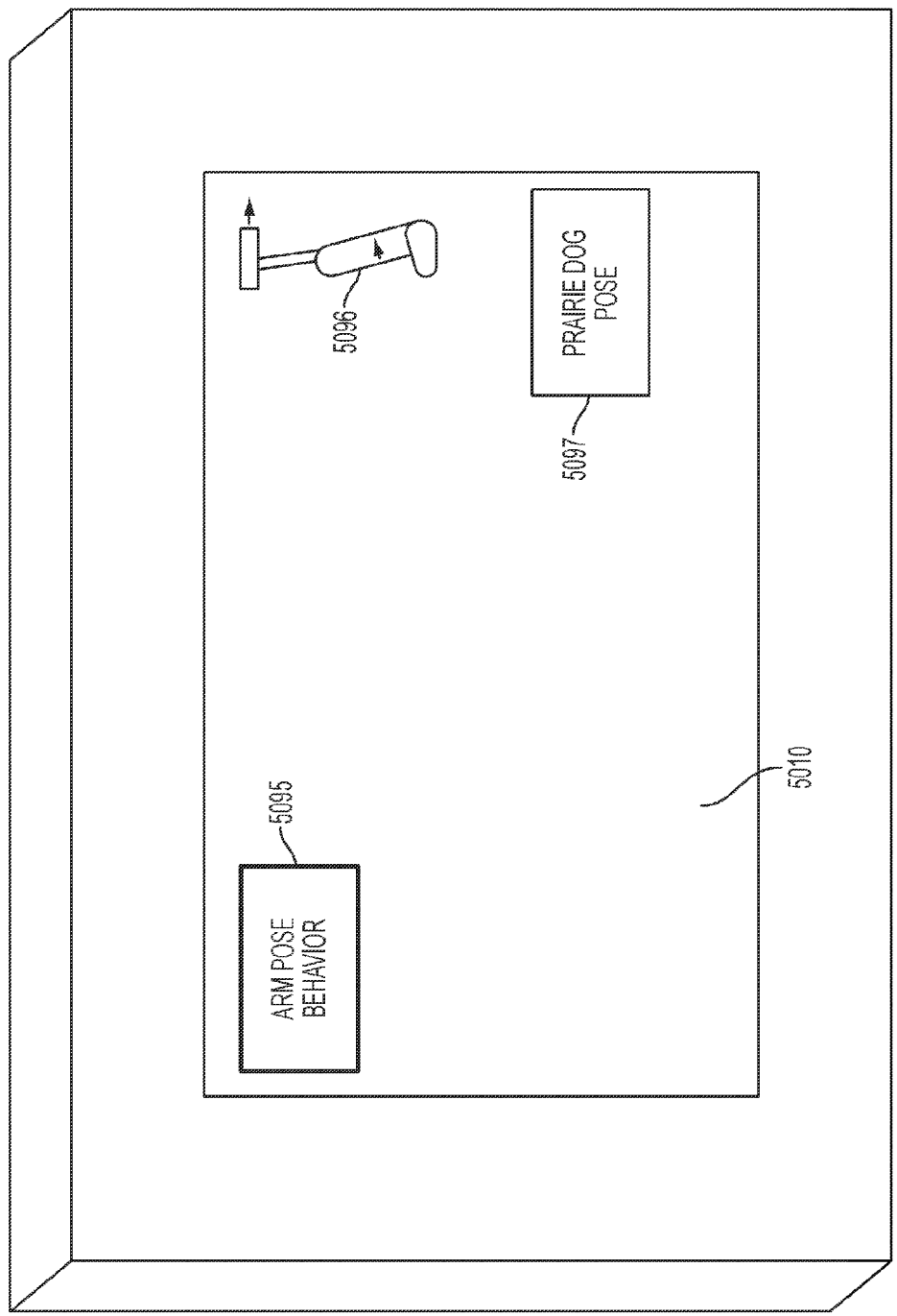

Illustrated in FIG. 63B is the operator control unit's display screen 5010 after the "Arm Pose Behavior" soft key 5095 is depressed. When the key 5095 is depressed, the arming routine executes and further enables the custom pose behavior, displays a prairie dog pose 5096 graphic that does not have a line through the graphic, displays a "Prairie Dog Pose" soft key 5097 that does not have a line through the button graphic, and further enables the "Prairie Dog Pose" soft key 5097 so that when the user depresses the key 5097, the custom pose behavior sends a command to the remote vehicle 10 to morph into a prairie dog pose. While the above is a preferred embodiment, other embodiments may include a custom pose arming routine that executes when a button is depressed, when a software routine is called, when a sensor event is sensed, or when a command is inputted into the operator control unit 20 by the operator.

Autonomous Flipper Behavior

Autonomous flipper behavior allows an operator to operate the robot manually while the flippers are in an autonomous mode. The behavior autonomously identifies surface conditions and can use this data to trigger the autonomous flipper behaviors. When constantly running in the background, autonomous flipper behavior is considered a persistent behavior. Possible terrains to identify include: (1) soft terrains which may include snow and sand; (2) hard smooth terrains such as building interiors or roadways; and (3) firm broken terrain such as fields or dirt roads. For each terrain, there is a corresponding flipper position that works best. For example, flippers rotated into the retracted position work best on soft terrains, and flippers extended upwards works best on hard smooth terrains. Other inputs that could trigger autonomous flipper behavior include the robot being lifted high off the ground by an object which the robot traversed. In an embodiment of the invention, autonomous flipper behavior draws upon data flows already present—operator drive commands, accelerometer spectral density, and load on the drive motors. More experienced users may disable the automated behaviors and manually control the flippers as needed.

An embodiment of the invention determines terrain type using spectral density of the vehicle's onboard accelerometer readings to identify the amount and type of vibration the robot is encountering. This data is correlated with other inputs to identify conditions requiring flipper position modification. For example, high centering shows negligible accelerometer vibration and rough terrain shows large jolts. Alternative or addition sensor input to consider includes video jitter and flow, comparing odometry to an external reference such as GPS, and tracking the fiber optic control line's feed-out speed. High centering a situation where the treads do not make solid contact, resulting from an encounter with an obstacle high enough to lift the robot's chassis. The ideal configuration for driving over unknown terrain for instance is with the flippers in front and raised at 30 to 45 degrees relative to the surface.

In an embodiment of the invention, operation in soft terrain causes the autonomous flipper behavior to maximize the amount of driven surface contacting the ground. To accomplish this, the flippers are lowered in front of the vehicle or tucked along the side of the vehicle. When the flippers are extended, there is a possibility that a flipper will dig into the soft ground.

In high center events, an embodiment of the invention directs the vehicle to mobilize the tracks in a swimming motion, continuously rotating the flippers overhand and driving the tracks only when the flipper is in contact with the surface. When engaged, tracks are propelled at the same rate that the flipper is expected to pull the vehicle forward. In swimming, the optimal speed of flipper rotation is based not on the absolute length of the flippers but on their effective length (the area in effective contact with the ground), which changes as the surface density changes. By measuring the changes in angle of the vehicle as the flippers rotate, it is possible to calculate optimal speeds.

Retro Traverse

In an embodiment of the invention, a retro traverse behavior autonomously navigates the mobile robot 10 back along a return path interconnecting various previously traversed coordinates. The retro traverse behavior may be activated by user request or automatically when trigger conditions are detected by the mobile robot 10, such as when no control signal has been received after a threshold period of time; or may be activated explicitly by the operator inputting an activation command. If automatically triggered, retro traverse acts as a persistent behavior.

Figure 41:
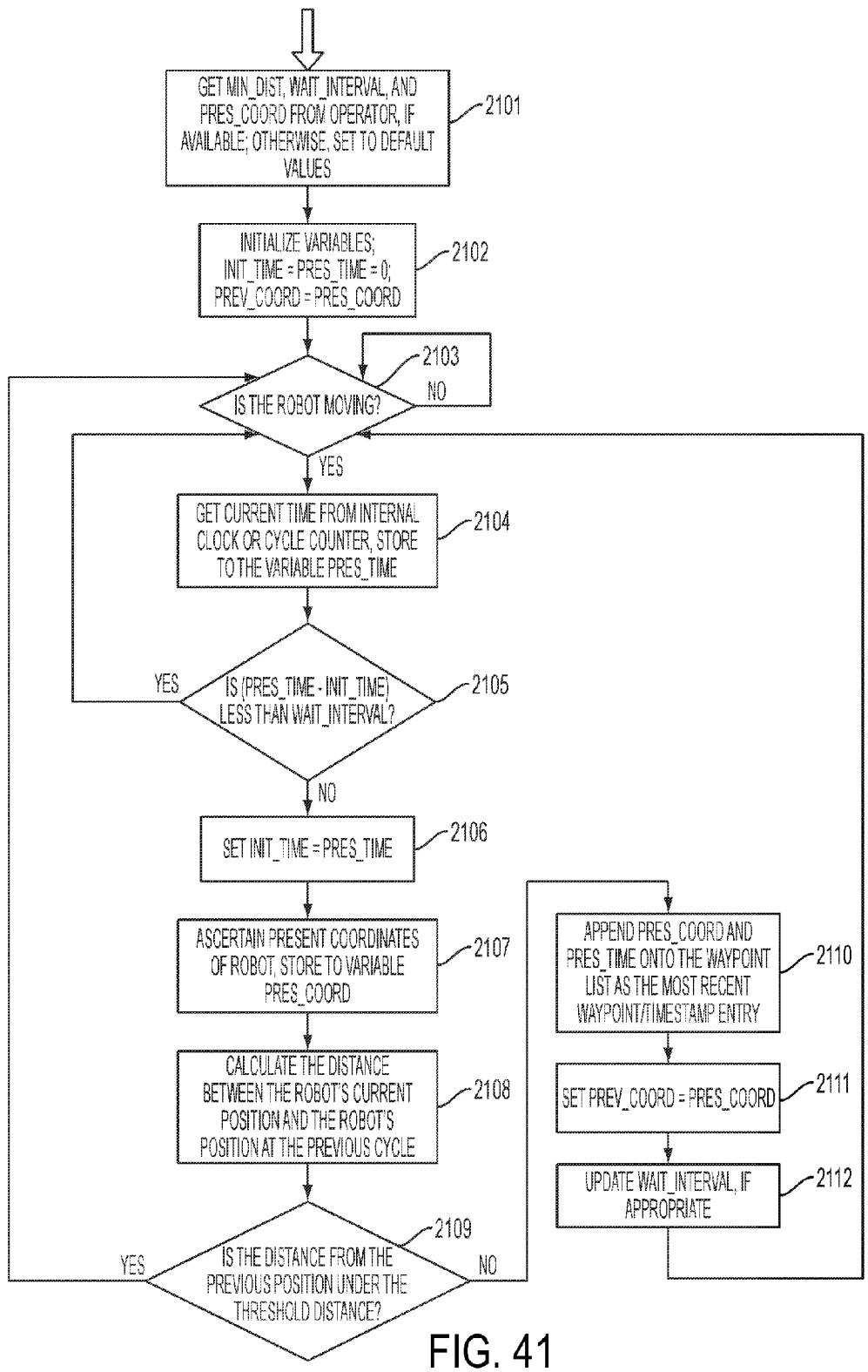
FIG. 41 illustrates an embodiment of a waypoint routine.

To perform retro traverse according to an embodiment of the invention, the mobile robot 10 records waypoints at intermittent times when the mobile robot 10 is moving. FIG. 41 illustrates an embodiment of a waypoint routine. At step 2101, the routine receives the values for variables min_dist (the minimum distance by which successive waypoints should be separated), wait_interval (the period of time the routine should wait before recording a next waypoint) and pres_coord (the present coordinates of the mobile robot 10, as provided by a position reckoning system), and step 2102 initializes several variables, setting init_time (the initial timestamp) and pres_time (the current time of the present execution cycle) to zero, and prev_coord (the coordinates ascertained for the previous execution cycle) and pres_coord (the currently ascertained coordinates of the mobile robot 10) to zero, as well.

It is determined at step 2103 whether the robot is moving and, if not, the process loops back to step 2103. Otherwise, step 2104 gets the current time (such as from a clock or cycle counter) and stores it to the variable pres_time. It is then determined at step 2105 whether sufficient time has passed since the initial time and, if not, the process returns to step 2103. If sufficient time has passed, then step 2106 assigns the value of pres_time to the variable init_time; step 2107 ascertains the present coordinates of the mobile robot 10 and stores them to the variable pres_coord; and step 2108 calculates the distance between the mobile robot's current position and the position of the mobile robot 10 ascertained at the immediately previous cycle.

If step 2109 determines that not enough distance has been traversed since the previous cycle, then the process returns to step 2103. Otherwise, step 2110 appends the values of pres_coord (as a positional record) and pres_time (as the corresponding timestamp) to the list of recorded waypoints; step 2111 sets the value of prev_coord to the same value as pres_coord; and step 2112 updates the variable wait_interval, if necessary or appropriate, before returning to step 2103.

Accordingly, the waypoint routine maintains a list of recorded waypoints separated by at least minimum permitted differences in time and distance. The retro traverse behavior can then utilize the list of recorded waypoints to generate a return path interconnecting the waypoints, in reverse order of timestamps.

Figure 42:
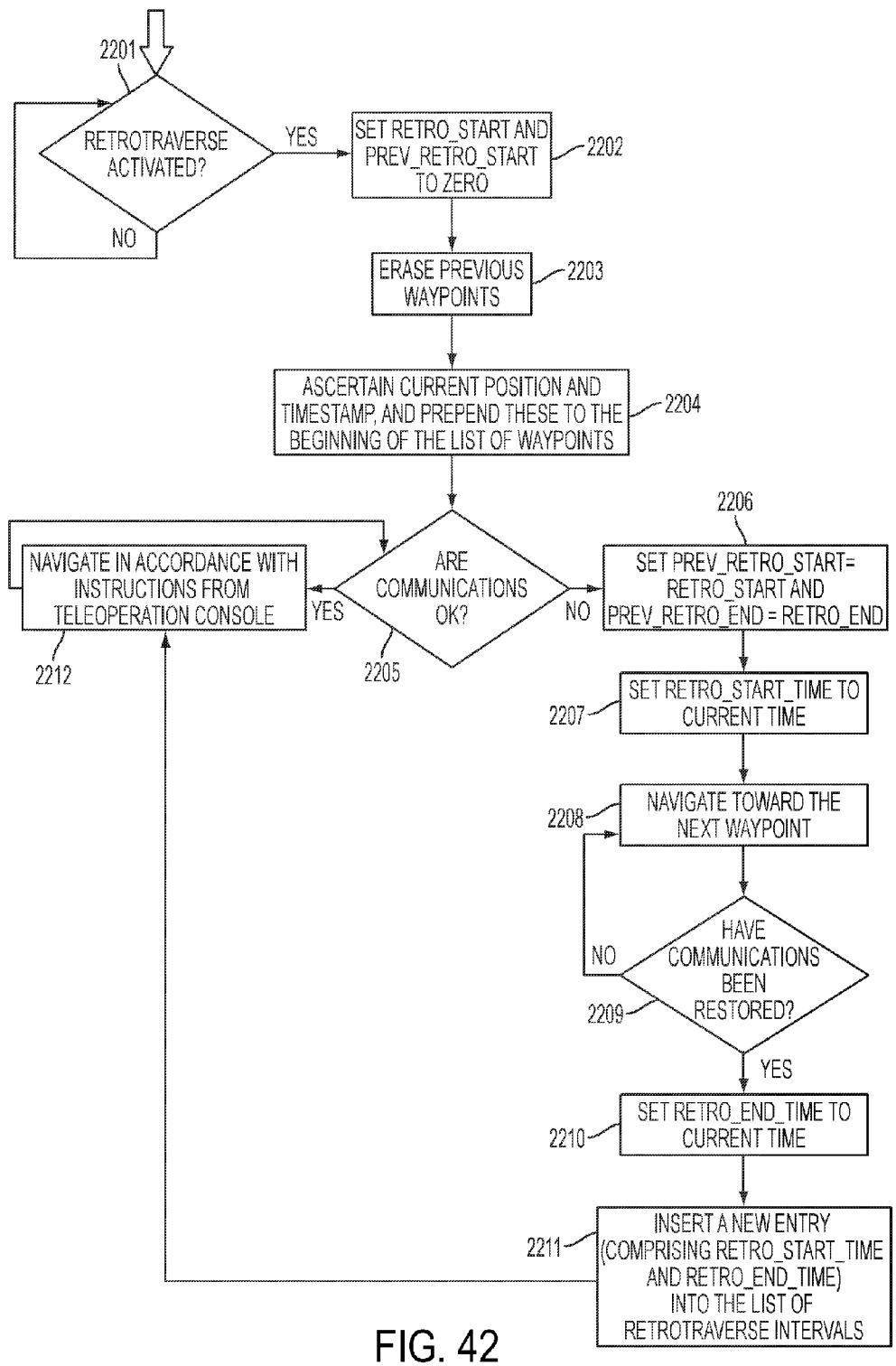
FIG. 42 illustrates an embodiment of a retro traverse behavior.

FIG. 42 illustrates an embodiment of a method for performing a retro traverse behavior. At step 2201, it is checked whether the behavior is active and, if so, the behavior proceeds to step 2202 (otherwise looping back to step 2201). Step 2202 sets the values of retro_start and prev_retro_start to zero; step 2203 erases any previously used waypoints; and step 2204 ascertains the current position of the mobile robot 10 and the current time, which are prepended to the list of recorded waypoints.

At step 2205 it is determined whether a control signal has been properly received. If so, then step 2212 proceeds to navigate the robot based on the instructions received from the operator. Otherwise, step 2206 sets the value of prev_retro_start to retro_start, and prev_retro_end to retro_end; step 2207 sets the value of retro_start_time to the current time; and step 2208 navigates the mobile robot 10 toward the next previous waypoint retrieved from the list of recorded waypoints for one execution cycle. If step 2209 determines that communication has not been restored, the behavior returns to step 2208 and continues navigating toward the waypoint; otherwise, step 2210 sets retro_end_time to the current time and step 2211 inserts a new entry (comprising the values of retro_start_time and retro_end_time) into a list of retro traverse intervals before proceeding to step 2212.

By maintaining a list of previously-performed retro traverses (for example, by recording a list of start/end time pairs for each period of time the retro traverse behavior is activated and deactivated), the retro traverse behavior can ignore any waypoints that are recorded during retro traverse operation, as these are spurious for future retro traverse purposes. That is, after the mobile robot 10 has finished a retro traverse, it records the range of timestamps on the points it retraced and that it created on its path back. On its next retro traverse, it may ignore those points.

Figure 43:
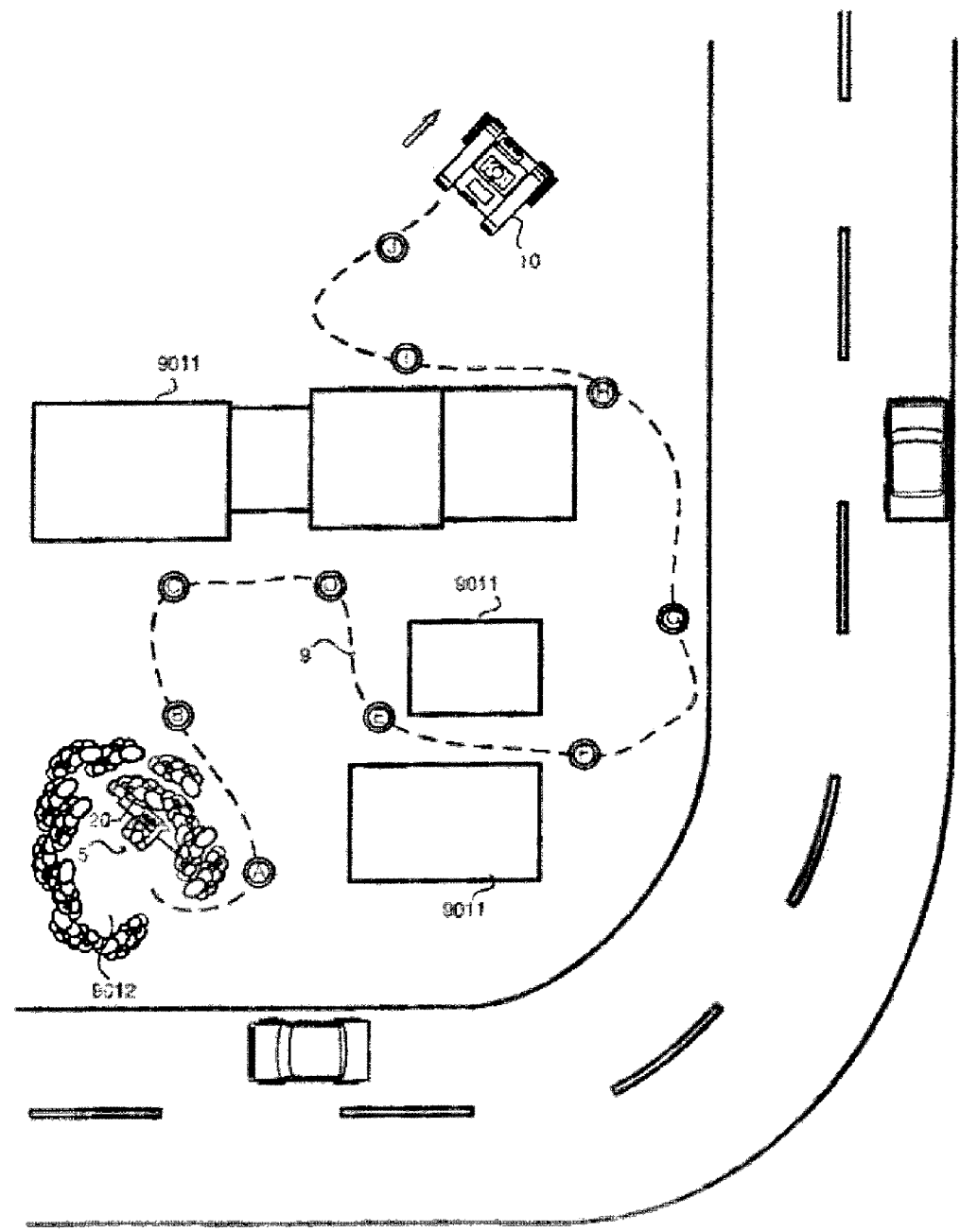
FIG. 43 illustrates an embodiment of remote control operation of a remote vehicle in an urban combat zone.

An embodiment of remote control operation of the mobile robot 10 in an urban combat zone is shown in FIG. 43. An operator 5 is positioned within a sandbag-enclosed bunker 9012 adjacent a roadway. The mobile robot 10 proceeds out from the bunker 9012, under control of the navigation commands transmitted, preferably wirelessly, by the operator. As shown by the curved dotted line, the mobile robot 10 then traverses a path between various buildings 9011.

At various times during navigation of the mobile robot 10, waypoints A through J are recorded. Each recorded waypoint includes information regarding the position of the mobile robot and a timestamp indicating when the position was sampled. The waypoints may be recorded in the electronic memory of the mobile robot 10 in a suitable data structure (e.g., as a doubly-linked, indexed list, sorted chronologically by timestamp) to permit forward and reverse list traversal as well as indexed access to the waypoints, for example.

As the mobile robot 10 proceeds further away from the operator, or when an obstacle such as the buildings 9011 sufficiently impede wireless communication, the mobile robot 10 may fail to receive the control signal transmitted by the operator. Therefore, as an example of a persistent autonomous behavior, the retro traverse behavior may be activated by the robot 10 when it determines that communication is lost.

Figure 44A:
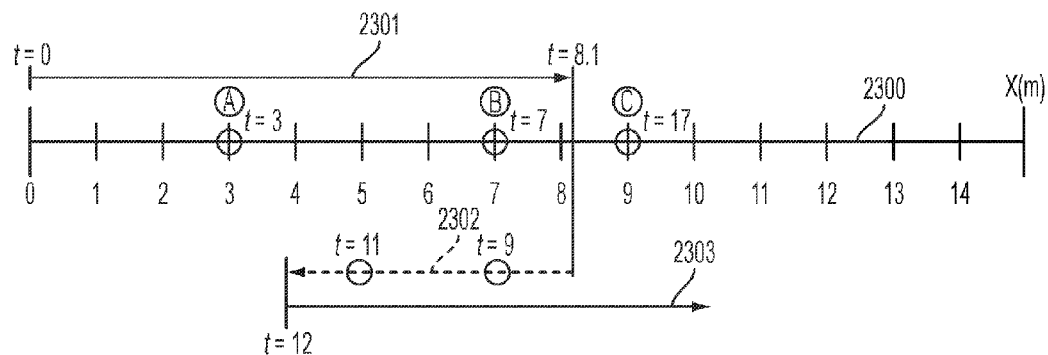
FIGS. 44A and 44B illustrate a retro traverse behavior.

Another embodiment of a retro traverse behavior is illustrated in FIG. 44A, in which the robot traverses either forward or backward along a single line 2300. First the mobile robot 10 proceeds out along the line 2300 during a first outbound leg 2301. In this case, the waypoint routine records waypoints A and C at positions x=3 and 7. When the mobile robot 10 starts retro traversing, it uses these waypoints because no previous retro traverse has yet been performed.

In the embodiment of FIG. 44A, the first outward leg 2301 stops just after t=8 (at which time the mobile robot 10 may have lost radio contact with the operator or received instructions to stop, inter alia). The first retro traverse leg 2302 then begins at t=8.1 and continues until t=12, at which time the mobile robot 10 stops retro traversing and resumes outbound traversal along the second outbound leg 2303 (e.g., after regaining communications with the operator). During the first retro traverse leg 2302, the mobile robot 10 again travels over points B and A, but does not proceed all the way back to t=0. Also during the first retro traverse leg 2302, the waypoint routine generated waypoints at t=9 and t=11.

So the retro traverse interval t=8.1 to 12, representing the start time (t=8.1) and end time (t=12) of the retro traverse leg 2302 is added to the list of retro traverse intervals, and any waypoints having a timestamp within this range (in this case, the waypoints at t=9, 11) are excluded on any subsequent retro traverse.

Figure 44B:
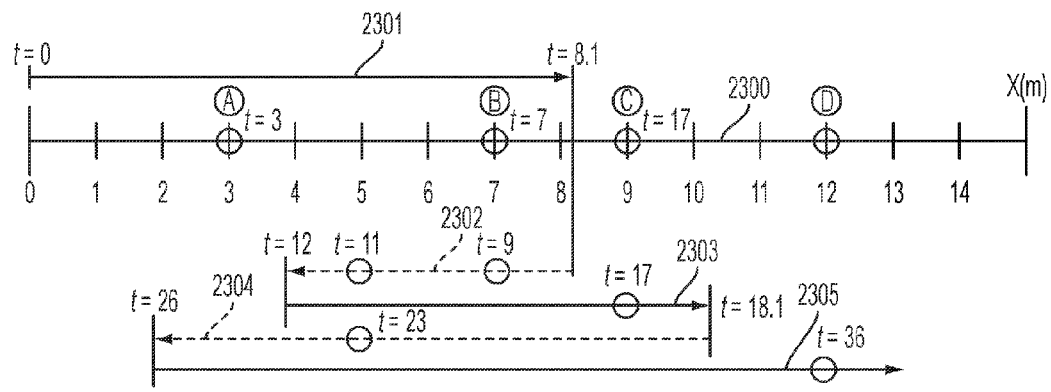

FIG. 44B illustrates an embodiment of the invention that continues from the example shown in FIG. 44A. The mobile robot 10 proceeds along the second outbound leg 2303 until t=18, when retro traverse is activated again. When this second retro traverse leg 2304 starts, the retro traverse behavior retrieves the list of waypoints having timestamps t=17, 11, 9, 7, 3, 0.

From the list of waypoints, the behavior removes from consideration all recorded waypoints having a timestamp within the interval t=8.1 to 12, resulting in a pruned list t=17 (corresponding to C), t=7 (corresponding to B), t=3 (corresponding to A) and t=0 (an implicit, unnamed timestamp corresponding to the beginning of the robot's movement). This pruned list corresponds to the desired straight path back to the beginning of the journey. Following the second retro traverse leg 2304 ending at t=26, a second retro traverse interval t=18 to 26 is appended to the list of recorded retro traverse intervals (resulting in a list of intervals comprising the two entries [8.1, 12] and [18, 26]) and the third outbound leg 2305 then starts (resulting in a third waypoint D recorded at t=36).

If a third retro traverse leg (not shown) were to start, it would accordingly ignore all waypoints with timestamps within the intervals 8.1 to 12 and 18 to 26.

To ensure smooth navigation and avoid abrupt veering or swerving in the vicinity of corner points along an intended path of travel, the mobile robot 10 may base its navigation on a lookahead vector. A lookahead vector can be defined in the following way: a starting point lies at the closest point on the path to the mobile robot 10, and an ending point is a point farther along the path that is either at a maximum distance away, or at a shorter distance as determined by the curvature of the path and/or other factors. For example, the mobile robot 10 may continuously drive toward a virtual point approximately 1 meter in front of it along the intended path. In some implementations, the distance that the mobile robot 10 looks ahead may be variable, depending upon the geometry of the lookahead vector.

In addition, rather than always manipulating the x-y coordinates of points directly, navigation of the mobile robot 10 may utilize a line-segment abstraction of the intended path. First, when retro traversing, the return path can be represented as a set of piecewise continuous, conjoining line segments rather than a set of points. The mobile robot 10 may perform most of its calculations in terms of the tangent and perpendicular to the line segment the mobile robot 10 is traversing instead of based on the vector difference to the next waypoint. Accordingly, the mobile robot 10 may reduce or eliminate sharp turning when it approaches waypoints conjoining two path line segments at acute angles.

Secondly, once the robot has pre-computed the tangents and lengths of the line segments, a point can be expressed as a distance along the path. For example, letting λ represent the tangent unit vector to the i$^{th}$ line segment, then a point r with path length l has a position $$r = \sum_{i=0}^{n} a_{i_\lambda}$$

where $a_i$ represents the length of the i$^{th}$ segment for i=0 to n−1 and $$a_n = l - \sum_{i=0}^{n-1} a_i.$$

Further, the retro traverse behavior may implement a predetermined cycle of calculations to follow a return path:
  Determine on which line segment the robot is currently traversing;
  Calculate the end of the lookahead vector; and
  Calculate motion commands.

The calculations may be done in the listed order during a cycle of the behavior system because the mobile robot 10 moves after all of the calculations have been completed.

The retro traverse behavior may use a radius of interception to determine whether the mobile robot 10 has reached a waypoint, or a perpendicular plane to determine when the mobile robot 10 has passed a waypoint. Preferably, however, the mobile robot 10 keeps track of which line segment of the return path it is traversing. Since the lookahead vector keeps track of the local area that the robot's motion is based on, the only line segments of the retro traverse path that the robot needs to consider are those spanned by the lookahead vector. The retro traverse behavior then determines the closest of these line segments and sets that as its reference.

Figure 45A:
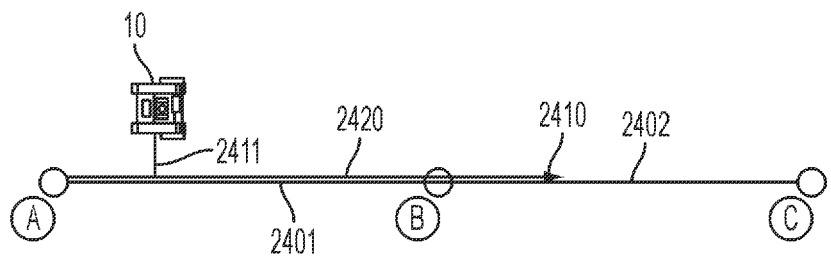
FIGS. 45A-45C illustrate a retro traverse behavior.

FIG. 45A illustrates an embodiment of the invention where the lookahead vector 2410 extends from the mobile robot 10 along a linear return path including a first line segment 2401 and second line segment 2402 interconnecting waypoints A, B and C. The mobile robot 10 computes its distance to all the line segments between the beginning and the end of the lookahead vector 2410. The line segment closest to the mobile robot 10 is the one it associates with. In the embodiment of FIG. 45A, the robot associates to the first line segment 2401 via the perpendicular line 2411.

Figure 45B:
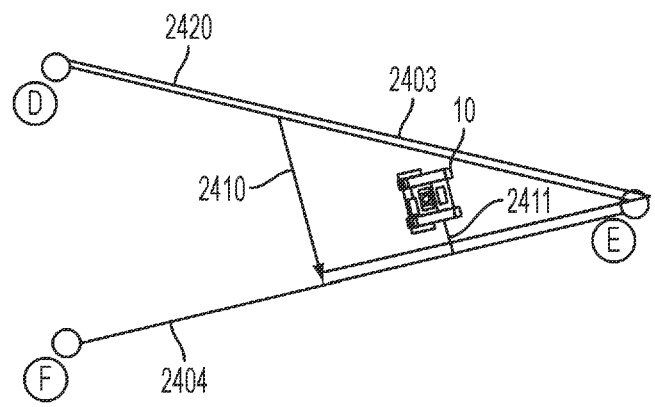

In an embodiment illustrated in FIG. 45B, third and fourth line segments 2403, 2404 interconnecting waypoints D, E and F, form an angle with waypoint E as the corner. Here, on the previous iteration, the mobile robot 10 determined it was closest to the third line segment 2403, and thus the lookahead vector 2410 starts there for the present cycle. However this time it finds that it is closest to the fourth line segment 2404, meaning it has passed waypoint E.

Figure 45C:
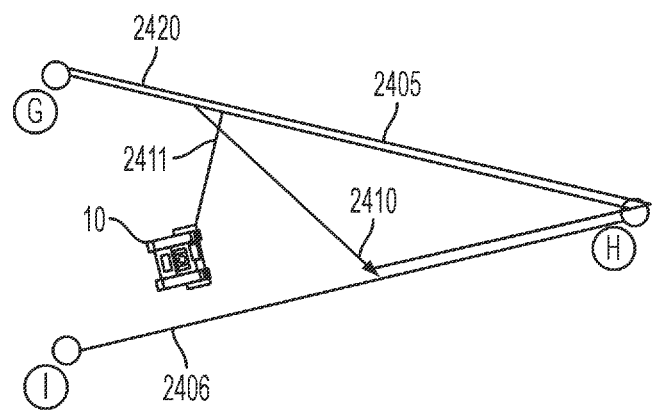

FIG. 45C illustrates a situation similar to the arrangement of FIG. 45B; however, in FIG. 45C, the lookahead vector—which is rooted in the fifth line segment 2405—does not extend all the way out to the closest point on the sixth line segment 2406. In this case, the mobile robot 10 should not associate with the sixth line segment 2406 because then the mobile robot 10 would short cut the desired path. Accordingly, the lookahead vector preferably gets shortened in order to avoid taking short cuts that bypass waypoints. To achieve proper paths without shortcutting, the retro traverse behavior does not accept any line segments for which the closest point to the mobile robot 10 is beyond the end of the lookahead vector.

In the embodiment of FIG. 45C, the mobile robot 10 stays on the fifth line segment 2405 despite it being farther away than the sixth line segment 2406. Once the mobile robot 10 has determined which line segment it is on, it calculates the closest point to the mobile robot 10 on that line segment. This point is then used as the origin of the lookahead vector for the subsequent iteration.

After determining the beginning of the lookahead vector, the retro traverse behavior next determines where the end of the lookahead vector is. Referring to an embodiment of the invention illustrated FIGS. 46A through 46D, the lookahead vector 2510 may have a length established by default to a predetermined value (e.g., one meter long). However, the retro traverse behavior may be implemented so as to ensure that the mobile robot 10 drives at least within a maximum permitted distance of each waypoint. If the lookahead vector 2510 were to always stay at its full default length, the mobile robot 10 might traverse a route with all the curves excessively smoothed out in some circumstances.

Figure 46A:
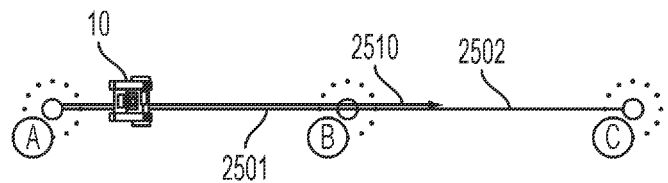
FIGS. 46A-46D illustrate a retro traverse behavior.

In view of this, the embodiment of FIGS. 46A through 46D demonstrate a system for determining when and how to shorten the lookahead vector 2510 to keep the mobile robot 10 aligned with the intended path. FIG. 46A shows a straight-line path comprising first and second line segments 2501, 2502. In this case, the path of mobile robot 10 passes well within the permitted distance from waypoint A and accordingly, the lookahead vector 2510 may remain at its full default length.

Figure 46B:
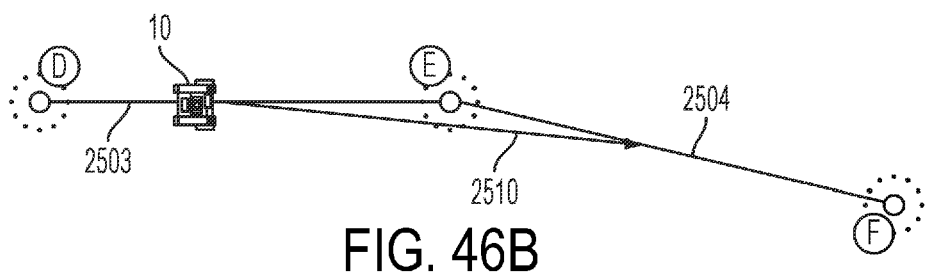

In FIG. 46B, the mobile robot 10 has moved farther along the path to a section where it angles slightly at waypoint E between the third line segment 2503 and fourth line segment

2504. Because the mobile robot 10 will attempt to drive toward the end of the lookahead vector 2510, the appropriate approximation of the mobile robot's path is the vector extending from the mobile robot 10 to the end of the lookahead vector 2510.

To ascertain whether the mobile robot's route will lie within the permitted distance from a waypoint, the retro traverse behavior checks whether the perpendicular distance from a waypoint to is less than the maximum permitted distance (which may be a predetermined, constant value—such as one meter, for example). The mobile robot 10 repeats this check for every waypoint disposed orthogonally to the lookahead vector (i.e., waypoints for which there exists an orthogonal projection onto the lookahead vector). Alternatively, the mobile robot 10 may repeat the distance check for every waypoint that is associated with any of the retro traversal path line segments intersected by the lookahead vector 2510, to simplify the calculation of whether a waypoint "lies along" the lookahead vector 2510. In the example shown in FIG. 46B, the distance is within the permitted range; therefore, the lookahead vector 2510 extends to its full length.

Figure 46C:
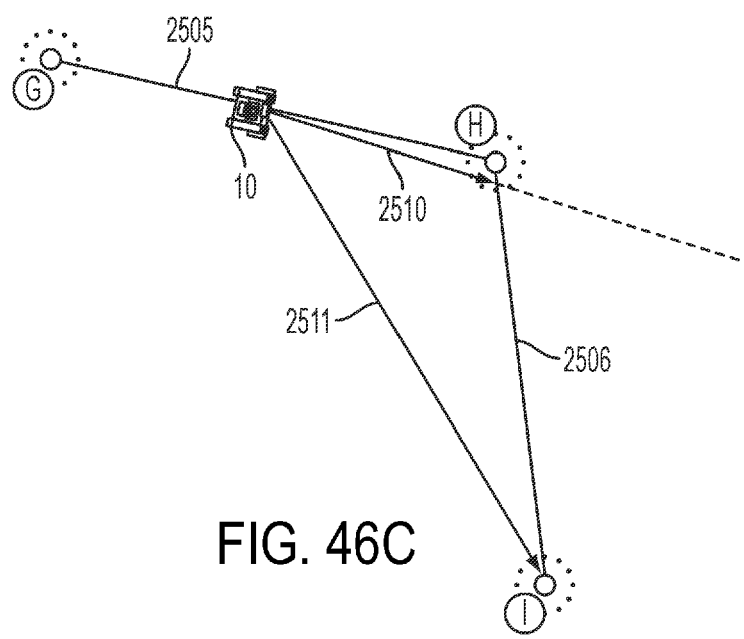

FIG. 46C shows a similar situation; however, the full-length lookahead vector 2510 does not lead to a path that is within the permitted distance of one of the waypoints (waypoint I) that projects orthogonally onto the lookahead vector 2510. The mobile robot 10 therefore sets the end of the lookahead vector 2510 (which will be used in the subsequent cycle) to be the mean of the current end point and the end point of the previous lookahead vector 2511 used in the preceding cycle of the behavior. The retro traverse behavior running on the mobile robot 10 will continue to decrement the length of the lookahead vector 2510 for several iterations in a similar manner until it either finds an acceptable end point or performs a maximum threshold number of iterations without success. Because the end point of the lookahead vector 2510 should always be on a line segment in the intended path, the mean of the old and new end points are preferably calculated in terms of the respective path lengths of the two and then transformed into x-y coordinates, rather than averaging the x-y coordinates of the two points.

Figure 46D:
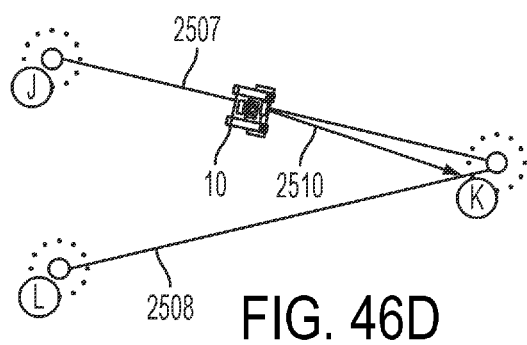

FIG. 46D illustrates a situation with a sharp angle between the seventh and eighth line segments 2507, 2508. The waypoint K does not project orthogonally onto the lookahead vector 2510 shown in FIG. 46D. Accordingly, the retro traverse behavior preferably ensures that the closest point is actually within, to obviate this situation.

Figure 47:
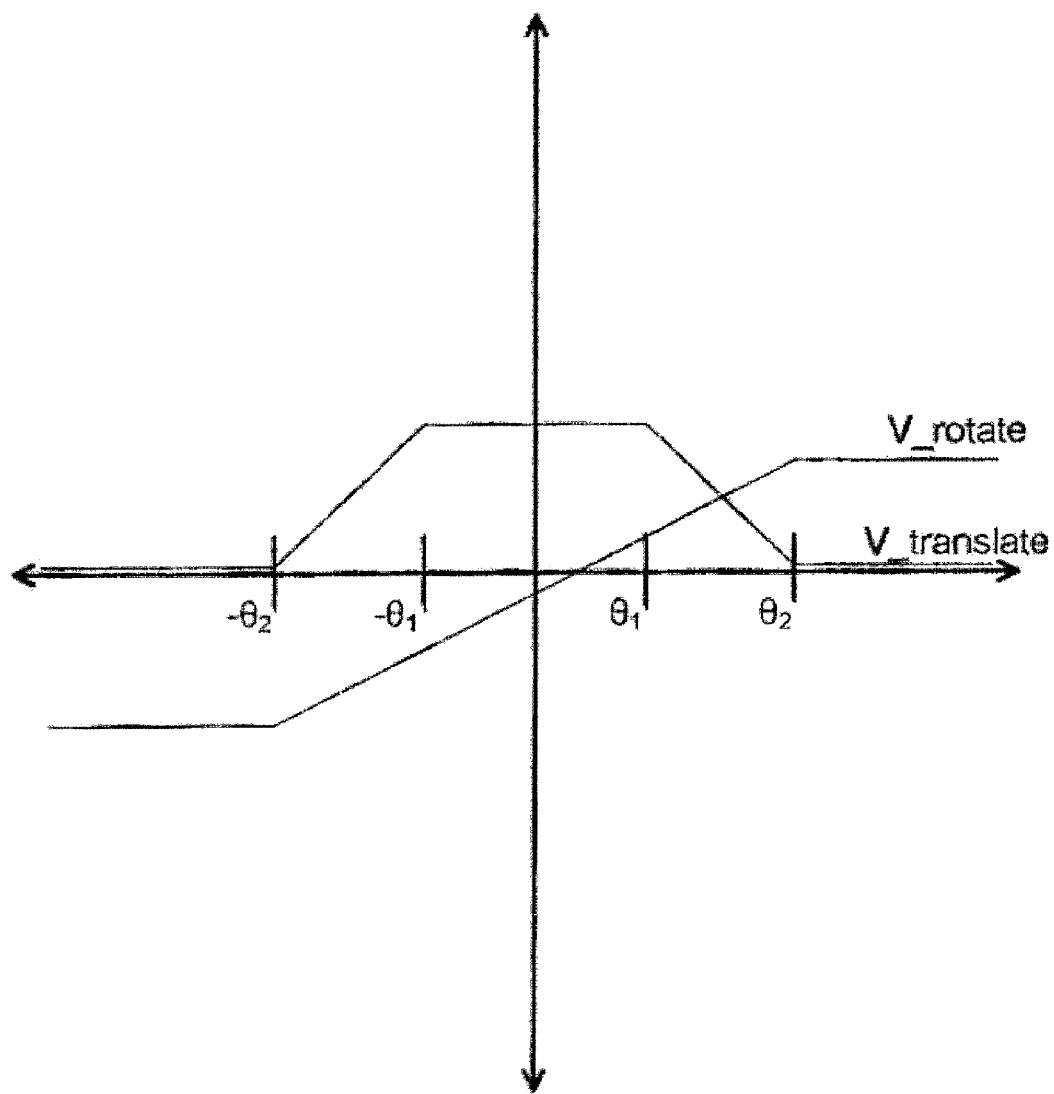
FIG. 47 illustrates a retro traverse behavior.

FIG. 47 illustrates an embodiment of a relationship between two output values, v_rotate and v_translate, that may be issued by the retro traverse behavior. The translational (v_translate) and rotational speeds (v_rotate) are calculated based on the angle by which the mobile robot 10 needs to turn to be heading toward at the end of the lookahead vector. The rotational speed may be determined as a PID loop on the function v_rotate shown in FIG. 47, for example. The function characteristics may be adjusted to ensure the mobile robot 10 does not overshoot waypoints.

Also, in another embodiment, there are three different modes in which the mobile robot 10 can operate:

"always drive forward;"
"always drive backward;" or
"drive in which ever direction requires the least rotation."

For "always drive forward," the speeds are calculated based on the angle between the mobile robot's heading and the direction to the end of the lookahead vector. For "always drive backward," they are based on $\theta_2$, and the translational speed is multiplied by −1. For "driving the direction of least rotation," when $\theta$ in between $\theta_1$ and $\theta_2$ then the mobile robot 10 drives forward; otherwise, it drives backwards.

Retro traverse can be implemented in the following exemplary manners:

the robot will either track odometry and determine position based on that;
will maintain a global map and place the coordinates within a global map;
will maintain a far off destination point within a global map and adjust its heading to move towards that point;
will use some sort of navigation point (i.e. GPS, or other satellite or landmark easily detected from most points within the environment); or
will communicate with navigation beacon points (signal repeaters, etc.) and use those to determine position within the environment.

Alternative methods of implementing retro traverse include: (1) following a reduction in chemical scent, or following a chemical scent; or (2) following a trail left by the robot—i.e. a fiber optic cable, a line of spray paint, setting a destination point in a global map and traveling towards that destination point.

Two alternative methods of implementing retro traverse include:

Collecting odometric data and using it to calculate the return path;
  1. Example Data—heading and approximate distance of travel for each stage of retro traverse.
  GPS waypoint collection
  1. GPS approximations can be collected.
  2. Tie these approximations to the odometry data.
  3. Use Kalman Filter based algorithms to provide confidence in the return path.

Self-Righting

Self-righting behaviors can also be persistent, in a sense that it may constantly be running in the background to right the robot if it is up-ended. Robots traveling over very rough terrain or through opposing fire can end up flipped on their sides or even upside down. Self righting behavior allows the remote vehicle to turn itself back over and onto its tracks so it can continue with its mission objective or return back to the operator, as desired. When self righting, the robot senses its orientation and determines a strategy for turning itself upright. The robot will perform a progression of increasingly complex arm and flipper motions until it has levered itself back onto its tracks.

Self righting has two modes. In the first mode, it will be autonomously initiated when the robot detects that it has flipped upside down. In the second mode, the operator explicitly commands the robot to start or stop self righting. The advantage of enabling persistent autonomous self righting is that should communications be degraded because the antennae are beneath the unit to the point where the operator cannot directly command it, the robot can rescue itself without explicit direction, and without the need for hands-on human intervention.

Semi-Ballistic Behaviors

Semi-ballistic behaviors allow the operator to manually operate the remote vehicle. Semi-ballistic behaviors can quit when certain actuators are actuated such as stop a speed boost behavior when the operator actuates a stop button or switch, the drive control, or a quick brake.

Speed Boost and Quick Brake

In an embodiment of the invention, activating speed boost or quick brake behavior allows the operator to quickly increase or decrease the current drive speed of the mobile robot 10. Once activated, the mobile robot 10 will continue to drive with the new drive speed until a new behavior, action, or event occurs. An example of this is the execution of the speed boost behavior while the mobile robot 10 is driving forward at a current drive speed. Upon execution, the mobile robot 10 then drives forward at a speed equivalent to the current drive speed increased by a preset speed value stored in memory.

Figure 48:
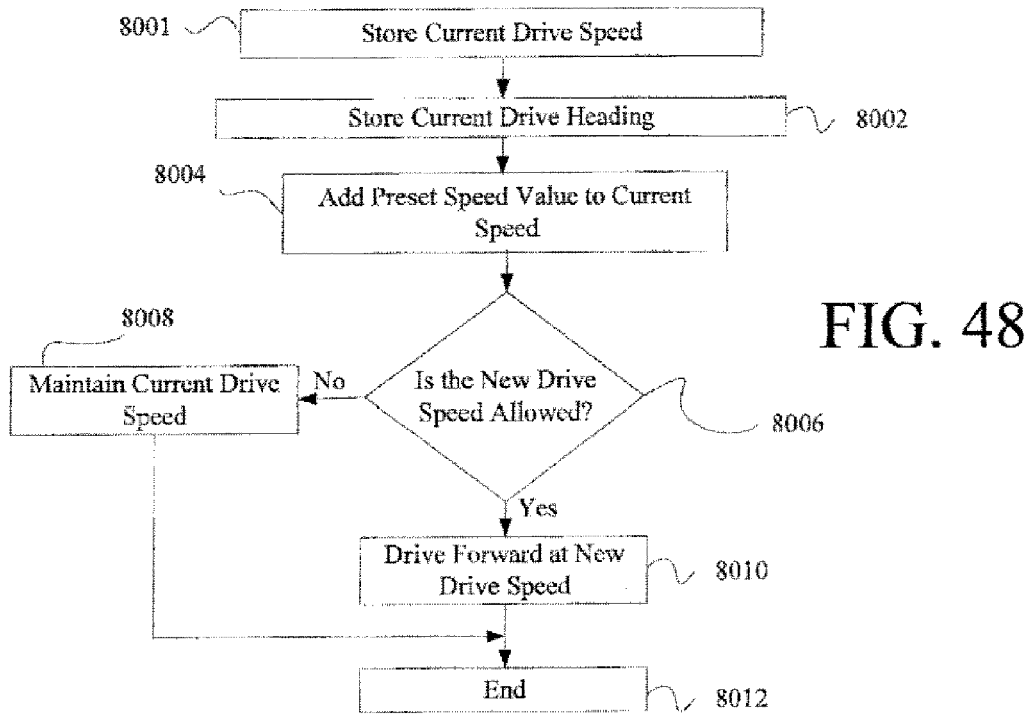
FIGS. 48 and 49 illustrate an embodiment of speed boost and quick brake behaviors.
Figure 49:
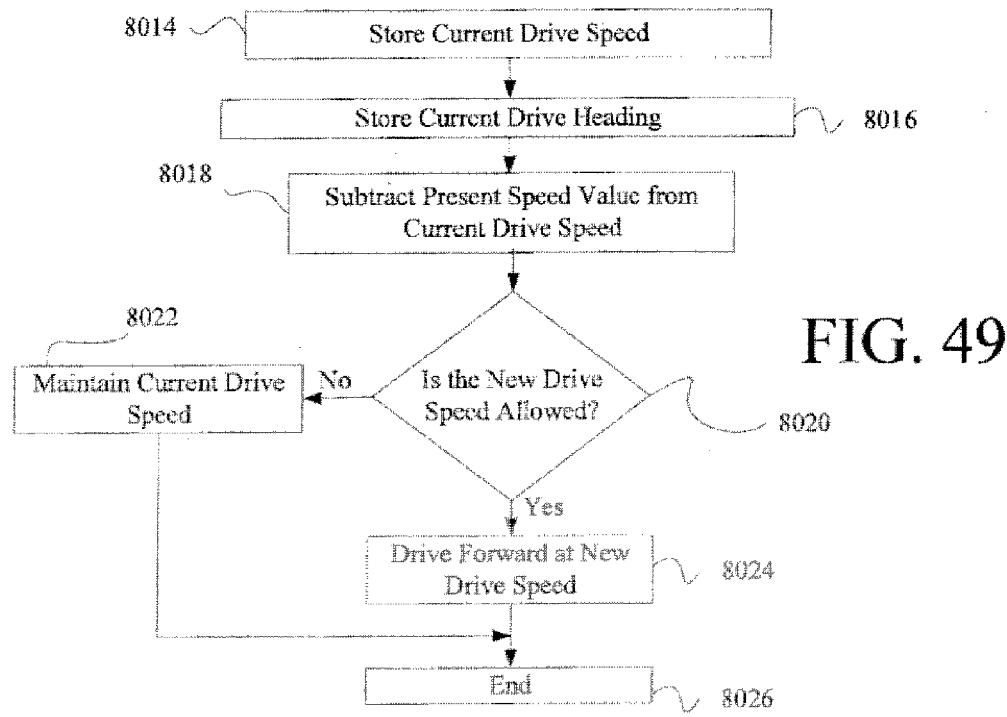

FIGS. 48 and 49 illustrate an embodiment of speed boost and quick brake behaviors. These behaviors are initiated by activating a switch or button of the control system described above. Activating the button or switch multiple times in a row will result in multiple and successive executions of the chosen behavior. The end result is a new drive speed equivalent to the current drive speed increased or decreased by a factor of the preset speed value multiplied by the number of times the button or switch was activated.

The speed boost behavior stores the current drive speed 8001 and the current drive heading 8002. The behavior then calculates a new drive speed value by increasing the current drive speed value by a factor equivalent to a preset speed value 8004 stored in memory 1125. A speed check 8006 is done to ensure that the new drive speed is compatible with behaviors or routines that may be active on the mobile robot 10. If the speed check 8006 allows for the new drive speed, the mobile robot 10 drives forward at the new drive speed 8010 and the speed boost behavior ends 8012. Otherwise, if the speed check 8006 does not allow for the new drive speed, then the mobile robot 10 drives forward at the current drive speed 8008 and the speed boost behavior ends 8012.

The quick brake behavior embodiment shown in FIG. 49 is similar to the speed boost behavior embodiment in that it stores the current drive speed 8014 and the current drive heading 8016 and performs a speed check 8020 once the new drive speed is calculated. The quick brake behavior differs in that the new drive speed is calculated by decreasing the current drive speed by a factor equivalent to the preset speed value 8020. Like the speed boost behavior, if the new drive speed is allowed, then the mobile robot 10 drives forward at the new drive speed 8024 and the quick brake behavior ends 8026. Alternatively, if the new drive speed is not allowed, then the mobile robot 10 drives forward at the current drive speed 8020 and the quick brake behavior ends 8026.

Alternate embodiments of speed boost and quick brake may include:

A speed boost behavior that sets a zone of acceptable speeds that is greater than the normal zone (e.g., typically the robot can drive at a speed between 2 and 20 MPH, but with speed boost it can drive between 15 and 50 MPH);

A speed boost behavior that provides a quick boost of speed for a period of time—then returns to the previous drive speed;

A quick brake that lowers the zone of acceptable speeds (e.g., zone is now 0 to 5 MPH from 2 to 20 MPH); and/or A quick brake that for a period of time quickly reduces the speed of the robot, then returns to the previous drive speed after the period of time.

Cruise Control

A cruise control behavior receives information from the control system regarding an intended constant speed and heading for the mobile robot 10. In an embodiment of the invention, the information sent from the control system includes an acceleration value and a rotational velocity, both of which are used by the mobile robot 10 to determine a drive velocity and heading. The cruise control behavior allows the operator to drive the robot 10 for a distance without necessary intervention by the operator. In an embodiment of the invention, the operator uses a left and right joystick or puck of the control system to control the robot's movement. In this embodiment, the left joystick or puck can be dedicated to the cruise control behavior such that when the left joystick or puck is actuated, the cruise control behavior commences, and when the right joystick or puck is actuated, the cruise control behavior halts. Alternatively, the cruise control behavior could commence following the actuation of a button or other actuator of the control system. Alternatively, a third joystick or puck may be included in the control system that is dedicated to cruise control.

In an embodiment of the invention utilizing pucks, each puck has the ability to rotate about a vertical axis, translate forward and backward about a horizontal axis, and tilt away from the vertical axis. Furthermore, when the puck is translated, rotated or tilted, it is the movements correspond to different movements of the robot. In particular, driving the robot in a forward or backward direction is preferably controlled by the translation of the puck about a horizontal axis, alteration of the robot's heading is controlled by the rotation of the puck about a vertical axis, and actuation of the flippers included on the robot are controlled by tilting the pucks. An example of the movement of a robot in response to puck movement is one in which the puck is rotated about the vertical axis 30° in a clockwise direction, and the puck is moved forward a distance of a half inch. In response, a robot at rest will adjust its heading by turning 30° in a clockwise direction, and driving forward at a velocity equivalent to a pre-determined value associated with movement of the puck a half inch. Should the puck be tilted to the right 15° from the normal, the robot's flippers would respond by rotating towards the ground an angle equivalent to 15°.

Figure 50:
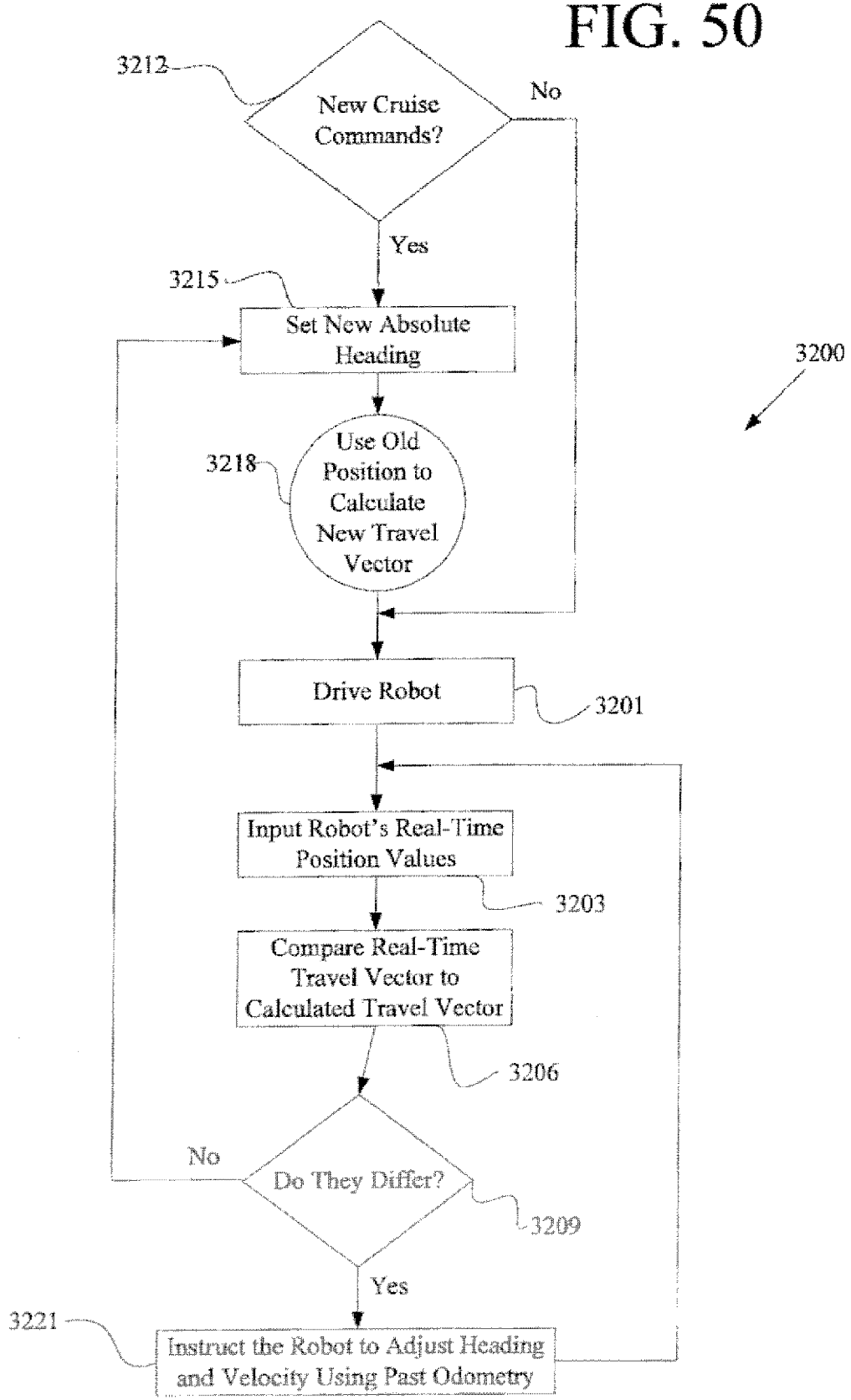
FIG. 50 illustrates an embodiment of a cruise control routine included within a cruise control behavior.

FIG. 50 illustrates an embodiment of a cruise control routine 3200 included within a cruise control behavior. When in control of its corresponding actuators, the cruise control behavior executes the cruise control routine 3200, which commences by scanning for a new set of cruise commands 3212 from the operator. Should the routine sense a new set of cruise commands, the routine inputs the commands as an absolute heading 3215. There may be a time lag between when the robot's cameras record video information and the time that such information is displayed to the operator. If the robot 10 is moving at a particular speed and particular heading, and a new heading and/or speed is chosen by the operator and sent to the robot, the robot will have moved a certain distance during the time between when the robot's camera detected the image and when image was displayed to the operator. The latency of the system can cause discrepancies when sending the robot cruise commands.

In an embodiment of the invention, to eliminate the possibility of these discrepancies, the operator sends the robot 10 an absolute heading and velocity. When the robot 10 receives the absolute heading and velocity, the robot then calculates its new heading and velocity using the absolute heading and velocity and the positional and velocity values at the time the robot's camera detected the image, rather than the current real-time positional and velocity values. Upon calculating the new travel velocity and heading, the robot 10 uses real-time positional and velocity values to calculate a new travel vector 3218.

Once a travel vector is calculated 3218, the robot will then drive at the specified velocity using the specified heading 3201. While driving, the cruise routine gathers real-time positional and velocity values from the sensors 3203 and compares these values to the chosen travel vector 3206. Should there be a significant difference between the current travel vector and the chosen travel vector, the routine will instruct the robot 10 to adjust its heading and velocity 3221 using past odometry values. Otherwise, if there is little difference between the current travel vector and the chosen travel vector, the routine will instruct the robot 10 to continue driving 3201.

Figure 51A:
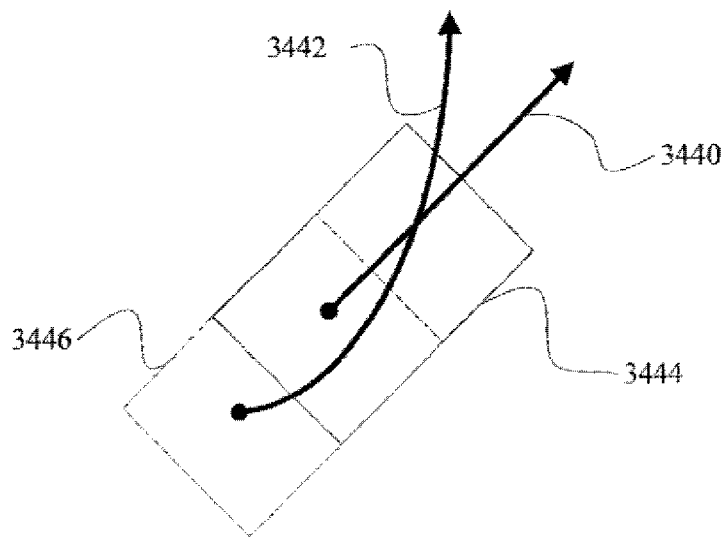
FIGS. 51A and 51B illustrate an embodiment of a cruise control behavior.
Figure 51B:
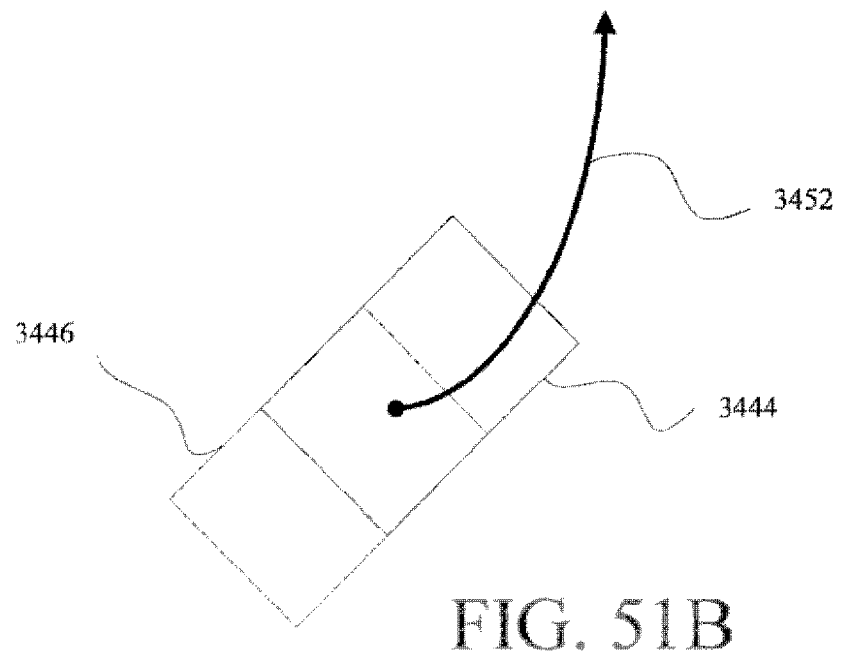

Further illustrative of an embodiment of cruise control, FIGS. 51A and 51B display a robot 3444 that responds to new heading commands to change direction. The robot 3444 moves forward in a particular direction 3440. Once the operator retrieves video feedback of the robot's position, the robot's position has changed from its position at the time the video information was captured 3446 to its current position 3444. Thus, the robot has continued along its current path 3440 during the time between when the robot collects video information of its position at that time 3446 and the time when the robot receives new heading commands from the operator. When the operator sends the heading information to the robot 10, the heading information 3442 is relative to the robot's previous position 3446. FIG. 51B shows how the robot uses the heading 3442 generated in relation to the robot's previous position 3446 to determine a new heading 3452 calculated in relation to the robot's current position 3444.

Figure 52:
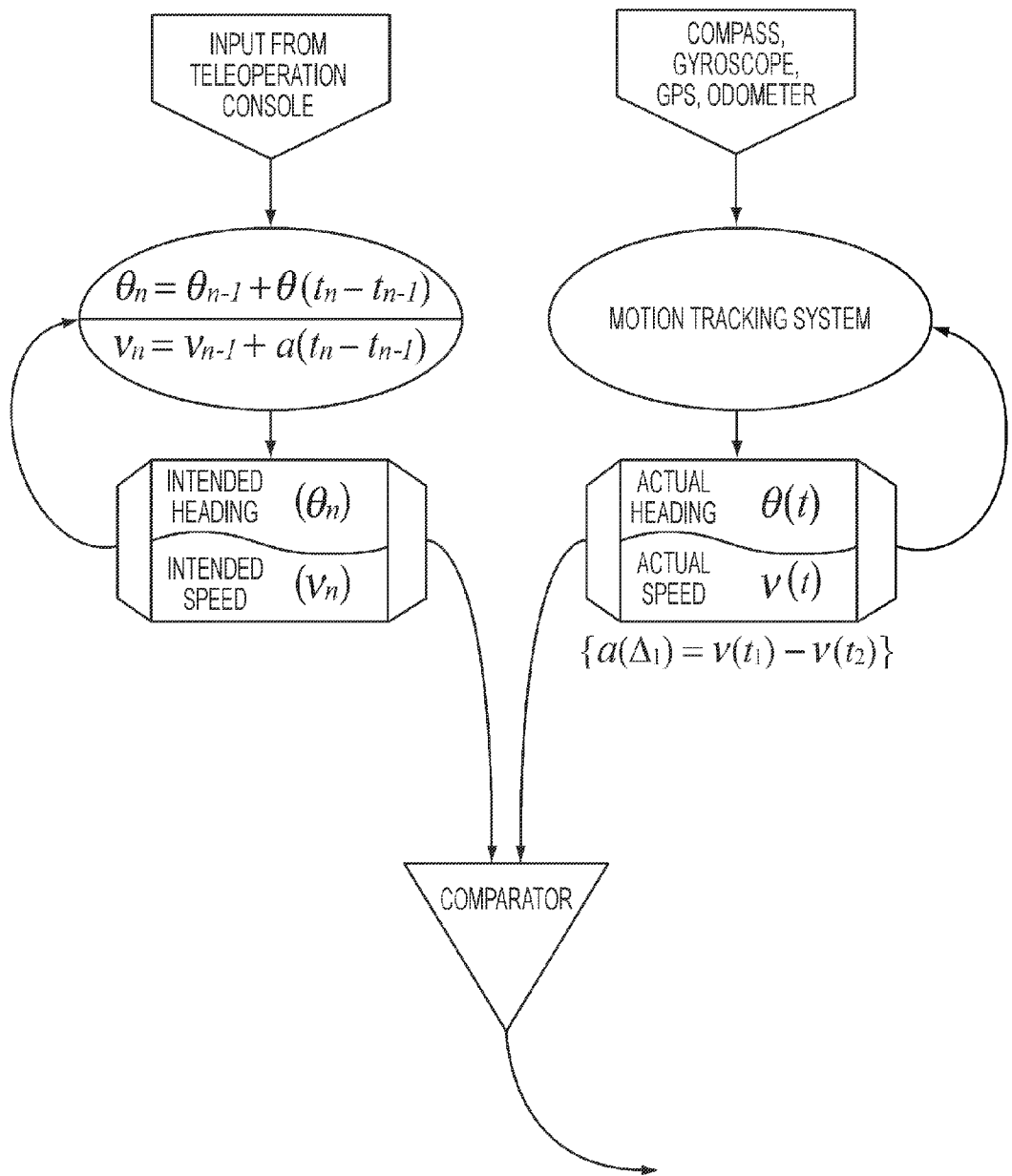
FIG. 52 illustrates an embodiment of a flow of information in a cruise control behavior.

FIG. 52 illustrates an embodiment of a flow of information in the cruise control behavior. Input from the control system is received and processed to produce an updated current intended heading and speed $\theta_n$, $v_n$. In the equations displayed, $\theta_{n-1}$ is the intended heading of the preceding cycle, $t_n$ is the time of the current cycle, $t_{n-1}$ is the time of the preceding cycle, $\theta$ $(t_n-t_{n-1})$ is the angular difference between the heading of the current cycle and the heading of the preceding cycle, $v_{n-1}$ is the intended speed of the preceding cycle, and $(v_n-v_{n-1})$ is the difference between the speed of the current cycle and the speed of the preceding cycle.

Simultaneously, input from position reckoning systems (such as a compass, IMU, or GPS) are fed to a motion tracking system, which updates the reckoned actual heading and speed. The reckoned actual heading and speed of the mobile robot 10, as well as the updated intended heading and speed, are passed to a comparator, which generates an appropriate output (such as turn rate and drive motor current) to control the drive system.

Figure 53:
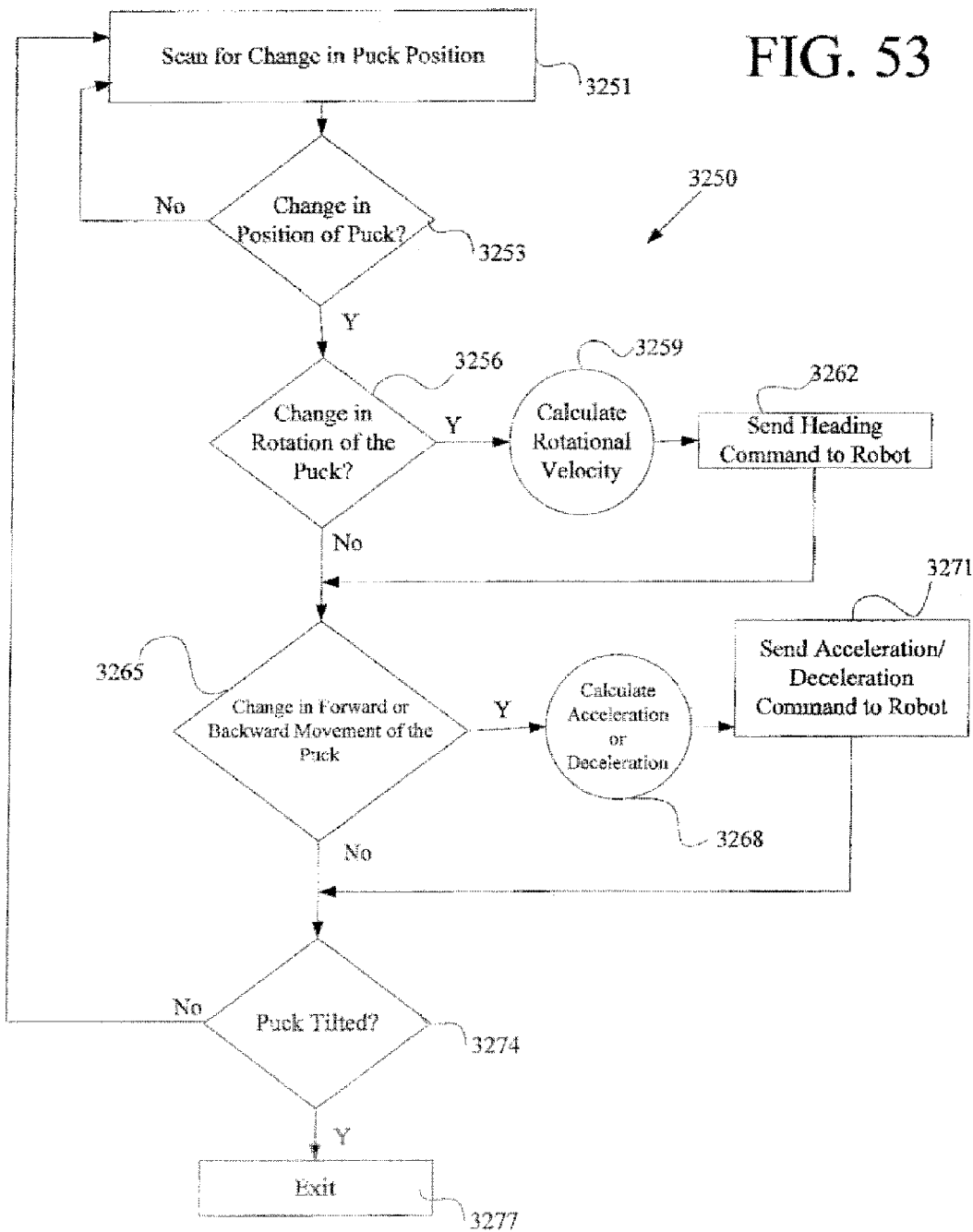
FIG. 53 illustrates an embodiment of a routine to generate cruise control commands.

Activation of the cruise control behavior includes first actuating an actuator of the control system. As discussed above, the actuator may be a puck, button, lever, soft button, or any other actuator that initiates the cruise control behavior. FIG. 53 illustrates an embodiment of a routine carried out by the control system (using a puck for cruise control activation) to generate cruise control commands. The routine scans a puck designated for activating and controlling the cruise control behavior 3251. Upon detecting a change in the position of the puck 3253, the routine determines whether the change included a rotation of the puck about a vertical axis 3256. If not, the routine will continue to scan the puck's position. If the change included a rotation of the puck about a vertical axis 3256, the routine calculates a rotational velocity proportional to the rotation of the puck and indicative of the direction the puck was rotated 3259, and the control system sends the new drive heading to the robot 10, where the heading is relayed to the cruise control behavior.

The routine then determines whether or not the puck was translated about a horizontal axis 3265. If this has occurred, the routine calculates an acceleration/deceleration command 3268 representative of the puck's movement, and the control system sends the acceleration/deceleration command 3271 to the robot 10 where the acceleration/deceleration command is relayed to the cruise control behavior. In the illustrated embodiment, if the routine detects a tilting of the puck 3274, the routine exits 3277 because such a movement of the puck indicates flipper movement which is controlled by a behavior other than the cruise control—activation of another behavior causes cruise control to halt. If the routine does not detect a tilting of the puck 3274, the routine continues to scan the puck's position 3251.

Figure 54:
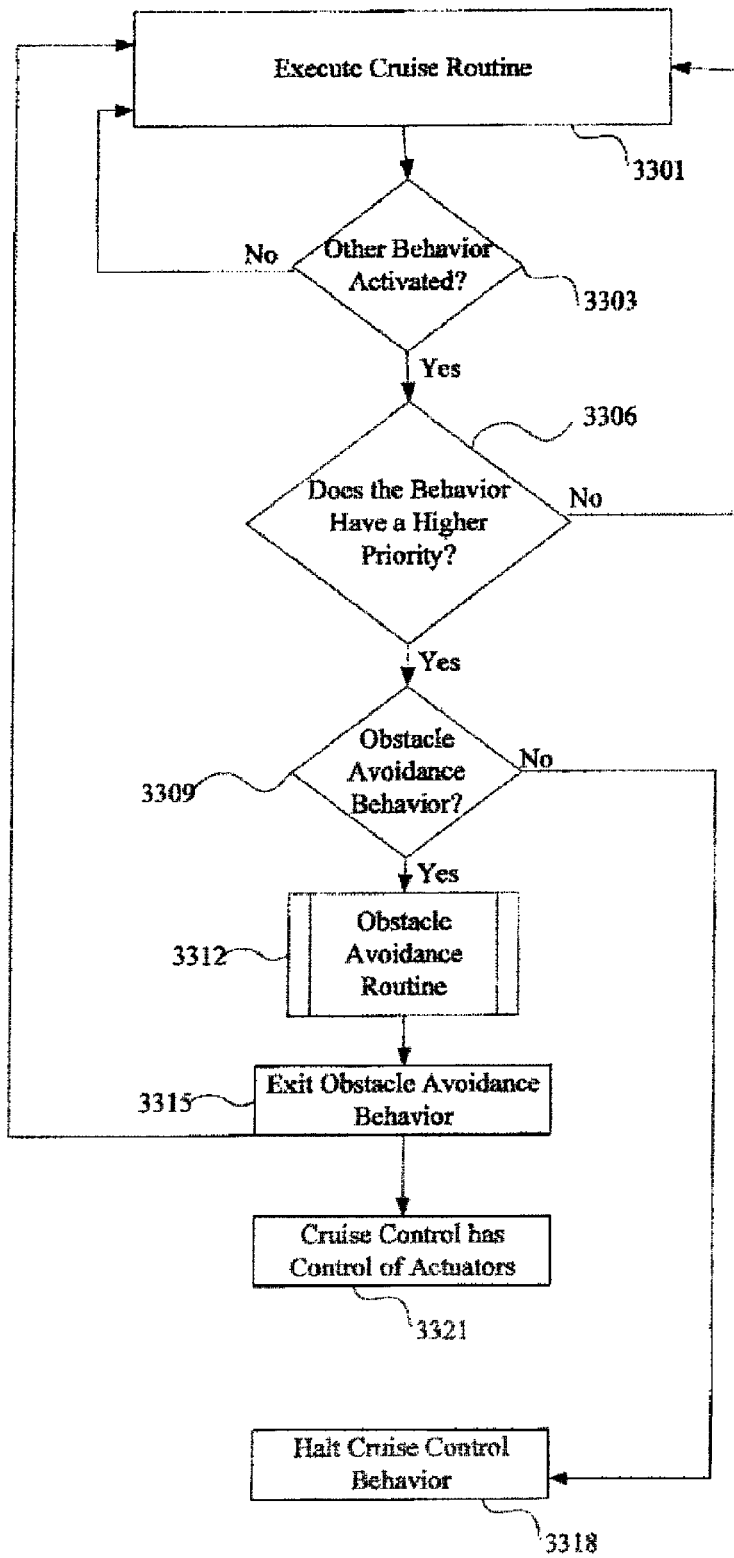
FIG. 54 illustrates an embodiment of an interaction between a cruise control behavior and other behaviors.

FIG. 54 illustrates an embodiment of the interaction between the cruise control behavior and other behaviors installed on the robot's single board computer. When the cruise control behavior has control of the robot's actuators, it executes its cruise routine 3301. However, when the coordinator indicates that another behavior has been activated 3303 and that behavior has a higher priority 3306 than the cruise control behavior, the cruise control behavior is halted and the cruise routine exited 3318. Otherwise, if the coordinator does not indicate that another behavior has been activated 3303, or if a behavior has been activated but that behavior does not have a priority 3306 greater than the cruise control behavior, the cruise control routine will continue to execute 3301. In an embodiment of the invention, when a behavior with a higher priority than cruise control is activated, the coordinator checks whether this behavior is the obstacle avoidance behavior 3309, and if true, allows the obstacle avoidance behavior to have control of the actuators without halting the cruise control behavior. Otherwise, if the obstacle avoidance behavior is not identified and the behavior has a higher priority than the cruise control behavior, the cruise control behavior will exit the cruise routine and halt 3318.

Should the obstacle avoidance behavior gain control of the actuators, an obstacle avoidable routine is executed 3312 by the obstacle avoidance behavior. Once the obstacle avoidance behavior is executed and exited, cruise control may regain control of the actuators 3321. Once in control of the actuators, the cruise control will pick up where it left off and begin executing the cruise control routine 3301. Within the cruise routine 3200 (see FIG. 50), a check is made of the robot's real-time travel vector 3203. Since the obstacle avoidance routine caused the robot to veer away from the chosen travel vector, the cruise control routine will detect the change in travel vector and correct the robot's heading and velocity 3221 using past odometry values so that the robot returns to the chosen travel vector.

Figures 55A, 55B:
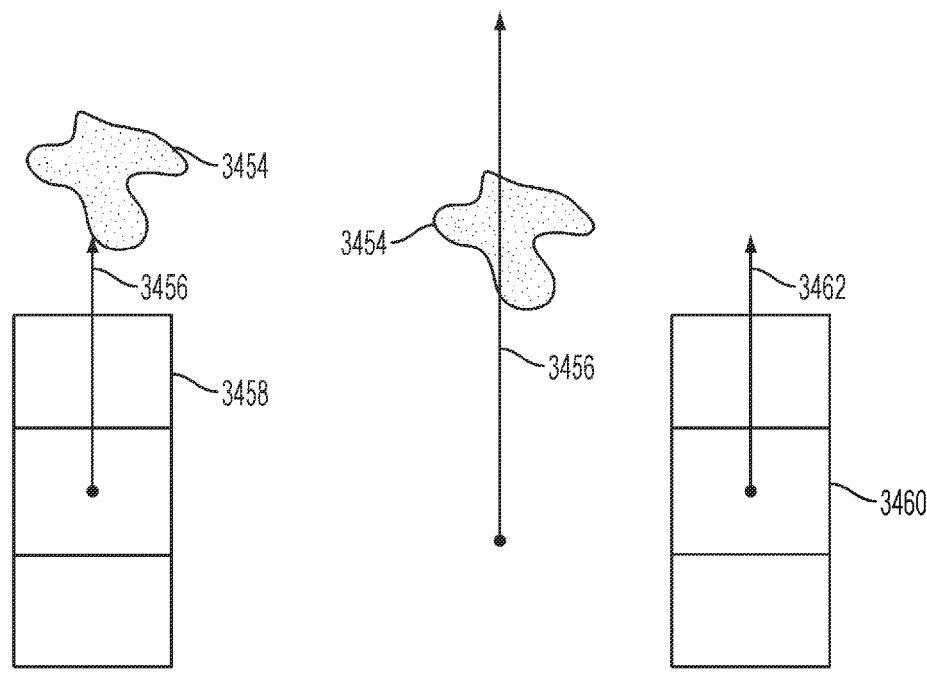
FIGS. 55A-55D illustrate an embodiment of an interaction between a cruise control behavior and an obstacle avoidance behavior.

An embodiment of the interaction between the cruise control behavior and the obstacle avoidance behavior is illustrated in FIGS. 55A-55D. Obstacle avoidance can be a persistent behavior, but is discussed here based on its interactions with cruise control. FIG. 55A shows the robot's 3458 movement along the chosen travel vector 3456 dictated by the cruise control behavior, where the vector 3456 points the robot toward an obstacle 3454. FIG. 55B illustrates the robot's response to the obstacle 3454 by commanding the robot to drive to a position 3460 not included within the chosen travel vector, which is the result of an avoidance travel vector 3462 instituted by the obstacle avoidance behavior to cause the robot 10 to avoid the obstacle 3454.

Figures 55C, 55D:
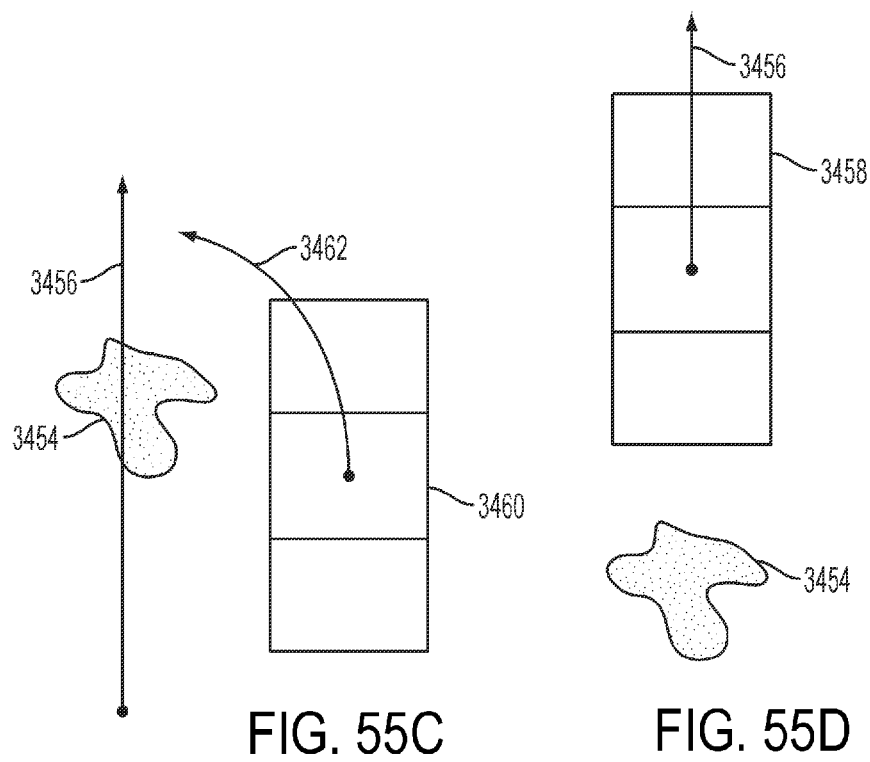

Once the obstacle 3454 is avoided, the cruise control behavior re-assumes control of the actuators and, as shown in FIG. 55C, begins to adjust the robot's direction of travel so that the robot returns to a path included within the chosen travel vector 3456. To do this, the cruise control behavior alters the robot's heading so that the robot drives along a path included within a translational vector 3462 calculated to cause the robot 3460 to return to the chosen travel vector 3456. FIG. 55D displays the final effect of the translational vector 3462. The robot 3458 moves from a path included within the avoidance travel vector 3462 to a path within the chosen travel vector 3456.

Figure 56:
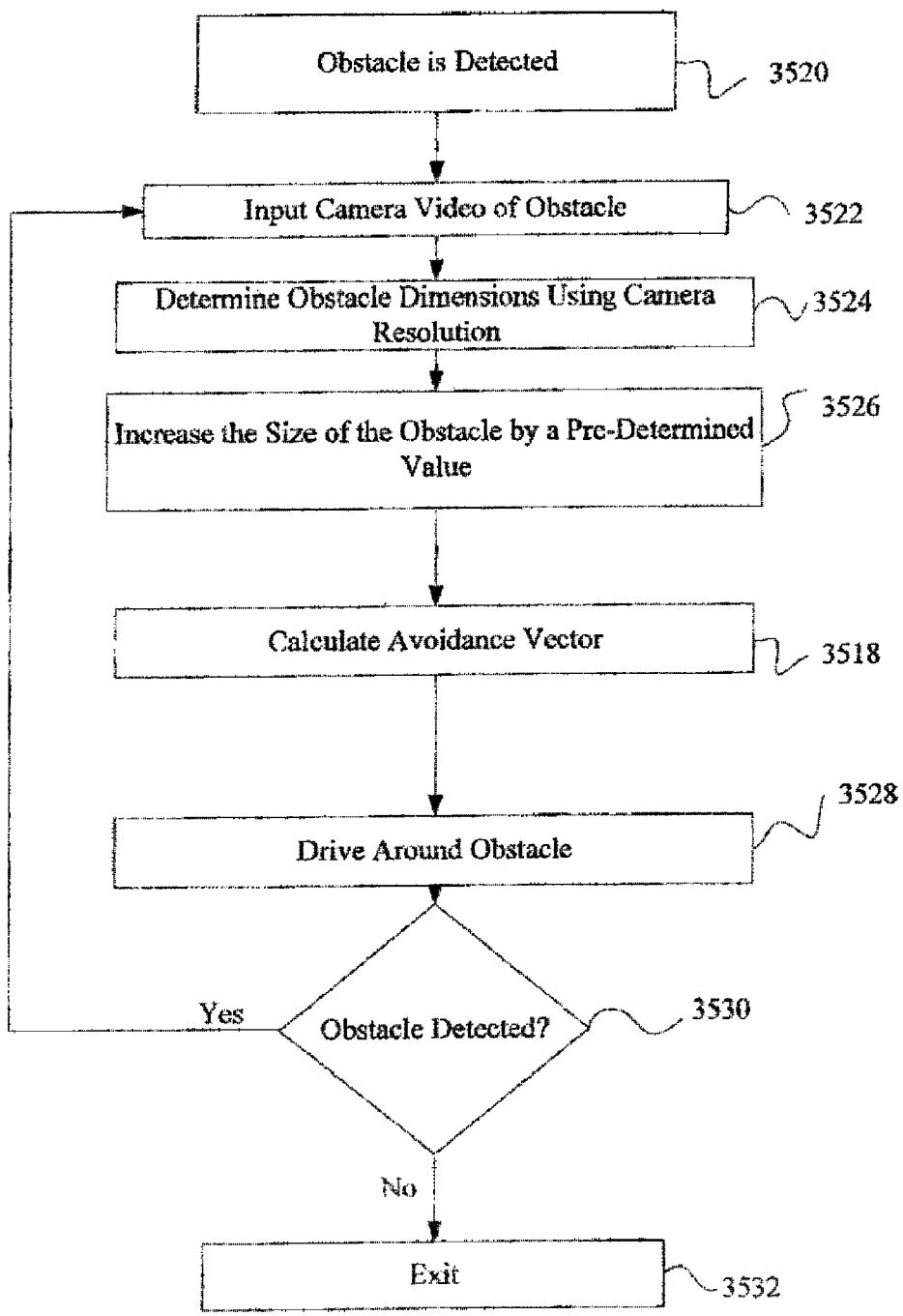
FIG. 56 illustrates an embodiment of an obstacle avoidance routine for an obstacle avoidance behavior.

The obstacle avoidance behavior can include an embodiment of an obstacle avoidance routine as illustrated in FIG. 56. Once an obstacle is detected 3520 and the obstacle avoidance behavior has retained control of the actuators, the obstacle avoidance routine begins to execute. The routine first inputs camera video output of the obstacle detected 3522 and uses the camera's resolution to determine the dimensions of the obstacle. To ensure proper clearance, the routine bloats the obstacle by a pre-determined value so that an avoidance vector can be calculated 3518. The avoidance vector allows the robot 10 to drive along a path that avoids the obstacle 3528. As the robot 10 drives forward 3528, the routine continually checks for obstacles 3530. If an obstacle is detected, the robot 10 then inputs the video image of the obstacle 3522, determines its dimensions 3524, bloats the obstacle 3526 and calculates a new avoidance vector 3518. These steps occur until no obstacle is detected, at which point the obstacle avoidance routine is exited 3532 and the cruise control behavior regains control of the actuators.

In an embodiment of the invention, the cruise control behavior assumes that the robot is moving at a velocity of 0 m/s, and considers the robot's position to be the normal position. Subsequent rotational velocities and accelerations/decelerations are an alteration of the robot's 0 m/s velocity and normal position. Alternatively, the cruise control behavior could include cruise routines that allow for acceleration and/or deceleration of a robot with a velocity other than 0 m/s. In such an embodiment, an additional actuator may be included in the control system so that the user can control activation of cruise control with an actuator separate from the puck.

Other possible features of the cruise control behavior include fail safe conditions that cause the cruise control behavior to halt. These conditions include: (1) actuating brakes included within the drive system; (2) actuating a button, switch, puck, or other input device not designated to control the cruise control behavior; (3) depressing a stop actuator included of the control system; (4) changing the drive mode; or (5) dropping communication between the control system and the robot 10. Additionally, there is a maximum speed at which the robot can go and the robot is configured not to drive at a speed higher than the maximum speed.

Alternative embodiments of the implementation include:

Setting a point far in the distance and driving toward that point so that when a behavior like obstacle detection interrupts, the cruise control behavior can do one of calculating a path from the robot's current position back to the original cruise path and calculating a new path from the robot's current position to the destination point Tracking odometry and adjusting the robot's current path using a translational vector calculated from the odometry values so that when obstacle detect interrupts, the cruise control behavior calculates a translational vector from the past odometry values and applies the vector to the robot's current path—so that the robot will return to the cruise path.

Set a start waypoint and end waypoint when a behavior like odometry interrupts cruise, meaning that two waypoints are stored while the robot is still on the cruise control path and at the point in time when obstacle detection is initiated, the first waypoint being representative of the robot's position when obstacle detect interrupts an the second waypoint being representative of a point much farther down the path from the first waypoint (far enough that the point will exist at a position beyond the obstacle). After obstacle detection finishes, the cruise control behavior uses the two waypoints to calculate a path back to the original cruise control path.

In an embodiment of the invention, the cruise control behavior sends an "operator attention required" alert to the operator. Alert conditions may include:

Hard bump to the manipulator arm, indicating contact with a solid object.

Repeated drifting off course, indicating uneven ground.

Tilt or roll approaching tip-over limits.

Increased motor torque indicating the presence of an obstruction.

Time-out situations to prevent over-travel.

Other embodiments of the cruise control behavior include a cruise behavior that can be used while drive is in control, the user actuating a cruise control button of the control system. The cruise control behavior can also be activated such that the robot will cruise for a predetermined period of time, or a predetermined distance. Alternatively, the cruise control behavior could include a hybrid where such an action would happen unless the user instructs the normal cruise to take over indefinitely.

Obstacle Avoidance

An embodiment of an obstacle avoidance behavior is described above. Ways of implementing the obstacle avoidance behavior include:

Path Planning—the robot detects obstacles & bloats them, then calculates a path around the obstacle. Path planning may be carried out while the robot is traversing the path to ensure that the robot remains on the path.

Continuous obstacle detection where there are obstacle detection sensors installed along the sides of the robot. The robot turns a predetermined angle and moves a predetermined distance in response to a forward obstacle detection. Once the forward sensor no longer detects the obstacle and if the side sensors detect the obstacle, obstacle detect moves forward until the side sensors no longer detect the obstacle.

Embedded Trainer and Simulator

An embedded simulation and training system can be included in or added to a remote vehicle system, where the embedded simulation and training system uses an existing software and hardware architecture within the remote vehicle system to implement training and simulation routines. The preferred remote vehicle system is that of a remote vehicle controlled, at least in part, by an operator control unit, and at least in part by an autonomous behavior control system. Displayed in FIG. 57, is an embodiment of an operator control unit 20 that can be used with an embedded simulation and training system. Features of the operator control unit embodiment of FIG. 57 include a screen 5010 for viewing a graphical representation of the simulation, a primary keyboard 5016 and a secondary keyboard 5014 for inputting user information, and a set of controls 5012 where such controls can include pucks, joysticks, or any other analog control with multiple degrees of freedom. Included within the operator control unit 20 is a central control system with memory for storing software routines, and a processor for executing software routines and relaying control commands.

Figure 58:
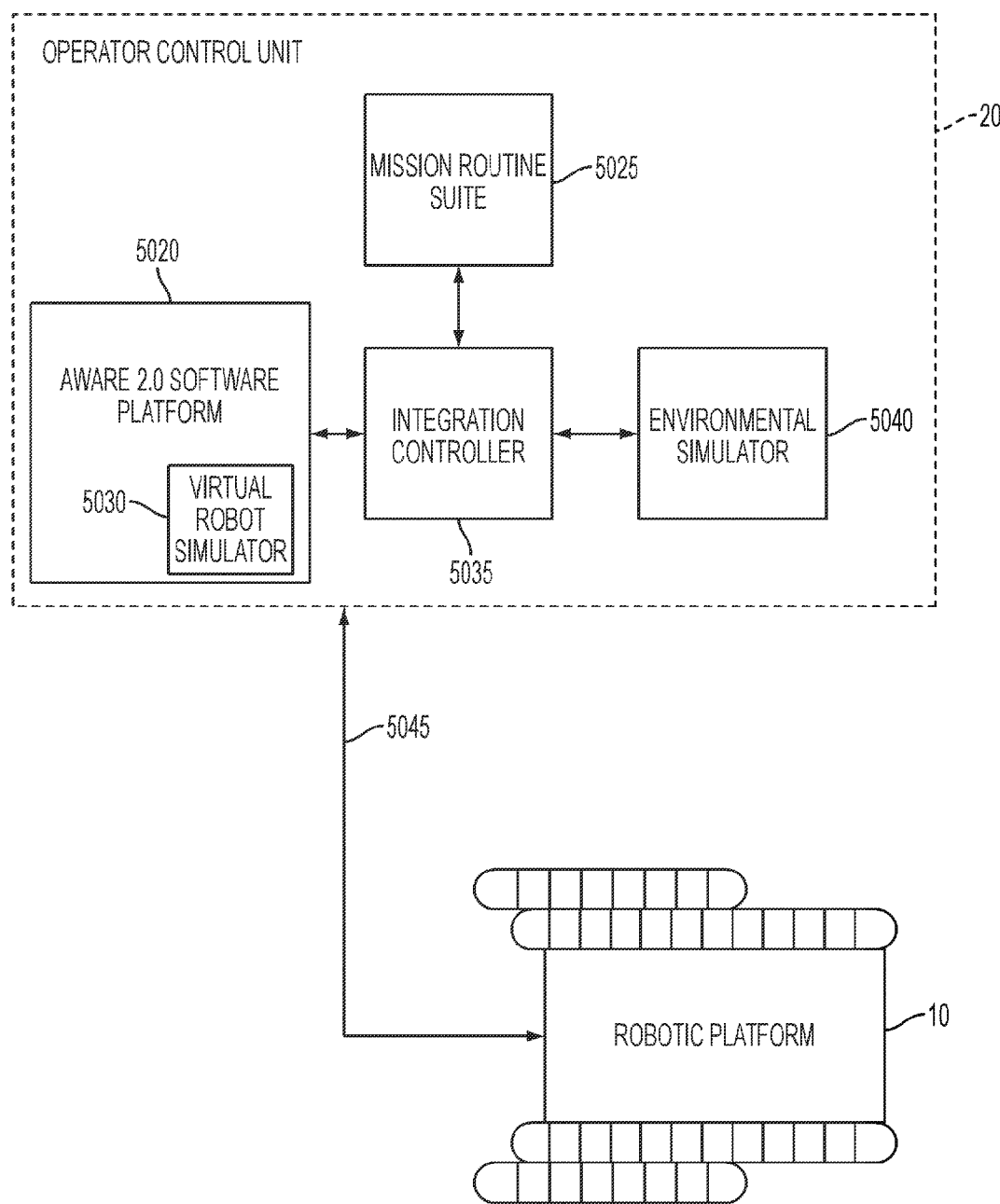
FIG. 58 illustrates an embodiment of a system configuration.

There are many possible configurations of the embedded simulation and training system. An embodiment displayed in FIG. 58, includes an operator control unit 20 operable to communicate with a remote vehicle 10 via a communication link, where the link may utilize the user datagram protocol (UDP). Alternative protocols that facilitate communication between machines may be used including BLUETOOTH® packets over a short range frequency, IP over a wireless local area network, Ethernet over a local area network, or any other communication protocol able to facilitate communication between machines. The illustrated embodiment further includes an operator control unit 20 with a software architecture 5020 installed thereon, an environmental simulator 5040, an integration controller 5035, and a mission routine suite 5025 installed in memory and executed by the operator control unit's central control system.

The software architecture 5020 installed on the operator control unit 20 is preferably the Aware 2.0 software platform distributed by the iRobot Corporation. Alternative versions of the remote vehicle 10 may include other real time operating systems or software architectures able to simulate a behavior-based control architecture that is substantially similar to the behavior control software architecture included in the remote vehicle 10. When, for example, Aware 2.0 is installed on both the remote vehicle and the operator control unit, unlike the version of the Aware 2.0 software platform installed on the robotic platform 10, the software architecture 5020 installed on the operator control unit 20 is a version of the Aware 2.0 software platform that includes additional software routines and drivers able to carry out mission simulations and training. These software routines and drivers include a virtual remote vehicle simulator 5030 for simulating the physical and behavioral characteristics of a remote vehicle as it moves through a simulated environment and responds to control commands sent by the operator control unit 20.

Although the operator control unit 20 may be configured to include a version of the Aware 2.0 software platform, the operator control unit 20 additionally includes the software necessary to interface with and control the remote vehicle 10. Control of the remote vehicle 10 is preferably implemented by transmitting control commands from the operator control unit 20 to the remote vehicle 10 via a communication link 109 that connects the operator control unit 20 to the remote vehicle 10.

The virtual remote vehicle simulator 5030 included within the software architecture 5020 defines the physical components of the remote vehicle, and provides a simulation of the remote vehicle's basic framework. This basic framework includes physical characteristics, behavioral characteristics as defined by the behaviors included in the Aware 2.0 software platform, and other features salient to mimicking the remote vehicle's interaction with its external environment and response to operator control commands. The limitations of the remote vehicle's own constituent parts define the limits of the simulated platform's possible behaviors and actions, much as a human's physical capabilities are defined by his or her own body's limitations. An example of such a limitation includes that of a joint designed to accommodate motion over two degrees of freedom, such a joint is incapable of moving about a third axis. A simulation of a remote vehicle with such a joint cannot alter the characteristics of the joint to allow it to move about a third axis. Rather, the virtual remote vehicle simulator 5030 can only create a simulated remote vehicle platform with a joint able to move over two degrees of freedom.

The movement and behavior of simulated remote vehicle platforms generated by the virtual remote vehicle simulator 5030 are governed by the constraints of the simulated platform's physical limitations, user control commands, and behavioral characteristics as defined by the behavior routines included in the software architecture 5020. Remote vehicle platform simulations generated by the virtual remote vehicle simulator 5030 are centrally controlled by behavior routines within the behavior-based control system 5052 responsive to environmental variables and control commands generated by actuation of operator controls 5054 and typically sent via the communication link 5045 between the remote vehicle 10 and the operator control unit 20. In the absence of an actual remote vehicle 10, the control signals generated by the actuation of the operator controls 5054 are sent directly to the behavior-based control system 5052. Additionally, in the absence of actual environmental variables, environmental input consists of simulated environmental variables created by the environmental simulator 5040 and sent to the behavior-based control system 5052 via the integration controller 5035. Movement of a simulated remote vehicle platform through a simulated environment is then defined by sensor events generated by the environmental simulator 5040, sensor events generated by the actuation of operator controls 5054, behavioral characteristics generated by the behavior-based control system 5052 and physical variables generated by the virtual remote vehicle simulator 5030. The following is an example of the synergy between the virtual remote vehicle simulator 5030 and the environmental simulator 5040 where a simulated remote vehicle platform responds to a simulated environment that includes a steep slope. The simulated remote vehicle's movement in response to the steep slope is governed by the physical characteristics of the simulated slope such as the height of the slope, the control commands sent by the user indicating that the simulated remote vehicle should traverse the slope, and the physical constraints of the simulated remote vehicle such as mass and pose. Each simulated remote vehicle can be broken down into several sub-units, in order to offer a high level of abstraction.

Figure 59:
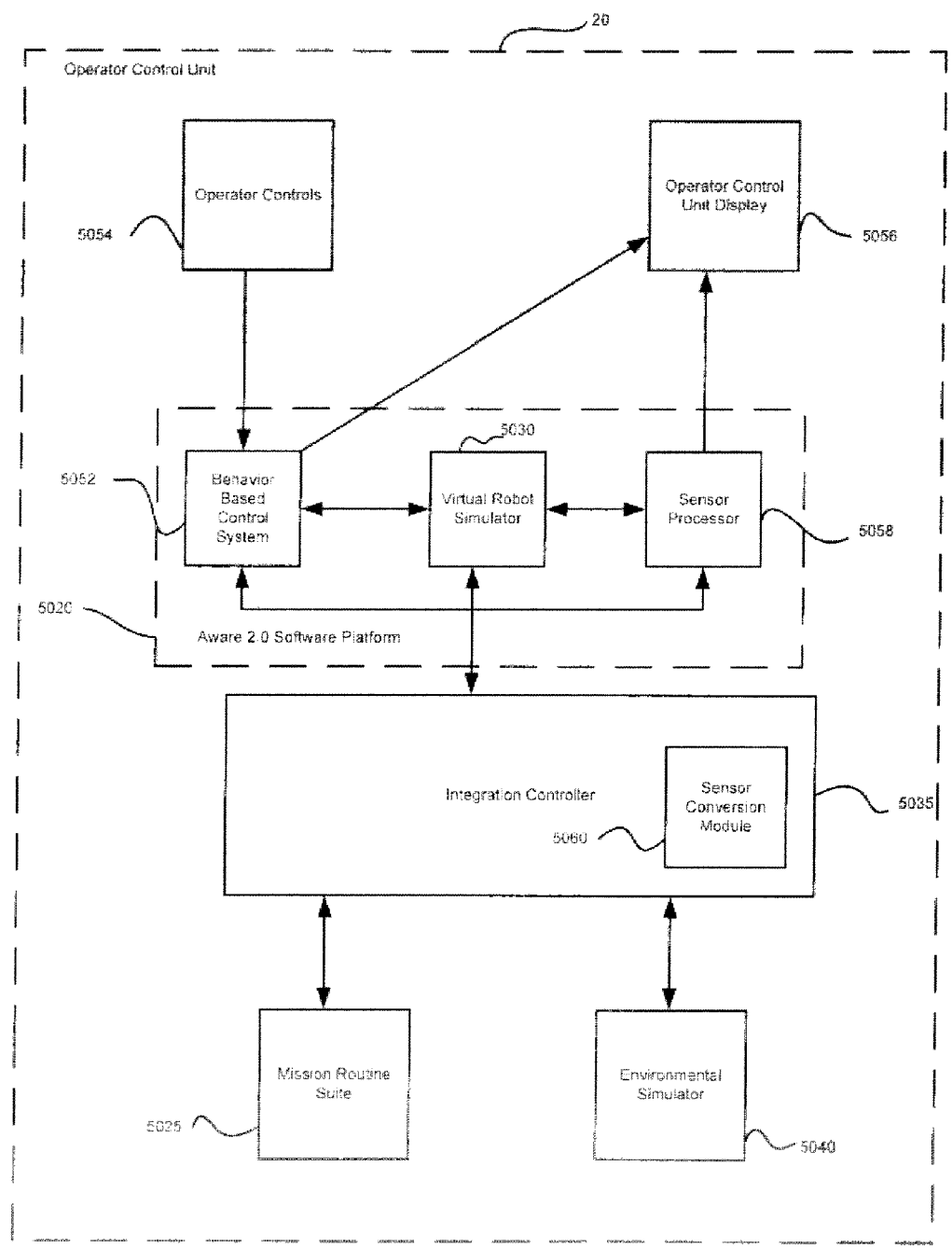
FIG. 59 illustrates a block diagram detailing the relationship between components included in an embodiment of an embedded simulation and training system.

FIG. 59 includes a block diagram more closely detailing the relationship between components included in an embodiment of the embedded simulation and training system. This diagram reflects an embodiment of an operator control unit 20 that includes the entirety of the embedded simulation and training system. The operator controls 5054 included on the operator control unit 20 are connected to a circuit that interfaces with the software architecture 5020 platform, via the operator control unit's central control system, to generate and transmit user control commands to the behavior-based control system 5052. Graphical information representative of the simulated mission is displayed on the operator control unit display 5010.

The software architecture 5020 included in the operator control unit 20 is comprised of a behavior-based control system 5052, the virtual remote vehicle simulator 5030, and a sensor processor 5058. The behavior-based control system 5052 is in communication with both the virtual remote vehicle simulator 5030 and the sensor processor 5058, and is comprised of a plurality of routines that implement behaviors based at least in part on sensor output from the sensor processor 5058. Included within the sensor processor 5058 are drivers that input raw sensor data and convert such raw sensor data into a form able to be processed by the routines included in the behavior-based control system 5052. Exemplary sensor data includes data representative of sensor events generated by the environmental simulator 5040, and control commands generated by the actuation of operator controls 5054 included on the operator control unit 20.

In communication with both the sensor processor 5058 and the behavior-based control system 5052 is the virtual remote vehicle simulator 5030 which generates a simulated remote vehicle platform governed by the physical variables of an actual remote vehicle similar to the one simulated, a simulated remote vehicle platform with behavioral characteristics representative of those generated by the behavior routines included in the Aware 2.0 software platform 5020. Just as an actual remote vehicle is sensitive to sensory events, the simulated remote vehicle platform is sensitive to sensory events generated by the operator controls 5054 and the environmental simulator 5040. The virtual remote vehicle simulator 5030 responds to sensory events representative of control commands and changes in the simulated environment by altering the physical and behavioral characteristics of the simulated remote vehicle platform. One example of alterations made by the virtual remote vehicle simulator 5030 includes changing the physical configuration of a simulated remote vehicle platform in response to the detection of stairs such that the simulated remote vehicle platform's pose is altered into a pose acceptable for climbing the stairs, such as one where the flippers are extended. Changes resulting from this example would include the activation of a stair climbing behavior included in the behavior-based control system 5052 and responsive to the detection of stairs, and responsive movement according to control commands generated by the operator controls 5054. An actual remote vehicle platform in a similar situation would respond to stair detection by presetting the flippers to a position acceptable for climbing stairs and then mobilizing according to the stair climbing behavior and operator commands.

Sensory events generated by the simulation environment and actuation of the operator controls 5054, are passed to the sensor processor 5058 included in the Aware 2.0 software platform 5020 (or other suitable platform) via the integration controller 5035. Included within the integration controller 5035 are sensor sub-routines able to input sensor data from the environmental simulator 5040 and pass such information on to the sensor processor 5058. These sub-routines include a sensor conversion module 5060 able to input sensory events generated by the environmental simulator 5040 and convert the events into a sensor format accepted by the sensor processor 5058.

The virtual remote vehicle simulator 5030 includes routines and graphic models that correspond to one or more remote vehicles available for simulation. Parameters identified within the routines correspond to the remote vehicle's actual physics including: track friction, mass of components, the shifting center of gravity, and gripping and manipulator friction. Such parameters are largely determined by observation of the remote vehicle during actual operation. These parameters are further converted into physical variables specific to an actual remote vehicle, and a graphical representation of such a remote vehicle.

The sensor conversion module 5060 included in the integration controller 5035 includes a number of software routines able to input sensor data from the environmental simulator 5040, and convert such data into a format able to be processed by the Aware 2.0 software platform 5020 (or other suitable platform). Once the data is converted, it is sent to the virtual remote vehicle simulator 5030 via transfer routines included in the integration controller 5035. The sensor conversion module 5060 is specific to the environmental simulator 5040 as the format of data output varies. Overcoming these variations includes implementing a driver suite to be included within the sensor conversion module 5060 able to discern between different data formats and perform conversion tasks accordingly.

In an embodiment of the invention, the environmental simulator 5040 is similar to that of a Battelle ERTS simulator. Alternative simulators can be used such as the America's Army simulator, or iRobot development simulators that are specific to either the iRobot Warrior or the Future Combat Systems Small Unmanned Ground Vehicle. Characteristics of the environmental simulator 5040 include routines able to render substantially realistic three dimensional environments within which the remote vehicle can operate. An embodiment of the environmental simulator 5040 also includes a substantially realistic physics engine able to simulate variables including resistance, mass, velocity, friction, rotational velocity, wind resistance and other such physical variables typically encountered by a remote vehicle in a real world environment. A physics engine provides the environmental simulator 5040 with the ability to determine how the physical characteristics of an environment affect the remote vehicle as it traverses through the simulated environment. These effects include the effects that the remote vehicle's physical characteristics have on the simulated environment and the change in the environment's physical effect due to the remote vehicle's physical configuration. Examples of remote vehicle characteristics that must be simulated by the physics engines include the its center of gravity and its mass. While the above environmental simulators are preferred, alternative simulators able to render substantially realistic three dimensional environments, and to provide realistic physics engines, may also be used.

Figure 60:
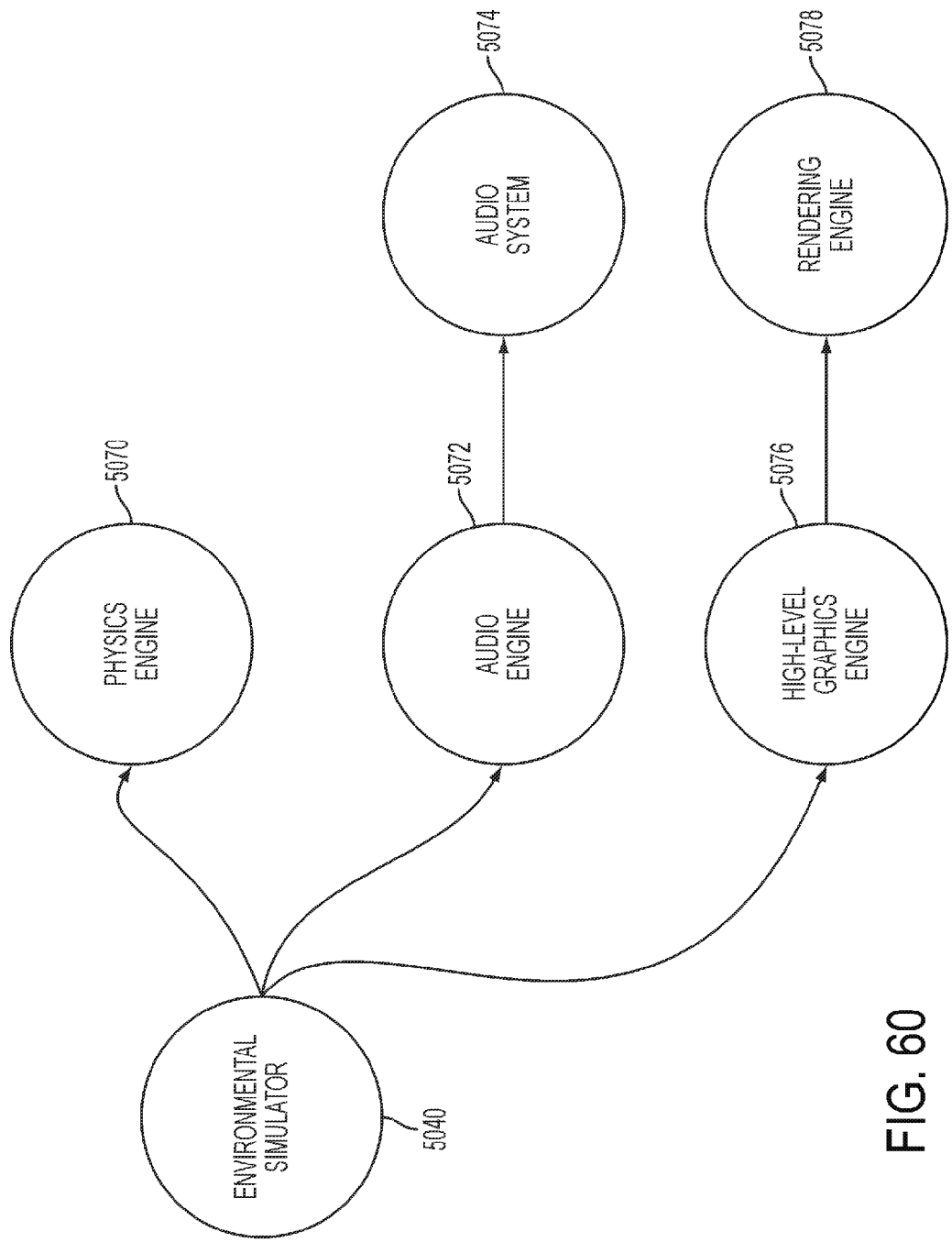
FIG. 60 is a graphical representation of components included in an embodiment of an environmental simulator.

Illustrated in FIG. 60 is a graphical representation of the components included in an embodiment of the environmental simulator 5040. The three main components included are a physics engine 5070, an audio engine 5072 and a high-level graphics engine 5076. The physics engine 5070 includes the electrical circuits and software routines necessary to mimic the physical characteristics of an environment and the physical characteristics of a simulated remote vehicle platform moving through a simulated environment. Also included in the environmental simulator is an audio engine 5072 able to generate sound effects characteristic of events that occur within the simulated environment. The audio engine includes the electrical circuits and software routines necessary to respond to system events by selecting and playing appropriate audio files. Further connected to the audio engine 5072 is an audio system 5074 that includes the circuitry and electrical components necessary to play selected audio files. A high-level graphics engine 5076 is also included in the environmental simulator 5040, and includes the circuits and software routines necessary to generate high resolution graphical displays of the simulated environment. Connected to the high-level graphics engine 5076 is a rendering engine 5078 that includes the software routines necessary to interpret image data generated by the high-level graphics engine 5076 and convert such data into a format able to be displayed, and displays the formatted image data on a viewing screen. Together the physics engine 5070, the audio engine 5072, and the high-level graphics engine 5076 generate and display a realistic simulated environment able to provide the user with an effective training session and representative of an actual environment.

Further shown in FIG. 59 is a mission routine suite 5025 which is connected to the integration controller 5035. The mission routine suite 5025 includes a number of different routines corresponding to various training scenarios. These routines are implemented by a simulated remote vehicle platform and simulated environment characteristic of the remote vehicle platform and environment specified in the mission routine. In some instances, the mission scenarios are specific to the simulated remote vehicle platform chosen and in other instances the scenarios are generalized and able to be implemented using a number of different remote vehicle simulations. Example missions include those that address problems of situational awareness, communications, and use of the remote vehicle controller. Sample training scenarios within a mission include navigating on rough terrain, climbing stairs, reconnaissance and surveillance, picking up objects and transporting them, and delivery of materials to a specified location. Additional and alternative tasks include those that are specific to the chosen remote vehicle's poses, where poses include the physical manipulation of the remote vehicle. The missions and their related tasks are accomplished via software routines included within the mission routine suite 5025 and correspond to specific missions. Each software routine includes a set of remote vehicle and environment characteristics specific to that routine. When a mission is executed, the training scenario routine included in the mission routine commands the virtual remote vehicle simulator to generate a simulated remote vehicle platform according to the scenario's specified characteristics, and the environmental simulator to generate a simulated environment according to the scenario's specified characteristics. An example of this relationship is a mission routine dedicated to using the remote vehicle to climb stairs, where the training scenario routines included in the mission command the virtual remote vehicle simulator to generate a simulated remote vehicle in a pose acceptable for climbing stairs and one that operates according to the stair climbing behavior. This training routine further commands the environmental simulator to generate an environment that includes stairs. The user is then able to actuate controls on the operator control unit 5 to mobilize the simulated remote vehicle platform to forward in the simulated environment.

Implementation of the embodiment displayed in FIG. 59 includes a central control system configured to run a Linux operating system due to the requirements of an Aware 2.0 software platform. Many environmental simulators, however, require a Windows-based operating system. To accomplish a synergistic coupling of the virtual remote vehicle simulator 5030 included in the Aware 2.0 software platform 5020 to an environmental simulator 5040; a Windows-based operating system may be installed on the operator control unit 20. Enablement of the Aware 2.0 software platform is achieved by implementing a virtual machine environment within the Windows operating system, where the virtual machine environment is configured to run a Linux-based operating system on which the Aware 2.0 software platform is installed.

Figure 61:
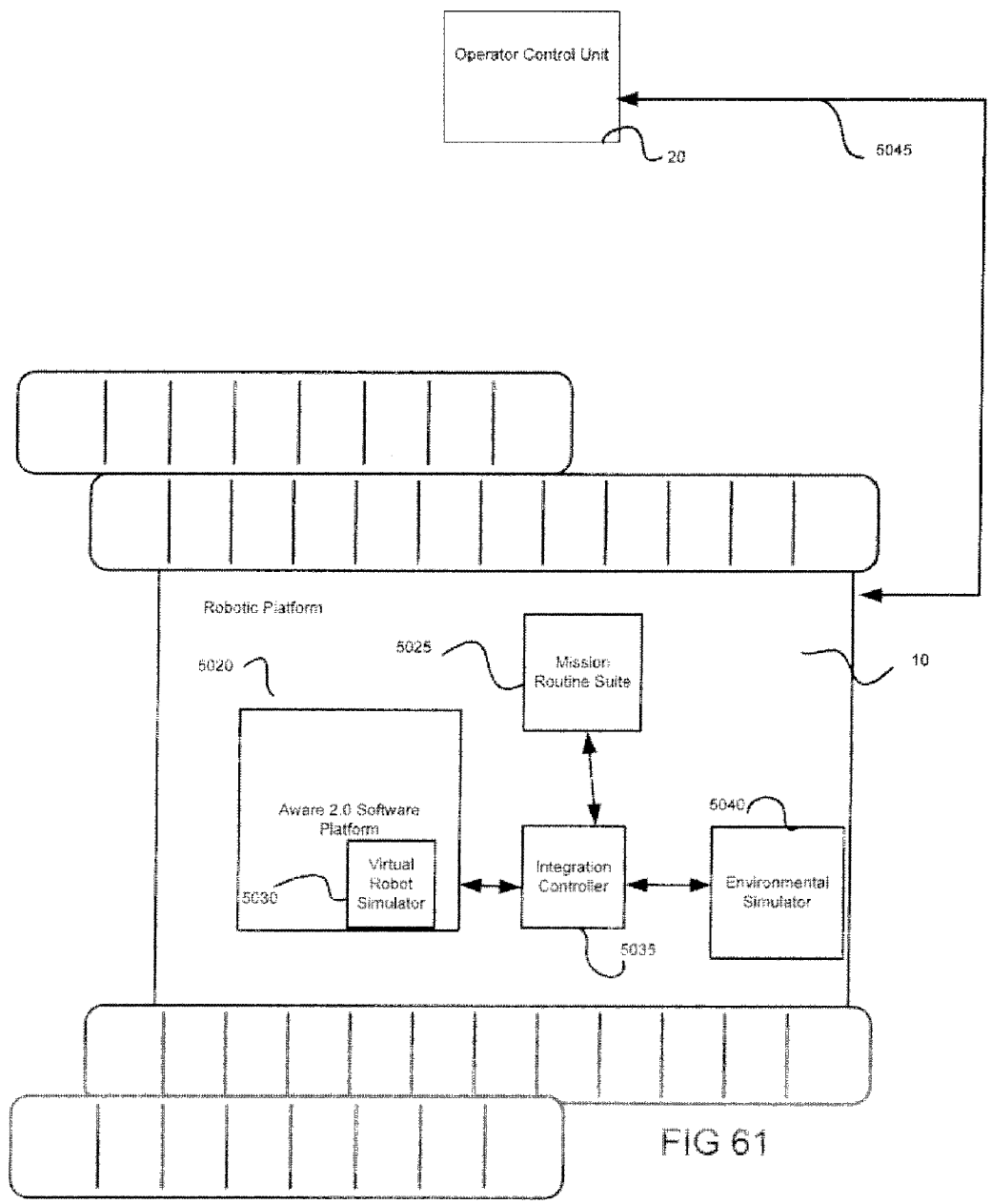
FIG. 61 illustrates an embodiment of a system configuration.

FIG. 61 displays an embodiment of the invention where an operator control unit 20 is in communication with the remote vehicle 10, which houses substantially all of the embedded simulation and training system components. Included on the remote vehicle 10 is the Aware 2.0 software platform 5020 in communication with the integration controller 5035 which is further in communication with the environmental simulator 5040. The Aware 2.0 software platform 5020 further includes a virtual robot simulator 5030 able to operate in synergy with the environmental simulator 5040 via the integration controller 5035 to simulate the platform's movement through a simulated environment. Also included in the remote vehicle 10 is a suite of mission routines 5025, which provide mission scenarios able to be replayed using the Aware 2.0 software platform 5020 (or other suitable platform) in combination with the virtual remote vehicle simulator 5030 and the environmental simulator 5040. All system components are installed on the remote vehicle's central control system memory and are executed by the single-board computer included in its control system. Preferably included in the remote vehicle is an engine comprised of software routines and circuitry able to simulate and model physical variables such as mass, friction and velocity. The central control system included in the remote vehicle 10 would be able to access the engine to aid in the execution and operation of the environmental simulator 5040. Communication between the remote vehicle 10 and the operator control unit 20 is accomplished via a communication link 5045 that preferably includes an Ethernet cable, but can alternatively include any communication connection by which the remote vehicle's central control system can transmit simulation and training data output to the operator control unit 20 for processing and display. When operated, the embedded simulation training system responds to user commands generated by the actuation of operator controls 5054 on the operator control unit 20 and sent to the platform via the communication link 5045; and generates video and sensor information to be sent to the operator control unit 20 via the communication link 5045 for display on display screen 5010. Alternatives to this embodiment include an operator control unit 20 that includes an additional integration controller to interpret system output for display on display screen 5010. Additional embodiments may include an operator control unit 20 with an integration controller 5035 and suite of mission routines 5025, where the integration controller 5035 communicates directly with the Aware 2.0 software platform 5020 (or other suitable platform) and environmental simulator 5040 included on the remote vehicle 10 via the communication link 5045. In such an embodiment, the integration and transfer of data between the virtual remote vehicle simulator 5030 and the integration controller 5035 is accomplished by the integration controller 5035 included on the operator control unit 20. Further versions include any combination of the operator control unit 20 and the remote vehicle 10, where at least one major system component is included on the remote vehicle 10 and operator control unit 20, and where communication between components is facilitated by a communication link 5045 established between the remote vehicle and the operator control unit. In such an embodiment, major system components includes the Aware 2.0 software platform 5020 (or other suitable platform), the virtual robot simulator 5030, the integration controller 5035, the environmental simulator 5040, the mission routine suite 5025, and any other system component necessary for the proper operation of the embedded simulation and training system.

Figure 62:
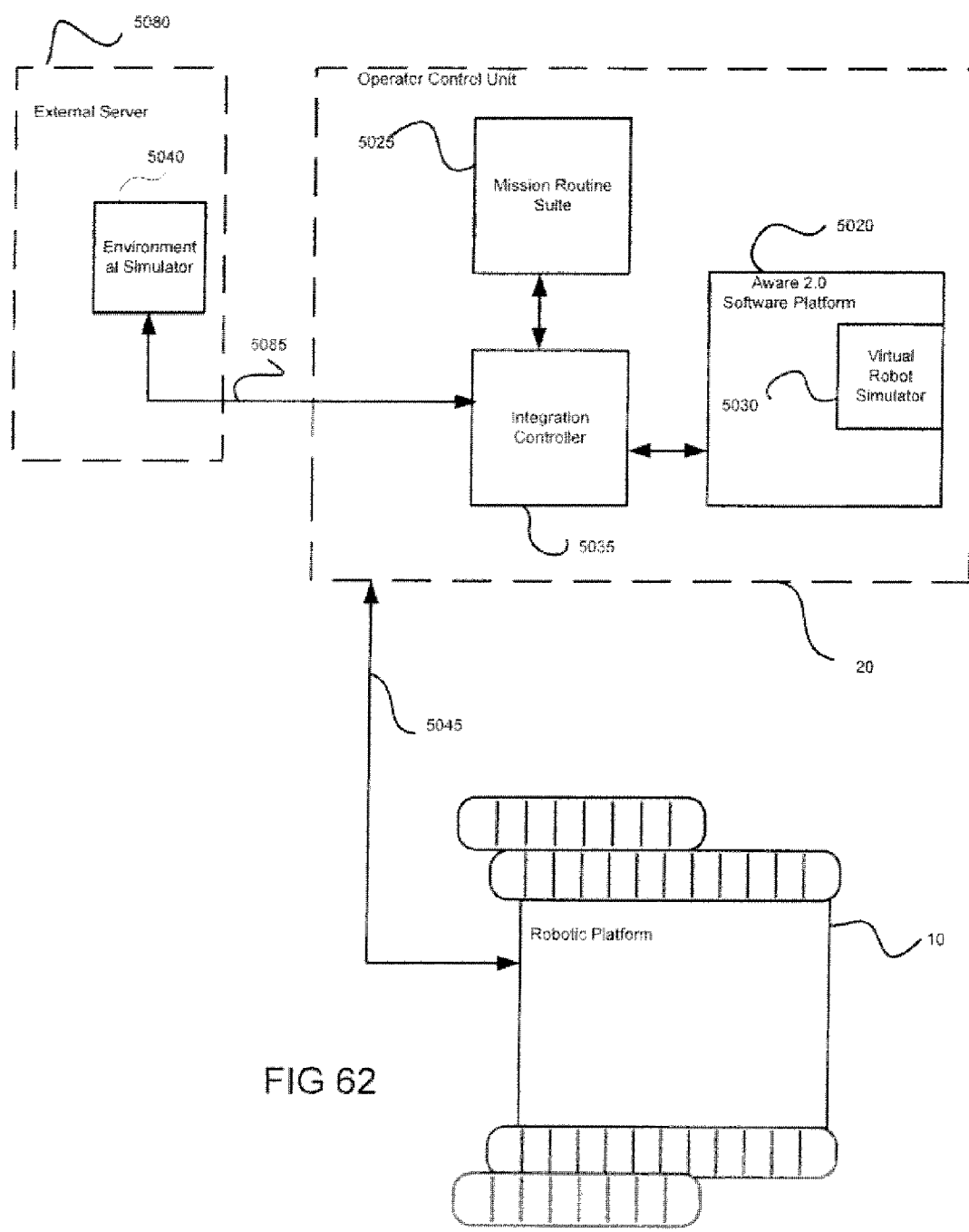
FIG. 62 illustrates an embodiment of the system where at least one major system component resides on an external server.

Displayed in FIG. 62 is an embodiment of the system where at least one major system component resides on an external server 5080 which is connected to the operator control unit via a connection link 5085. The external server 5080 may comprise a central control system comprised of a processor and memory, and a physics engine including software routines and circuitry able to simulate and model physical variables such as mass, friction, and velocity. The central control system included in the external server 5080 would be able to access the engine to aid in the execution and operation of major system components installed on the server 5080. In an embodiment of the invention, the environmental simulator 5040 is installed on the external server 5080 such that the simulator is in communication with the server's central control system and physics engine. Communication with the integration controller 5035 installed on the operator control unit 20 would be accomplished via a communication link 5085 such as an Ethernet cable. Alternative system components to be included on the external server 5080 can include any combination of the mission routine suite 5025, the Aware 2.0 software platform 5020 (or other suitable platform), the virtual robot simulator 5030, the integration controller 5035, or any other system component necessary to the operation of the embedded simulation and training system.

Alternative embodiments of the system include a system where the routines associated with training the end user are able to store data relating to the actions employed by the user to operate the remote vehicle. In particular, this data can include control commands sent to the remote vehicle using the operator control unit and transmitted via a communication connection between the operator control unit and the remote vehicle. Further data types include environmental variables such as wind resistance, temperature, friction, angular rotation about the ground plane, velocity, and other such physical variables able to be sensed by the remote vehicle, the operator control unit, or additional remote vehicles within the system.

Once stored, the data can be used to create idealized test cases against which future missions are measured. Thus, the operator control unit can provide either current or post mission feedback regarding underused platform capabilities and unsafe or inefficient operations, to the operator that indicates analytical conclusions determined by comparing the idealized test cases against current or recent mission data sets. Feedback provided can take the form of a list generated by the training routine and outputted onto the operator control unit display screen, or can take the form of a simulated reenactment of the mission accompanied by commentary generated by training routines and the result of comparisons to an idealized test case. This embodiment of the embedded simulation and training system ideally includes an operator control unit with an Aware 2.0 software platform (or other suitable platform) including a virtual remote vehicle simulator, a integration controller, and a mission routine suite installed thereon. Further included in this embodiment is an additional server with an environmental simulator, where the server may be used by training routines to replay a recent mission in order to pinpoint inefficient and incorrect operator use. Alternative embodiments may include alternative system configurations akin to those displayed in FIGS. 58, and 61.

Diagnostic Assembly

In an embodiment of the invention, a diagnostic assembly included in the remote vehicle uses its own diagnostic information to update the parameters to its own reference mobility models. This is advantageous because the assembly can use its own sensors and behavior routines to devise new strategies to achieve its original goal. For example, when a remote vehicle such as, for example, an RGator is patrolling an area autonomously, the RGator has the ability to poll its sensors to determine deviations from normal operation. Should one of the RGator's tires become flat, the RGator could interpret sensor data indicating that there is a decrease in the amount of power outputted through the axel on which the tire was installed, to determine that the tire is flat. This information would further be used by the RGator to alter a reference model of the platform stored in the platform's memory.

A remote vehicle typically builds maps, localizes and navigates based in part on assumptions that the remote vehicle makes about its physical configuration. When the remote vehicle senses that it has a flat tire and alters its reference model accordingly, the remote vehicle can also alter the control commands it passes to its attached actuators. In this case the remote vehicle would increase or decrease the amount of torque applied to the wheel having a flat tire to accommodate for the flat tire and further maintain optimum performance.

The diagnostic assembly may be included in the behavior software level of the remote vehicle 10. Alternatively, the diagnostic assembly can be included in other urban ground vehicles, or other remote vehicles that operate semi-autonomously and require robust operation. For example, the diagnostic assembly could be useful in a remote vehicle that is used in missions where the operator may not have the ability to retrieve the remote vehicle when it experiences a device failure, but where retrieval and return of the remote vehicle is necessary to the success of the mission.

Exemplary sensed system faults that can be diagnosed and accommodated may include: jammed tracks; broken flippers; malfunctioning sensors; overloaded arm; extra payloads; mud encumbering the vehicle; and fatigued batteries.

For a remote vehicle to perform a path planning behavior suitably, it needs an accurate model of itself. In an embodiment of the invention, the accurate model includes variables having to do with the remote vehicle's environment (e.g., the ambient temperature), the status of the remote vehicle's components (e.g., tire pressure level and battery charge level), and the remote vehicle's internal environment (e.g., the remote vehicle's internal temperature).

The present invention contemplates implementing collection of such variables via three possible methods. First, adding a payload or sensor dedicated to overseeing data collection from designated existing sensors for the purpose of updating the reference model, the payload or sensor being dedicated to polling data collected by a select group of sensors. Processing circuits included within the payload or sensor would output flags indicative of a system fault when a sensed state persists for a pre-determined period of time. For example, there may be a sensor group in the payload dedicated to polling the wheel encoders and motor power of the front left wheel. When the power falls below a certain level for a pre-determined period of time (e.g., a time value within the range of a half a minute to a minute and a half), the sensor group diagnoses this drop in power as indicative of a flat tire. When the sensor group identifies this system fault, the sensor group outputs an error code consisting of logic values, and representative of the system fault sensed. The error code could further have power values and other variables necessary or helpful to properly adjust the remote vehicle's reference model. Routines included in the software architecture installed on the remote vehicle then use this error code to alter the remote vehicle's reference model and further alter operation of its drive system.

As an alternative, the invention contemplates using a combination of sensors already on the vehicle to calculate system faults in software by inference. A system using this method is similar to the above; however, rather than having a payload dedicated to diagnosing system faults, this system includes software routines that synthesize pre-existing sensor output to determine whether or not a system fault has occurred. When a system fault occurs, an error code is generated similar to the above method and the remote vehicle uses the error code to further alter its reference mode.

In a third alternative, the remote vehicle may perform certain routines and observe the designated sensor's response. This is dissimilar to the above two methods in that it doesn't rely solely on sensor output. Rather, routines are configured to "test" pre-selected actuators, where each test is designed to elicit a particular response. Failure to respond in the expected manner causes the routine the return an error code indicating that the actuator tested failed and that there exists a system fault with regard to that actuator. This method may further include a routine that executes after an error has been found to further poll sensors associated with the failed actuator to determine the parameters necessary for the robot to alter its reference model to take into account the failed actuator. In an example of this embodiment, an RGator is moving across a terrain and its brakes are actuated to slow the vehicle down. If an included IMU or accelerometer senses that the vehicle responds to the application of the brakes by moving forward at an acceleration greater than the expected acceleration, the remote vehicle can deduce that it is traversing a slippery terrain. This is like a driver tapping a car's brakes to determine whether or not the road is icy.

The above diagnosis embodiments may be implemented individually, or some combination of them may be used.

In an embodiment of the invention, the diagnostic assembly includes a suite of sensors (actual and virtual) and interacts with a diagnostic behavior that is a persistent behavior (meaning that the behavior is on all the time unless the user takes affirmative steps to disable the behavior). The diagnostic behavior may interact with a motion control toolkit included in the virtual sensor level of software to gather the necessary sensor data feedback. This sensor data feedback is then used to determine whether or not a system fault has occurred. The behavior could alternatively or additionally respond to preventative sensor data, such as for example, a camera installed on the remote vehicle that views a change in the terrain (i.e. from grass to sand) and implements diagnostic routines to test the robustness of the actuators based on the upcoming terrain. Gathering preventative sensor data may additionally include implementing a routine that actuates the brakes to determine whether or not the remote vehicle is on a slippery surface, or quickly accelerating the remote vehicle to determine whether it is stuck.

According to an embodiment of the invention, to implement the diagnostic assembly, the operator control unit includes a graphical representation of the remote vehicle on the screen representing the real time status of the remote vehicle's actuators. When a system fault occurs, the remote vehicle sends status data to the OCU where such data is processed by software routines to alter the graphical representation to reflect the system error. For example, when the remote vehicle losses a wheel, the graphical representation of the remote vehicle on the OCU can change to reflect the loss of the wheel.

What is claimed is:

1. A system for implementing a retrotraverse behavior for a remote vehicle configured to communicate with an operator control unit when a control signal from operator control unit is not received, the system comprising:
a control system on the remote vehicle including a memory and a processor, the processor being configured to run the retrotraverse behavior, the retrotraverse behavior including or in communication with a waypoint routine that maintains a list of time stamped waypoints stored in the memory and separated by at least a minimum difference in time and distance,
wherein one of the waypoint routine and the retrotraverse behavior generates a return path interconnecting previously-traversed waypoints in reverse order of timestamps, and
wherein the remote vehicle navigates successively to the next previous time-stamped waypoint in the list until a control signal is received from the operator control unit.

2. The system of claim 1, wherein the memory is a doubly-linked, indexed list sorted chronologically by timestamp.

3. The system of claim 1, wherein the retrotraverse behavior is implemented automatically when communication with the operator control unit is lost.

4. The system of claim 1, wherein one of the waypoint routine and the retrotraverse behavior maintains a list of previously-performed retrotraverses by recording a list of start time and end time pairs for each retrotraverse period of time.

5. The system of claim 4, wherein the retrotraverse behavior excludes waypoints recorded during previously-performed retrotraverses.

6. The system of claim 5, wherein the retrotraverse behavior excludes waypoints recorded during previously-performed retrotraverses by excluding waypoints recorded between the start time and end time pairs for each previously-performed retrotraverse.

7. The system of claim 4, wherein the retrotraverse behavior excludes waypoints that were traversed during previously-performed retrotraverses.

8. The system of claim 1, wherein the retrotraverse behavior utilizes a lookahead vector to allow smooth navigation along an intended path of travel.

9. The system if claim 8, wherein the retrotraverse behavior only utilizes lookahead vectors that lie within a predetermined distance of each waypoint along the intended path of travel.

10. The system if claim 8, wherein, when utilizing a lookahead vector, the retrotraverse behavior avoids taking shortcuts that bypass waypoints.

11. The system of claim 8 wherein, when utilizing a lookahead vector, the retrotraverse behavior utilizes a radius of interception to determine whether the remote vehicle has reached a waypoint.

12. The system of claim 8 wherein, when utilizing a lookahead vector, the retrotraverse behavior utilizes a perpendicular plane to determine whether the remote vehicle has passed a waypoint.

13. The system of claim 1, wherein the retrotraverse behavior navigates the remote vehicle along the return path.

14. The system of claim 13, wherein the retrotraverse behavior selects a forward or backward direction for navigating the remote vehicle along the return path based on a determination of which direction requires the least rotation.

15. The system of claim 1, wherein the retrotraverse behavior determines the remote vehicle's position using odometry.

16. The system of claim 15, wherein the retrotraverse behavior also determines the remote vehicle's position using a global positioning system, ties global positioning system data to odometry data, and uses a Kalman filter to provide confidence in the remote vehicle's position based on the odometry data and the global positioning system data.

17. The system of claim 1, wherein the retrotraverse behavior determines the remote vehicle's position by maintaining a global map and placing the remote vehicle's coordinates within the global map.

18. The system of claim 17, wherein the retrotraverse behavior maintains a destination point within the global map and adjusts the remote vehicle's heading to navigate the remote vehicle toward the destination point.

19. The system of claim 1, wherein the retrotraverse behavior uses one or more of a global positioning system or navigation beacon points to determine the remote vehicle's position.

* * * * *

UNITED STATES PATENT AND TRADEMARK OFFICE
CERTIFICATE OF CORRECTION

PATENT NO. : 8,108,092 B2
APPLICATION NO. : 12/917174
DATED : January 31, 2012
INVENTOR(S) : Emilie Phillips et al.

It is certified that error appears in the above-identified patent and that said Letters Patent is hereby corrected as shown below:

Title Page, Item (57)
Please replace the Abstract with the following substituted Abstract:

A system implements a retrotraverse behavior when a control signal is not received. The system comprises: a control system on a remote vehicle including a memory and a processor, the processor being configured to run the retrotraverse behavior, the retrotraverse behavior including or in communication with a waypoint routine that maintains a list of time-stamped waypoints stored in the memory and separated by at least a minimum difference in time and distance. One of the waypoint routine and the retrotraverse behavior generates a return path interconnecting previously-traversed waypoints in reverse order of timestamps. The remote vehicle navigates successively to the next previous time-stamped waypoint in the list until a control signal is received from the operator control unit.

Signed and Sealed this
Eighth Day of May, 2012

David J. Kappos
*Director of the United States Patent and Trademark Office*